United States Patent
Nose et al.

(10) Patent No.: US 7,424,172 B2
(45) Date of Patent: Sep. 9, 2008

(54) IMAGE PROCESSING METHOD, IMAGE PROCESSING APPARATUS AND IMAGE PICKUP APPARATUS AND DISPLAY APPARATUS SUITABLE FOR THE APPLICATION OF IMAGE PROCESSING METHOD

(75) Inventors: Atsushi Nose, Kanagawa (JP); Koji Aoyama, Saitama (JP); Tohru Kurata, Saitama (JP); Kimitaka Wada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/929,575

(22) Filed: Oct. 30, 2007

(65) Prior Publication Data

US 2008/0062288 A1 Mar. 13, 2008

Related U.S. Application Data

(62) Division of application No. 10/760,674, filed on Jan. 21, 2004, now Pat. No. 7,352,915.

(30) Foreign Application Priority Data

Jan. 30, 2003 (JP) ............................. 2003-022642

(51) Int. Cl.
*G06K 9/40* (2006.01)
*G06T 9/00* (2006.01)
*G06F 7/00* (2006.01)
(52) U.S. Cl. ...................... 382/275; 382/243; 382/232; 345/555; 708/203
(58) Field of Classification Search ................. 382/275, 382/232, 243; 345/555; 708/203
See application file for complete search history.

(56) References Cited

U.S. PATENT DOCUMENTS 5,263,074 A 11/1993 Sakamoto (Continued)

FOREIGN PATENT DOCUMENTS

JP 61-175780 8/1986

(Continued)

OTHER PUBLICATIONS

U.S. Appl. No. 11/926,714, filed Oct. 29, 2007, Nose et al.

(Continued)

*Primary Examiner*—Jingge Wu
*Assistant Examiner*—Bernard Krasnic
(74) *Attorney, Agent, or Firm*—Oblon, Spivak, McClelland, Maier & Neustadt, P.C.

(57) ABSTRACT

A lattice dividing unit determines lattice lines to divide parameters of all points of a picture at every division and supplies distortion correction parameters (distortion correction coordinates) on the lattice points to a distortion correction memory (not shown). A polynomial of degree n coefficient deriving unit expresses all distortion correction coordinates on each lattice line in the form of a function relative to positions on lattice lines and approximates the distortion correction coordinates by desired division polynomial of degree n. Further, a sample point deriving unit compresses distortion correction parameters based upon the division polynomial of degree n obtained from the polynomial of degree n coefficient deriving unit. In the derived division polynomial of degree n, internal points which result from dividing both ends of the division polynomial of degree n by n is supplied to the distortion correction memory as new distortion correction parameters (approximated distortion correction coordinates). Thus, a memory capacity of a required memory can be reduced in the image processing for correcting distortion of an image.

1 Claim, 39 Drawing Sheets

U.S. PATENT DOCUMENTS

| | | |
|---|---|---|
| 7,079,265 B2 | 7/2006 | Horie |
| 2003/0020732 A1 | 1/2003 | Jasa et al. |
| 2004/0218071 A1 | 11/2004 | Chauville et al. |
| 2004/0247195 A1 | 12/2004 | Chauville et al. |

FOREIGN PATENT DOCUMENTS

| | | |
|---|---|---|
| JP | 61175780 | 8/1986 |
| JP | 2-212979 | 8/1990 |
| JP | 5-274426 | 10/1993 |
| JP | 11-149549 | 6/1999 |
| JP | 2001-124517 | 5/2001 |
| JP | 2002-230572 | 8/2002 |
| JP | 2004-80545 | 3/2004 |
| JP | 2004-534489 | 11/2004 |
| JP | 2004-534490 | 11/2004 |
| WO | WO 03/007237 A1 | 1/2003 |
| WO | WO 03/007238 A1 | 1/2003 |

OTHER PUBLICATIONS

U.S. Appl. No. 11/929,575, filed Oct. 30, 2007, Nose et al.

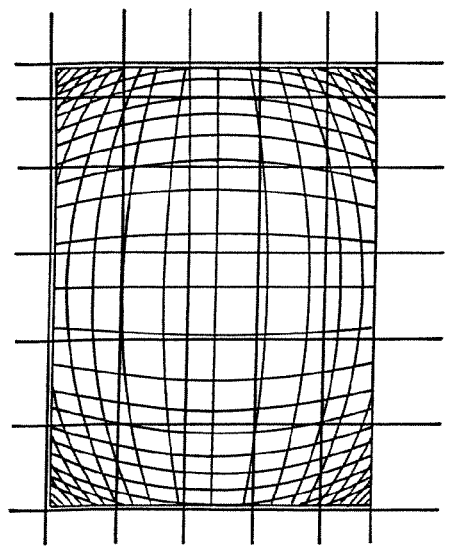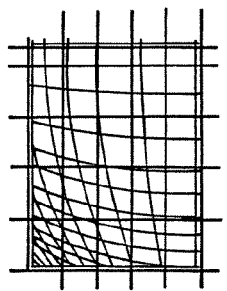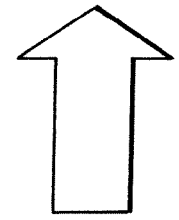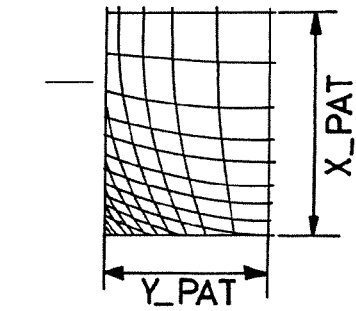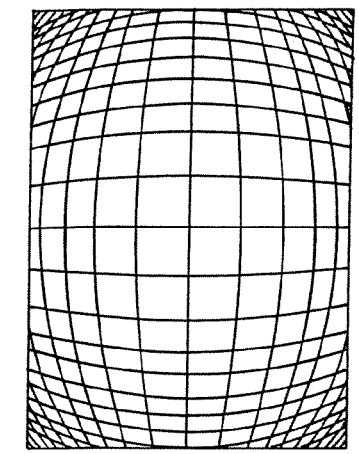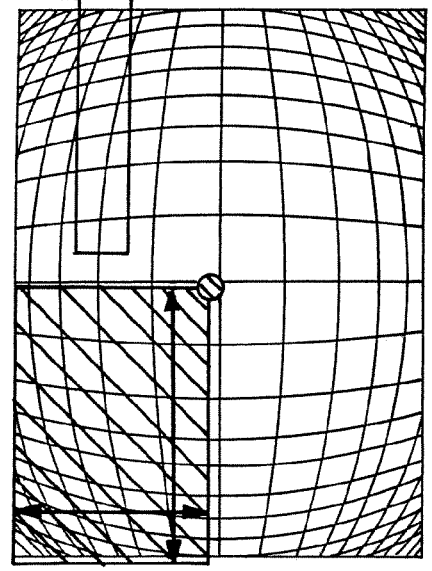
FIG. 5A (RELATED ART)
FIG. 5B (RELATED ART)

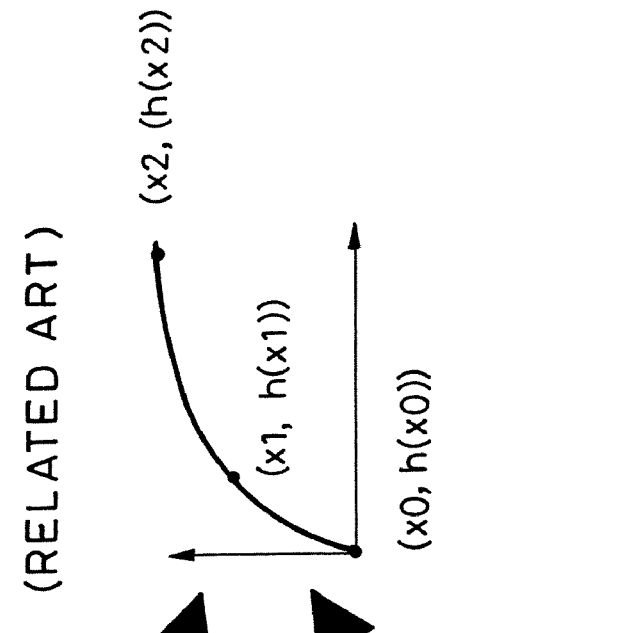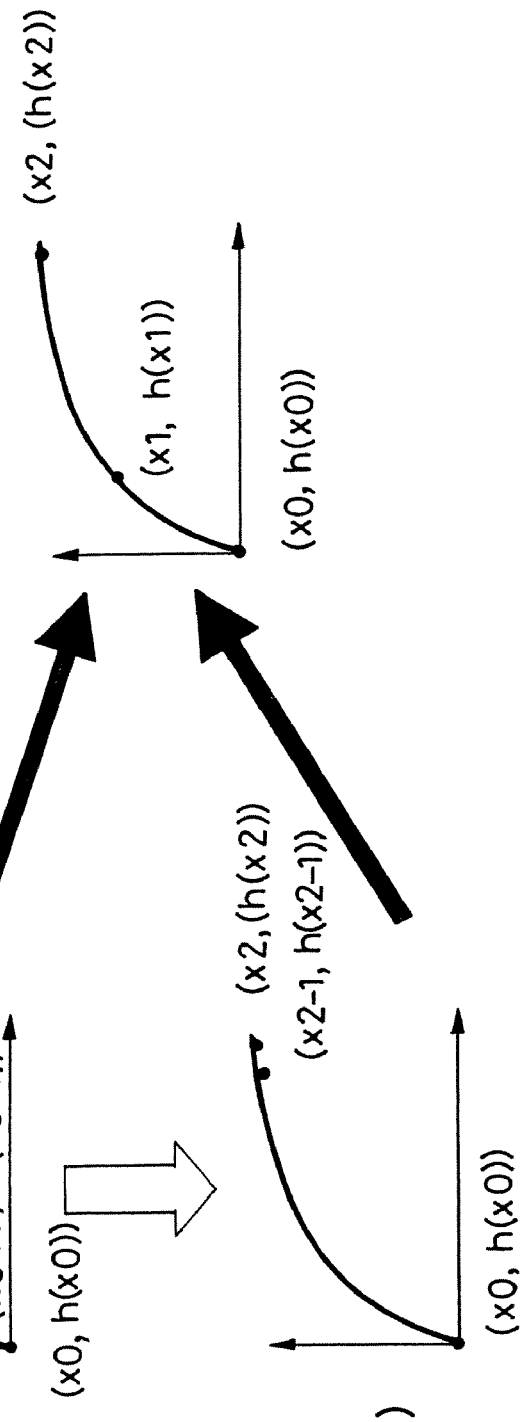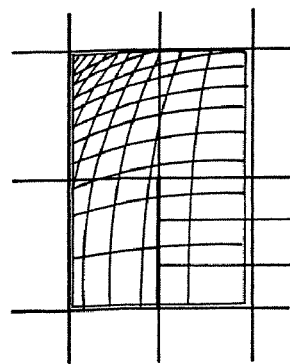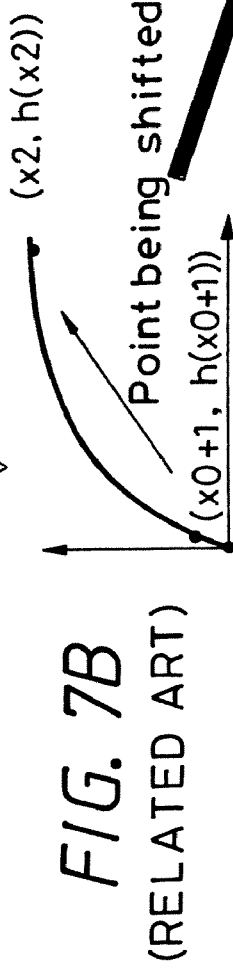
FIG. 7A (RELATED ART)
FIG. 7B (RELATED ART)
FIG. 7C (RELATED ART)
FIG. 7D (RELATED ART)

Example) Division Degree-2 Polynomial

\* ☆-Mark Represents Point That Can Be Shared with Discrete Lattice $n\_a * x^2 + n\_b * x + n\_c * x$ $f\_a * x^2 + f\_b * x + f\_c * x$ $g\_a * x^2 + g\_b * x + g\_c * x$ $m\_a * x^2 + m\_b * x + m\_c * x$

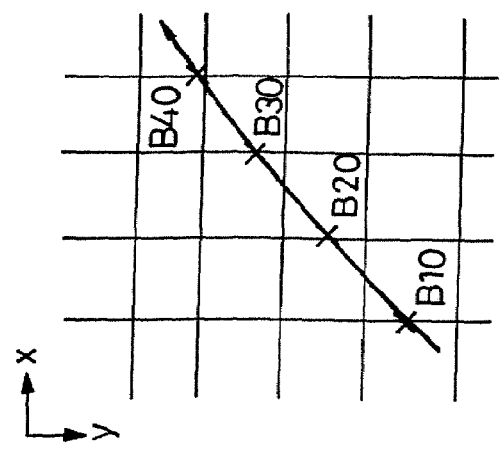
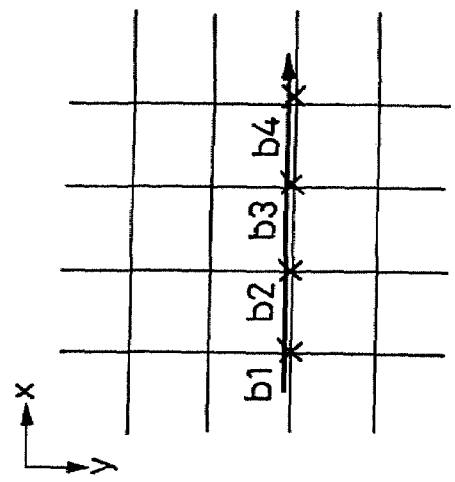
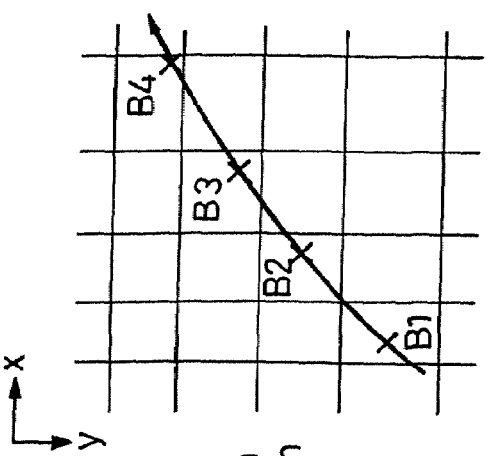
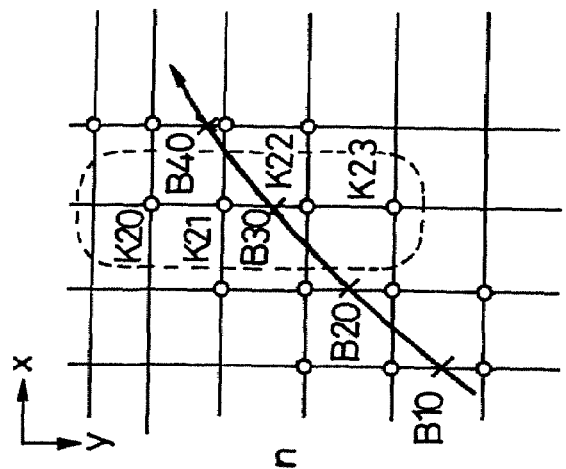
FIG. 14A x Direction Correction
FIG. 14B y Direction Correction Corrected Image Image Obtained Before Being Corrected Luminance Signal

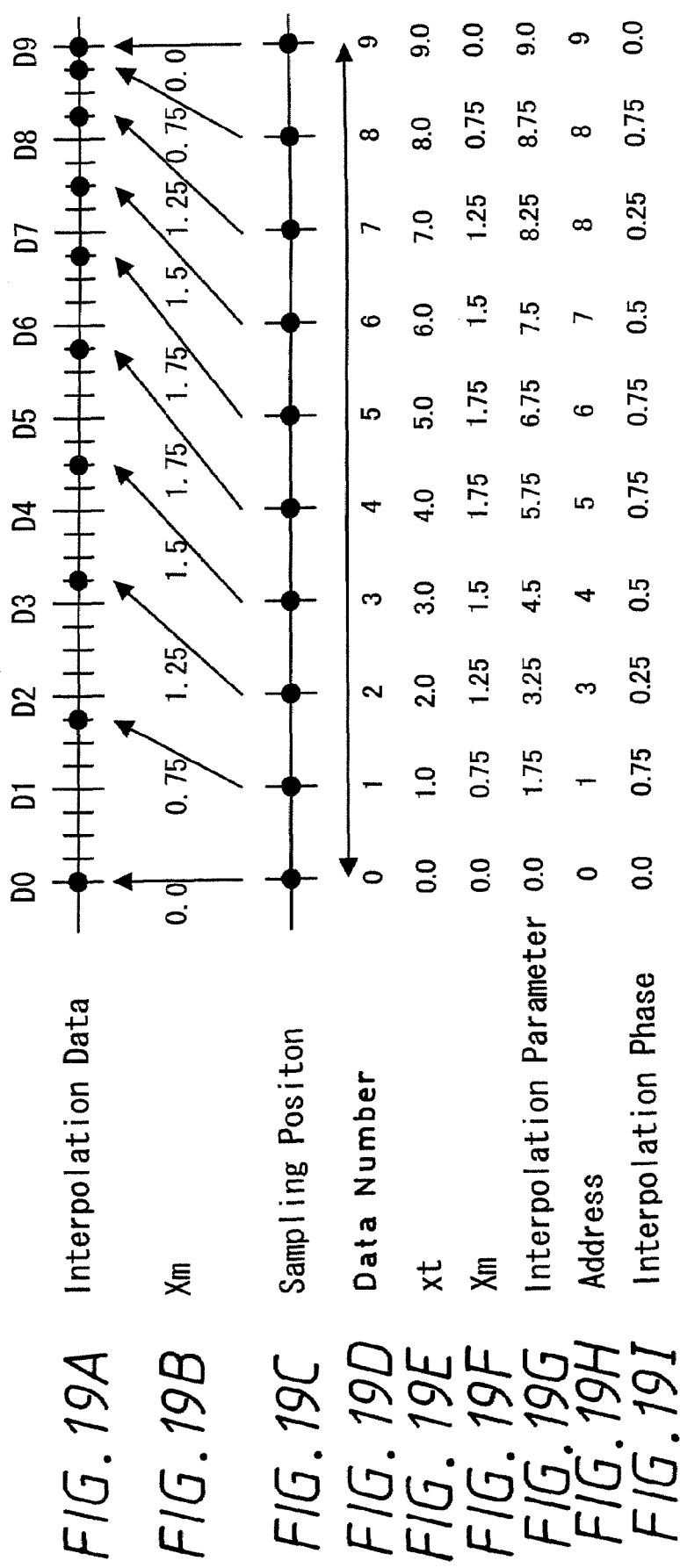

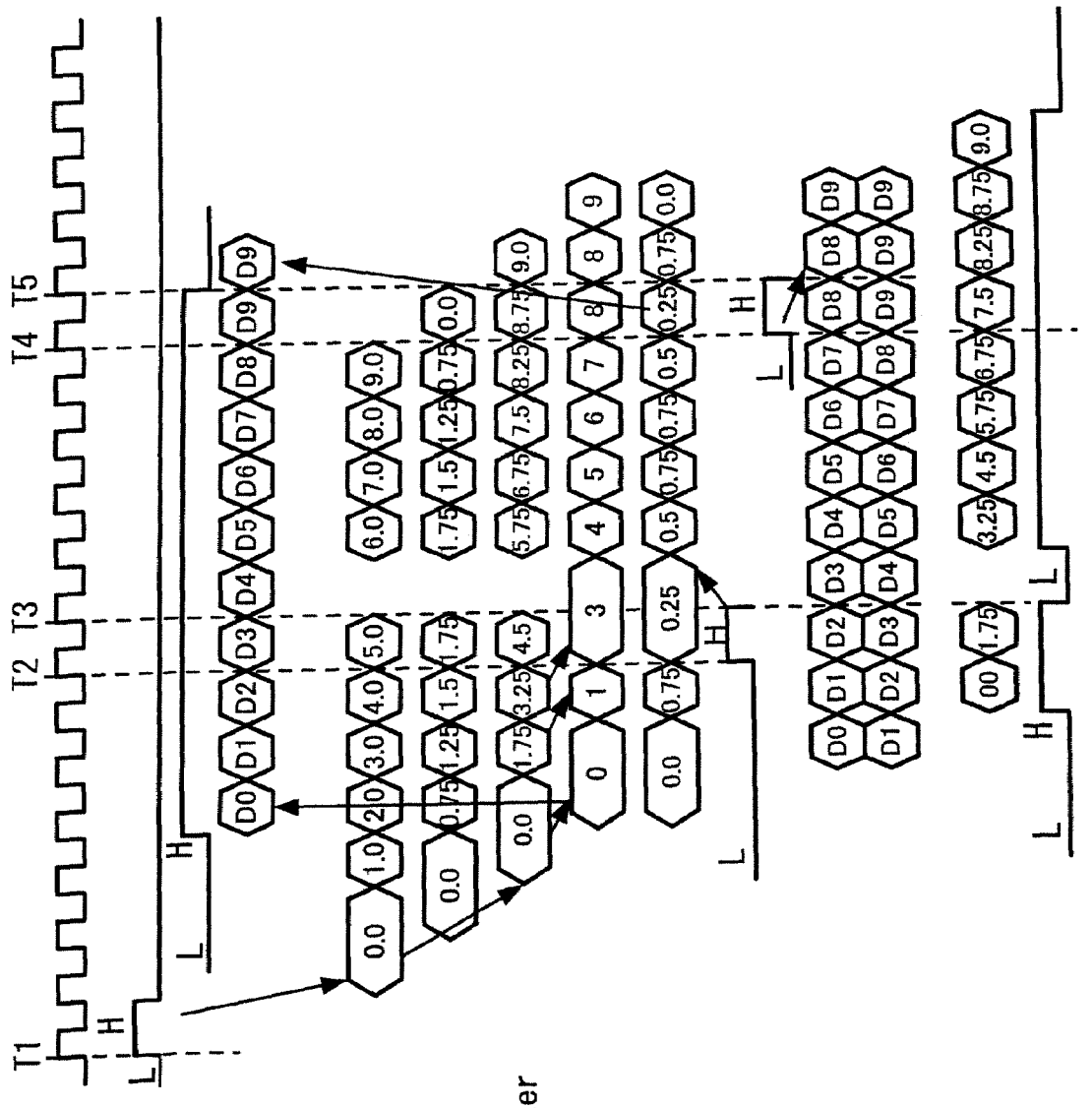

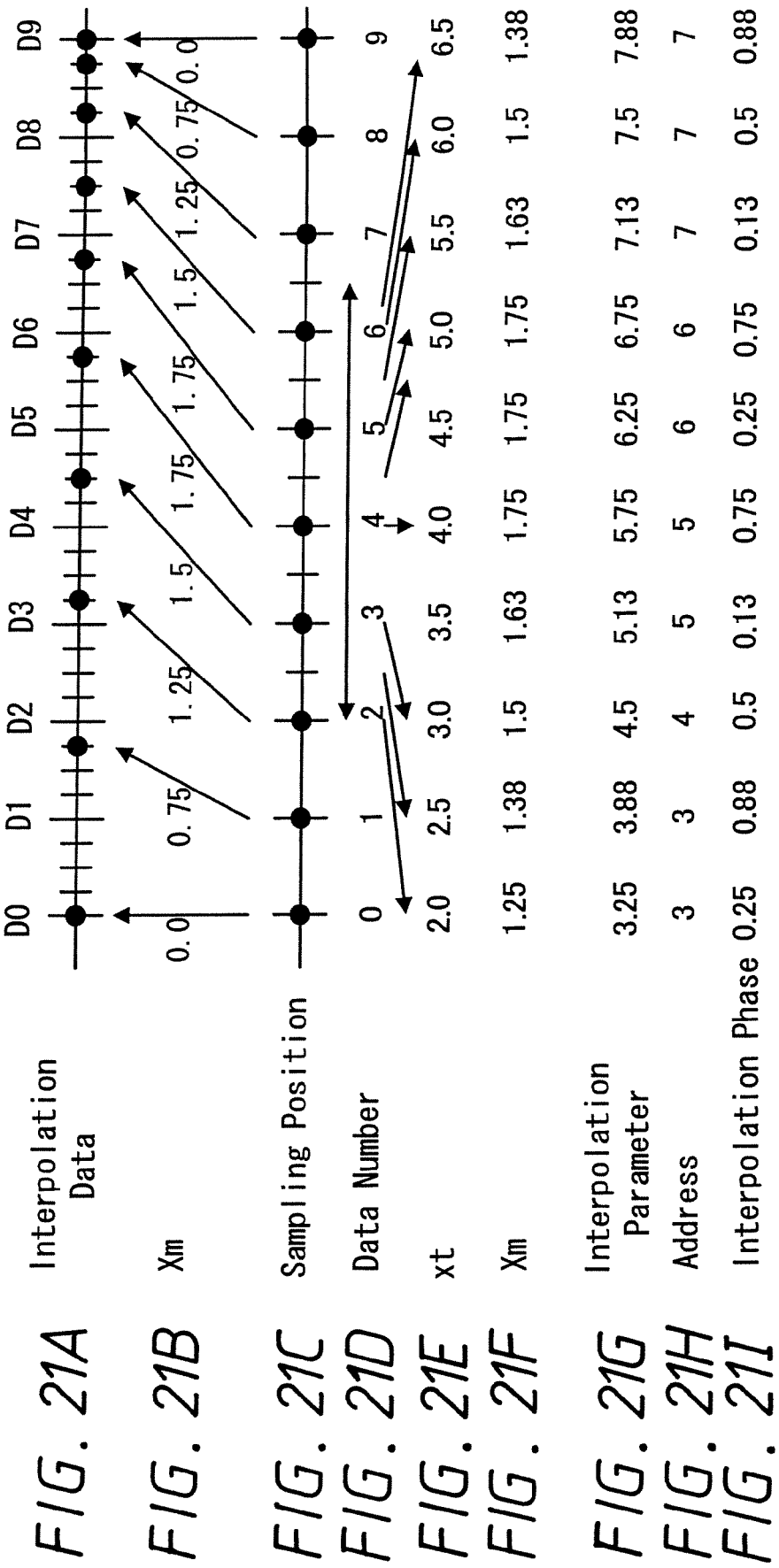

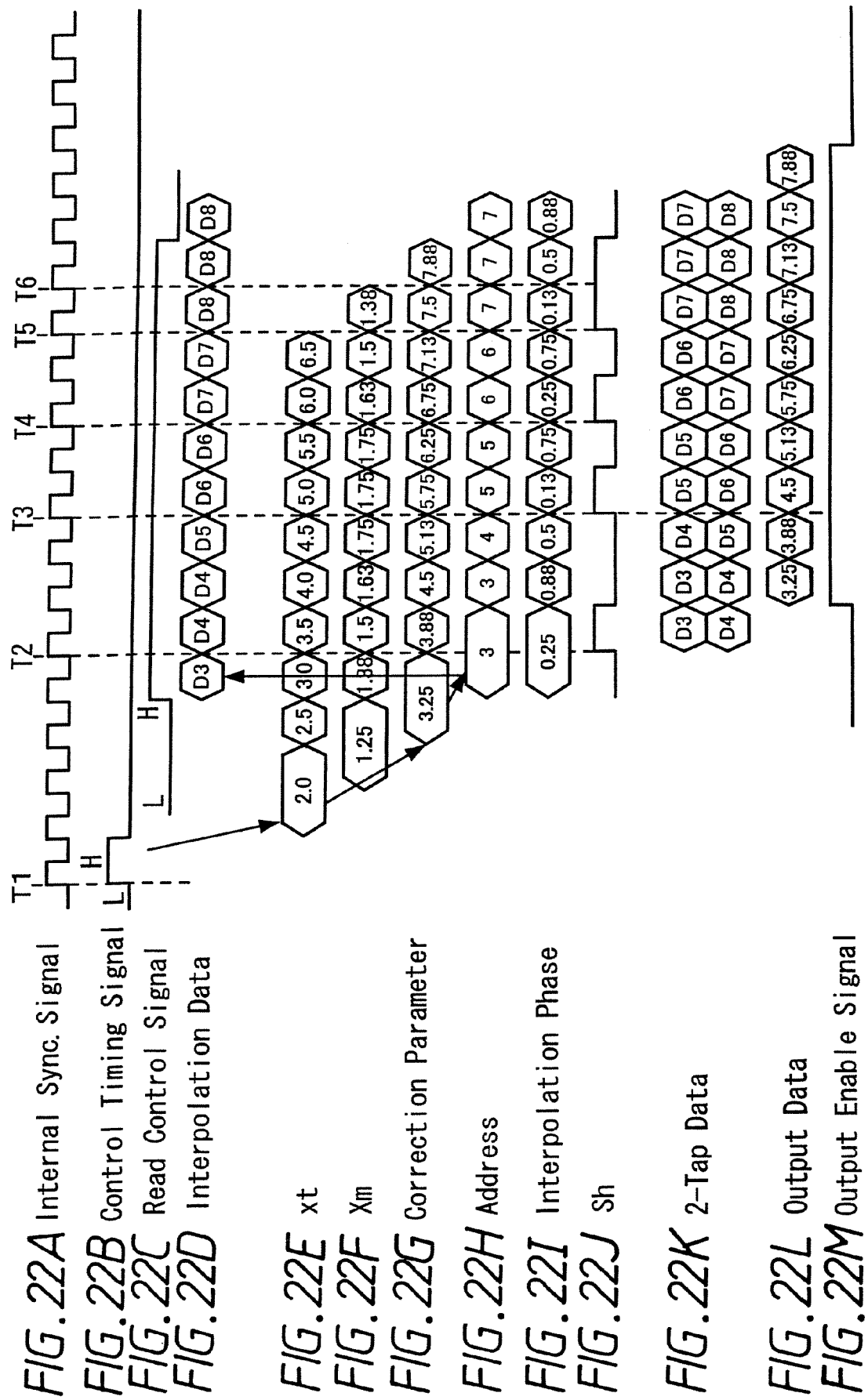

FIG. 25A Corrected Image
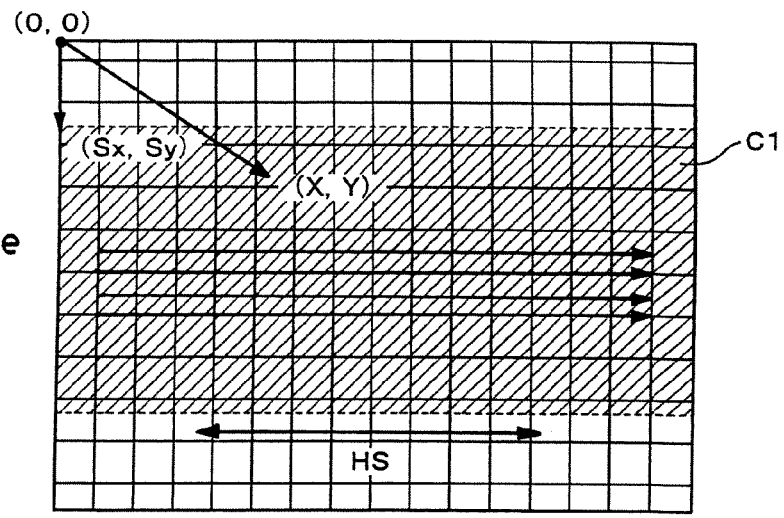
FIG. 25B Image Obtained Before Being Corrected
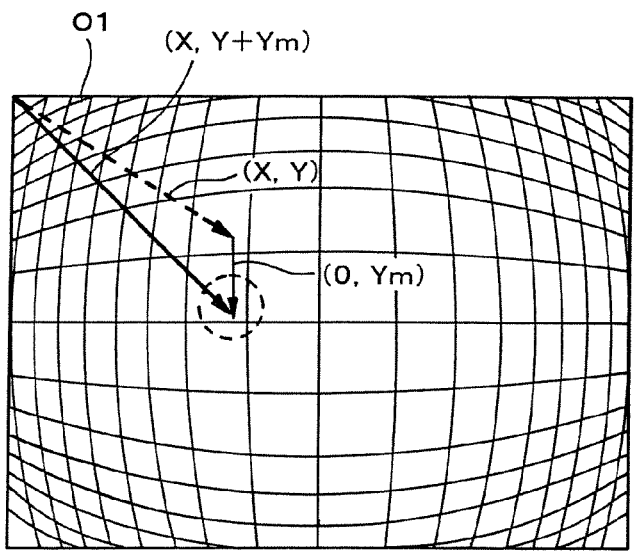
FIG. 25C Luminance Signal
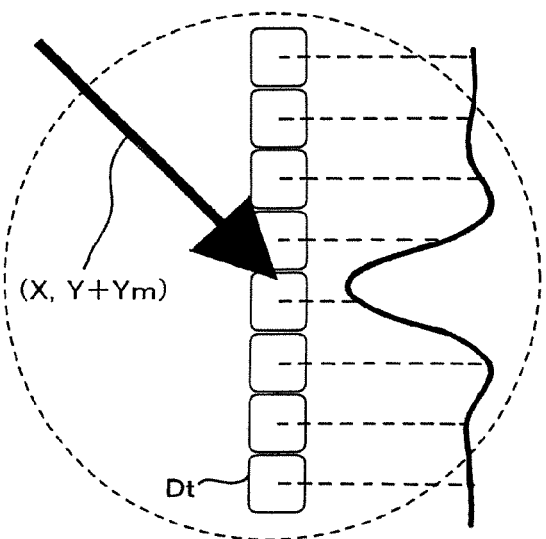

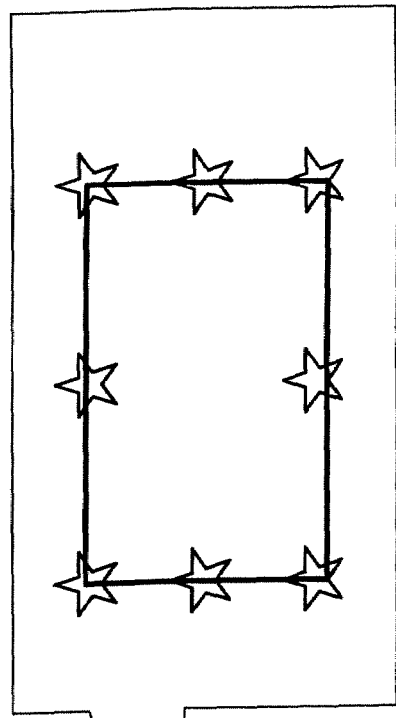
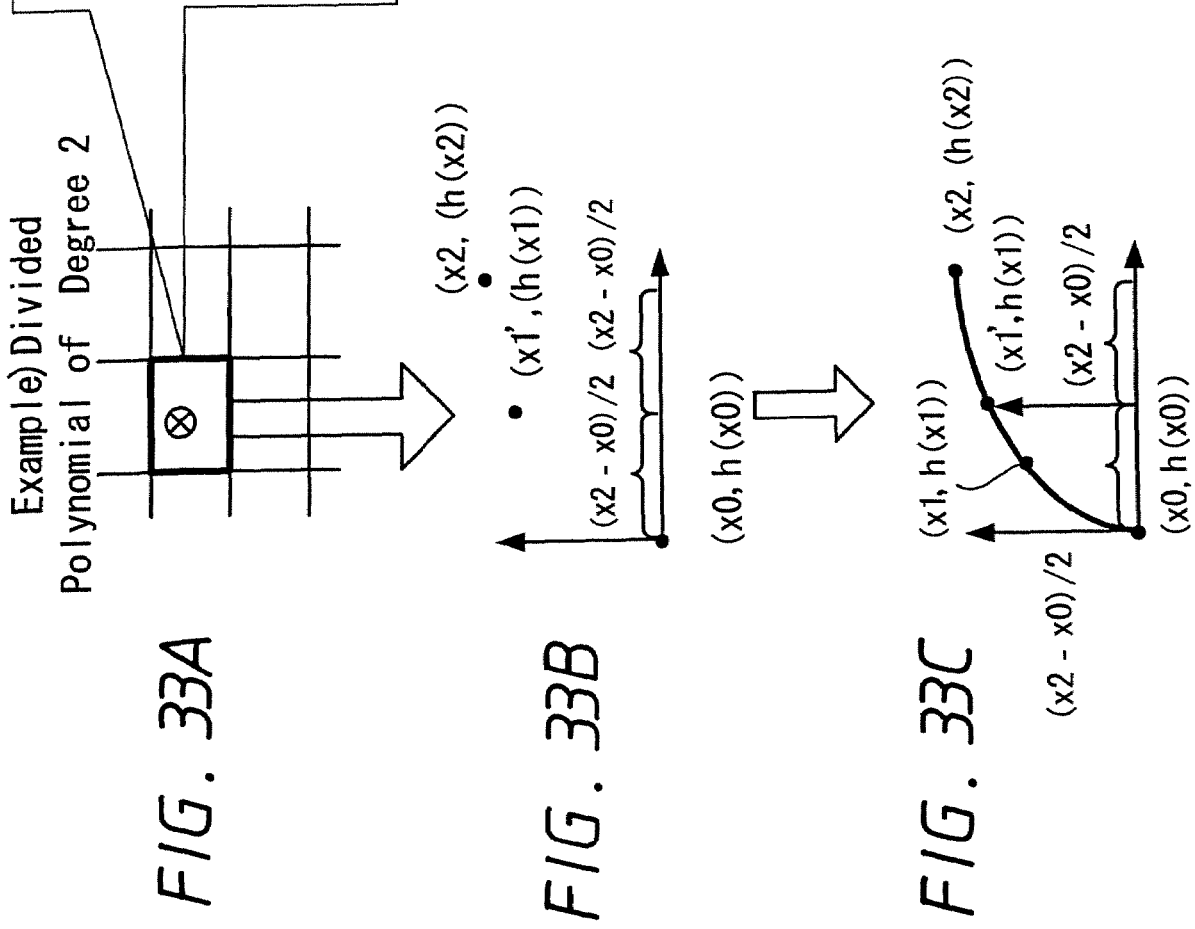
FIG. 33A
FIG. 33B
FIG. 33C

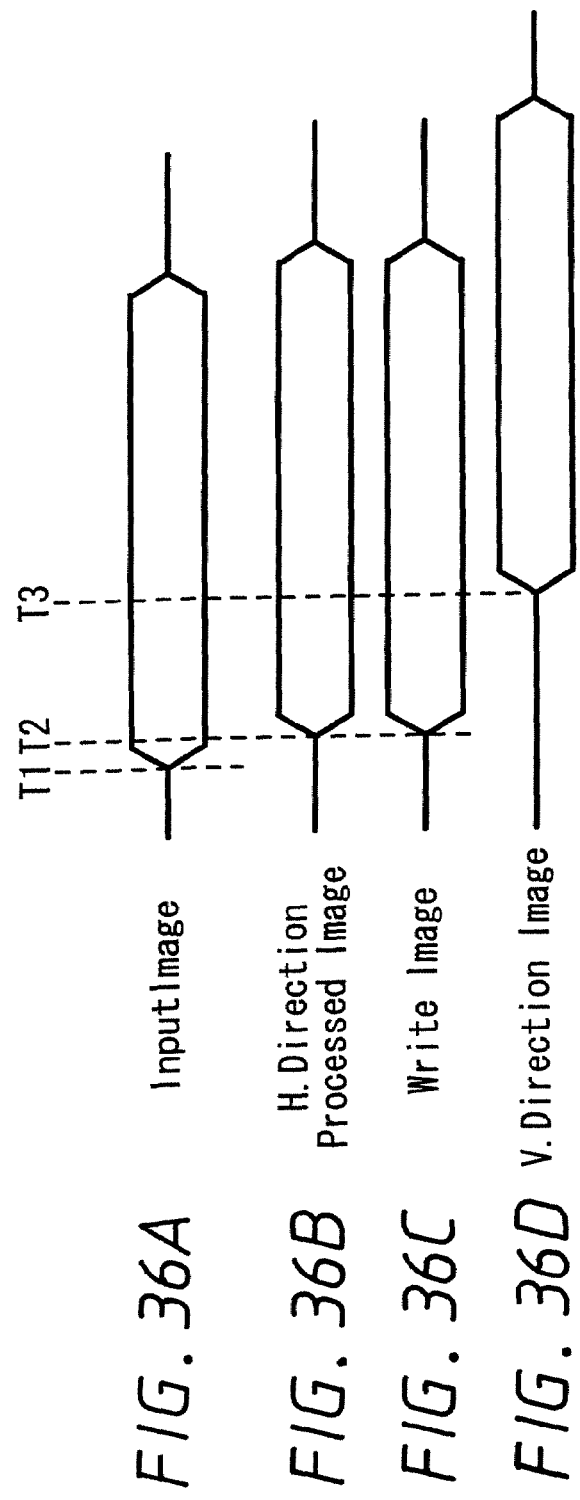
FIG. 36A  Input Image
FIG. 36B  H.Direction Processed Image
FIG. 36C  Write Image
FIG. 36D  V.Direction Image
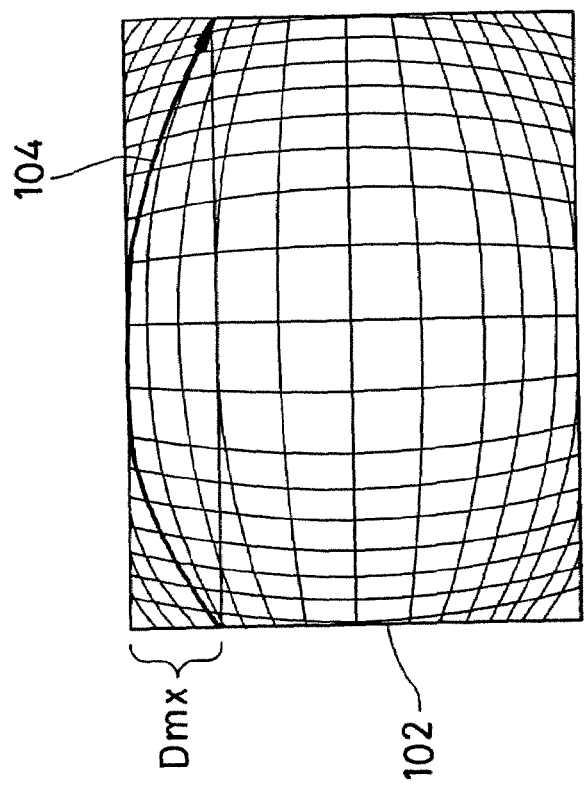
FIG. 37

2 Pixels in H. Direction

Pattern1

2 Pixels in H. Direction

Pattern2

2 Pixels in H. Direction

Pattern3

2 Pixels in H. Direction

2 Pixels in H. Direction

— Ip
— Ic
— Ip
— Ip

IMAGE PROCESSING METHOD, IMAGE PROCESSING APPARATUS AND IMAGE PICKUP APPARATUS AND DISPLAY APPARATUS SUITABLE FOR THE APPLICATION OF IMAGE PROCESSING METHOD

CROSS-REFERENCE TO RELATED APPLICATIONS

The present application is a division of application Ser. No. 10/760,674, filed on Jan. 21, 2004, which claims priority to Japanese Application No. JP 2003-022642, filed on Jan. 30, 2003. The entire contents of Ser. No. 10/760,674 is incorporated herein by reference.

BACKGROUND OF THE INVENTION

1. Field of the Invention

The present invention relates to an image processing method, an image processing apparatus for use with a video camera, a digital still camera and a silver halide camera and an image pickup apparatus and a display apparatus suitable for the application of this image processing method.

2. Description of the Related Art

So far distortion has been caused in an image picked up by a video camera, a digital still camera or a silver halide camera by influences of distortion characteristics of an image pickup lens. While such distortions are inconspicuous in highly-accurate and high-performance lenses, when an inexpensive lens or an optical zoom lens is in use, it is difficult to avoid influences exerted by distortions completely.

To avoid these defects, in recent years, an image processing apparatus has been proposed to correct distortions by signal processing.

FIG. 1 of the accompanying drawings is a block diagram showing an arrangement of an image processing apparatus 100 according to the related art. As shown in FIG. 1, the image processing apparatus 100 according to the related art includes a lens 200, an image pickup element 300, a data converting unit 400, a signal processing unit 500, an image memory 600, a control microcomputer 700, a synchronizing signal generating unit 800, a correction data table 1000, a recording unit 1100, a reproducing unit 1200 and a display-system processing unit 1300.

Outlines of operations of the above-described image processing apparatus 100 will be described with reference to a flowchart of FIG. 2.

Referring to FIG. 2, and following the start of operation, control goes to a step S1, whereat an analog image signal for an object 100 is inputted to the image processing apparatus 100 through the lens 200 and the image pickup element 300. Control goes to the next step S2, whereat the data converting unit 400 converts the analog image signal to a digital image signal to thereby generate an image 102.

In the next step S3, the signal processing unit 500 effects correction calculation on the distorted image 102 by using a distortion correction vector (hereinafter simply referred to as a "correction vector") stored in the correction data table 1000. In the next decision step S4, it is determined by the control microcomputer 700 whether or not inputting of the analog image signal should be ended. If inputting of the analog image signal is not ended as represented by a NO at the decision step S4, control goes back to the step S1. If a YES is outputted at the decision step S4, control is ended.

The outline of the operations of the related-art image processing apparatus 100 has been described so far, and those operations will be described below more fully.

Referring back to FIG. 1, the lens 200 focuses reflected light from an object 101 and maps the focused reflected light on the image pickup element 300. The image pickup element 300 is composed of a suitable device such as a CCD (charge-coupled device) and a CMOS (complementary metal oxide semiconductor) sensor, and captures the mapped image to generate the analog image signal. The data converting unit 400 converts the analog image signal supplied from the image pickup element 300 to provide the digital image signal to thereby generate the image 102. On the other hand, the control microcomputer 700 issues a command for instructing a predetermined operation in response to data inputted to an external user interface.

The signal processing unit 500 stores the digital image signal generated from the data converting unit 400 in the image memory 600 in response to the command supplied thereto from the control microcomputer 700. Then, the signal processing unit 500 reads out correction vectors corresponding to all pixels from the correction data table 1000 and obtains a necessary image signal from the image memory 600 in response to the correction information. Then, the signal processing unit 500 corrects a distortion of the image 102 outputted from the data converting unit 400 by effecting two-dimensional interpolation system geometric correction on the image signal.

The image signal generated by the signal processing unit 500 is supplied to the display-system processing unit 1300 and thereby the image 103 is displayed on a monitor (not shown). Alternatively, the image signal generated by the signal processing unit 500 is supplied to the recording unit 1100 and thereby the image is recorded on a media 1400 such as an external magnetic tape or a disc or a memory. The image signal recorded on the media 1400 is reproduced by the reproducing unit 1200 and the reproduced signal is supplied to the display-system processing unit 1300, whereby the reproduced image 103 is displayed on the monitor.

Further, the synchronizing signal generating unit 1600 generates an internal synchronizing signal in response to a clock signal CLK supplied thereto from the outside and supplies the thus generated internal synchronizing signal to the image pickup element 300, the data converting unit 400 and the signal processing unit 500.

In this manner, the distortion can be corrected by signal processing. In the technical fields of similar kind, the following cited references have been laid open.

[Cited Patent Reference 1]
  Japanese laid-open patent application No. 5-172531

[Cited Patent Reference 2]
  Japanese laid-open patent application No. 6-165024

[Cited Patent Reference 3]
  Japanese laid-open patent application No. 6-181530

The assignee of the present application has previously proposed Japanese patent application No. 2002-239865. FIG. 3 shows an arrangement of an image processing system that the assignee of the present application has previously proposed (Japanese patent application No. 2002-239865). In FIG. 3, elements and parts identical to those of FIG. 1 are denoted by identical reference numerals.

As shown in FIG. 3, the image processing system according to the previously-proposed patent application comprises the image processing apparatus 100, a pre-processing apparatus 1500 and the media 1400. The image processing apparatus 100 includes the lens 200, the image pickup element 300, the data converting unit 400, the signal processing unit 500, the image memory 600, the control microcomputer 700, a correction parameter decoder 1010, the synchronizing signal generating unit 1600, the recording unit 1100, the reproducing unit 1200 and the display-system processing unit 1300. The pre-processing apparatus 1500 includes a correction parameter encoder 900 and a correction parameter deriving unit 800.

The lens 200 focuses reflected light from the object 101 and maps the focused reflected light on the image pickup element 300. The lens 200 is not limited to a single focal point lens and may be a lens with zoom function. The image pickup element 300 is composed of a suitable means such as a CCD and a CMOS sensor and captures a mapped image in response to the internal synchronizing signal supplied thereto from the synchronizing signal generating unit 1600 to generate an analog image signal.

The data converting unit 400 is connected to the image pickup element 300 and converts the analog image signal generated from the image pickup element 300 in response to the internal synchronizing signal supplied thereto from the synchronizing signal generating unit 1600 into a digital image signal to thereby generate the image 102. The signal processing unit 500 is connected to the control microcomputer 700, the data converting unit 400, the image memory 600, the correction parameter decoder 1010 and the synchronizing signal generating unit 1600.

Then, the signal processing unit 500 stores the digital image signal supplied thereto from the data converting unit 400 in the image memory 600 in response to the command supplied from the control microcomputer 700 and also effects correction processing on the stored image signal based on the correction amount parameter supplied from the correction parameter decoder 1010. Then, the signal processing unit 500 supplies an image signal obtained by the above correction to the display-system processing unit 1300 and the recording unit 1100.

On the other hand, the correction parameter deriving unit 800 calculates in advance correction amount vectors corresponding to respective positions of all pixels from data concerning distortion of the lens 200. The correction parameter encoder 900 is connected to the correction parameter deriving unit 800 and the user interface and compresses (encodes) the correction amount vectors supplied from the correction parameter deriving unit 800 in response control signals Ln, Lw supplied from the user interface and supplies compressed data Pc to the correction parameter decoder 1010.

Although calculation and encoding in the correction parameter deriving unit 800 become calculations having very large calculation loads, such calculations may be executed separately by other suitable means such as a personal computer, and hence may not exert an influence upon real-time processing done by the image processing apparatus 100. Information such as the compressed data Pc supplied from the correction parameter encoder 900 is also stored in the distortion correction memory 1020 so that information stored in the distortion correction memory 1020 is used in the processing made in actual practice by the correction parameter decoder 1010.

Further, the control microcomputer 700 supplies a command for instructing predetermined operations and the like to the signal processing unit 500 in response to the control signal from the user interface and also supplies position information of the lens 200 to the correction parameter decoder 1010.

The correction parameter decoder 1010 is connected to the correction parameter encoder 900, the distortion correction memory 1020, the control microcomputer 700 and the signal processing unit 500. Then, in response to the information supplied from the control microcomputer 700 and the like, the correction parameter decoder 1010 expands (decodes) the thus encoded compressed data Pc supplied from the correction parameter encoder 900 or the distortion correction memory 1020 to provide correction amount parameters corresponding to respective pixels and supplies the correction parameters to the signal processing unit 500.

The recording unit 1100 is connected to the signal processing unit 500 and records the image signal generated from the signal processing unit 500 on the media (recording medium) 1400 such as a magnetic tape, a flexible disc, a DVD (digital versatile disc), a hard disk and a memory. Alternatively, the image signal generated by the signal processing unit 500 may be recorded on the media 1400 by using a suitable means such as the Internet and wireless communication.

The reproducing unit 1200 is connected to the media 1400 and reproduces the image signal from the media 1400, thereby supplying the reproduced image signal to the display-system processing unit 1300. The display-system processing unit 1300 is connected to the signal processing unit 500 and the reproducing unit 1200 and displays the image signal supplied from the signal processing unit 500 or the reproducing unit 1200 to the monitor (not shown).

The synchronizing signal generating unit 800 generates an internal synchronizing signal in response to a clock signal CLK supplied thereto from the outside and supplies the thus generated internal synchronizing signal to the image pickup element 300, the data converting unit 400 and the signal processing unit 500.

Further, the details of the correction parameter encoder 900 will be described below. As shown in FIG. 4, a lattice dividing unit 901 determines a dividing method of distortion correction coordinates of the whole picture. A polynomial of degree n coefficient deriving unit 902 expresses all distortion correction coordinates of respective lattice segments divided by the lattice dividing unit 901 by function with the position on the lattice segment and approximates all distortion correction coordinates by target division polynomial of degree n. The distortion correction parameters are data retained in order to carry out distortion correction processing.

Polynomial of degree n is an equation expressed as:

$$F(x)=a(n)*x^n+a(n-1)*x^{(n-1)}+a(n-2)*x^{(n-2)}\ldots+a(0)$$

The division polynomial of degree n is to express only an interval divided by a certain effective range with polynomial of degree n. The lattice segment represents a lattice segment divided by lattice segments (segment between lattice points).

For reference, the dividing method will be described below with reference to FIGS. 5A, 5B and FIG. 6. Specifically, when the lattice is divided, there are available a method of using the whole picture as a picture dividing target as shown in FIG. 5A and a method of using only ¼ of picture, as shown in FIG. 5B, because the distortion of lens has point symmetry. These two methods may be selected based upon distortion characteristics.

As a method of dividing the distortion correction coordinates into lattices, mainly three methods are proposed. Specifically, the equal dividing method of the first method is to equally divide the distance from the center to the end by the number of divided lattices as shown on the upper right of FIG. 6. The dividing method using power of 2 of the second method is to divide the distance from the center to the end at every power of 2 as shown on the middle of FIG. 6. This dividing method using power of 2 is able to alleviate calculation processing.

Further, the optimum value dividing method of the third method is to use distortion correction coordinates of the upper end and right end of the picture where distortions of figure shown on the upper left in FIG. 6 are largest to create function h(x) in which Y axis represents the distortion correction coordinates and X axis represents the distance from the center as shown on the lower right of FIG. 6. Then, by using the division polynomial of degree n, a dividing position in which an error between the function h(x) and the division polynomial of degree n may be minimized is searched for.

With respect to the method of calculating the polynomial of degree n, FIGS. 7A to 7D show an example of the division polynomial of degree n for reference. Specifically, as shown in FIG. 7A, one lattice segment is selected. Here, assuming that x1=x0+1, a division polynomial of degree 2 that passes through three points of (x0, h(x0)), (x1, h(x1)), (x2, h(x2)) is calculated. As shown in FIGS. 7B, 7C, between both ends x0, x2 of the selected lattice segment, x1 is shifted one by one from x0 to x2 and the above-described calculation is carried out until the point of x2−1. In this manner, the division polynomial of degree 2 of which the error relative to the original function is smallest is calculated from all division two-dimensional polynomial is calculated. Further, the above-mentioned processing is carried out with respect to all lattice segments shown in FIG. 7D.

FIG. 8 is a flowchart showing operations of the parameter encoder 900. Referring to FIG. 8, and following the start of operation, control goes to a step S11, whereat distortion correction coordinates relative to all pictures on the target picture are read out. In the next step S12, the picture is divided into lattices in accordance with the lattice dividing method. Then, control goes to a step S14, whereat one lattice segment encircled by lattice points is selected.

Control goes to the next step S15, whereat y axis represents all distortion correction coordinates on the selected lattice segment and x axis represents the distance on the lattice line to create a discrete function, and the discrete function is approximated by the division polynomial of degree n. Further, at a step S18, n coefficients of division polynomial of degree n are transferred to the distortion correction memory 1020 as decoded distortion correction parameters. Then, control goes the next decision step S19, whereat it is determined whether or not deriving of distortion correction parameters with respect to all lattice segments is ended. If deriving of distortion correction parameters is not yet finished as represented by a NO at the decision step S19, then control goes back to the step S14. If on the other hand deriving of distortion correction parameters is finished as represented by a YES at the decision step S19, then control is ended.

The coefficients of the division polynomial of degree n that is the thus calculated approximate expression are stored in the distortion correction memory 1020 as distortion correction parameters. The lattice information is stored in the lattice information buffer 1001 disposed within the correction parameter decoder 1000.

Further, the correction parameter decoder 1000 is the block that decodes the distortion correction coordinates of respective points of the picture by the distortion correction parameters obtained from the correction parameter encoder 900 in accordance with the request from the signal processing unit 500. The correction parameter decoder 1000 will be described in detail with reference to FIG. 9.

As shown in FIG. 9, lattice information indicative of division positions of X,Y directions are inputted to the correction parameter decoder 1000 from the correction parameter encoder 900. The inputted lattice information is stored in the lattice information buffer 1001. Then, when the correction parameter decoder 1000 receives request of coordinates (xt, yt) which should be corrected in distortion from the signal processing unit 500, the lattice determining unit 1002 compares lattices containing target coordinates (xt, yt) with lattice position information of the lattice information buffer 1001 and calculates the compared result.

Further, the lattice determining unit 1002 generates addresses at which the respective coefficients of the division polynomial of degree n that are four lattice segments encircling the calculated lattice and requests the distortion correction memory 1020 to read the thus generated addresses. At the same time, the lattice determining unit 1002 supplies the determined lattice position information to the normalizing unit 1003. The normalizing unit 1003 calculates relative coordinates (xt', yt') used in the four lines of the encircled lattice from the target coordinates (xt, yt), the lattice positions and lattice information.

The function converting unit 1005 converts the coefficient of the function received from the distortion correction memory 1020 into the form of the function that is used in the plane interpolation. Further, the plane interpolation unit 1006 creates a plane function by using the plane interpolation obtained by the function converting unit 1005 and obtains respective coordinates from the normalizing unit 1003 to thereby calculate desired distortion correction coordinates. Then, calculated results are supplied to the signal processing unit 500.

Accordingly, the flowchart of the correction parameter decoder 1000 is presented as shown in FIG. 10. Referring to FIG. 10, and following the start of operation, at a step S21, lattice information is read as initialization. Further, at a step S22, the signal processing unit 500 is placed in the standby mode (WAIT) until the distortion request signal is issued.

When it is requested at the step S22 to decode the distortion correction parameters, the distortion correction memory 1020 receives coordinates of a target point from the signal processing unit 500. Further, at a step S23, a lattice containing the coordinates of the target point is determined. At a step S24, relative coordinates are calculated from lattice lines of the target point. At the next step S25, one line amount is selected from four line amounts encircled as the lattice and distortion correction parameters (coefficients) of the division polynomial of degree n are read.

If processing concerning the four line amount is not yet ended as represented by a NO at the decision step S27, then control goes back to the step S25. Further, at a step S28, a plane function made by the four division polynomials of degree n is derived. Then, at a step S29, distortion correction coordinates of the target point are derived by using the plane function, and control goes back to the step S22, whereat the signal processing apparatus 500 is set to the standby mode (WAIT) until the next request signal is supplied.

The target points are pixels that are to be corrected in distortion by the signal processing unit 500. Since the distortion correction coordinates are different at respective points, all target points can be held by the register or can be obtained by using a variety of calculations whose circuit scales are larger than functions for use with lens.

However, the above-mentioned signal processing apparatus encounters with problems in which a memory capacity of a memory is large, real-time processing being difficult. Specifically, since the memory capacity is large, the scale of hardware is large. Hence, reduction of power consumption is difficult and the related-art signal processing apparatus is costly. Furthermore, the related-art signal processing apparatus cannot cope with the case in which characteristics of distortion of an image pickup lens are changed such as when the position of optical zoom is fluctuated or when a lens is exchanged.

SUMMARY OF THE INVENTION

In view of the aforesaid aspects, it is an object of the present invention to provide an image processing method, an image processing apparatus and an image pickup apparatus, a display apparatus suitable for the application of the image processing method according to the present invention and in which the aforesaid defects can be obviated.

According to the present invention, the lattice position determined by lattice dividing means is used and data necessary for calculation is compressed by using crossing positions of lattice and data obtained from parameter deriving means. Thus, a capacity of a necessary memory can be reduced. According to the present invention, assuming that the picture is divided in the x direction by m and also divided in the y direction by n, then memory capacity reduction effect of $3n*m+n+m-1$ can be achieved.

Specifically, assuming that the picture is divided by polynomial of degree k, divided in the x direction by m and also divided in the y direction by n, then as shown in FIG. 11, we can have the divided lattice line $n*(m+1)+m*(n+1)$. In this case, according to the present invention, the number of required distortion correction parameters can be reduced from the related-art $(k+1)\{n*(m+1)+m*(n+1)\}$ to the inventive $(n+1)*(m+1)+(k-1)\{n*(m+1)+m*(n+1)\}$, and hence the memory capacity reduction effect of $3n*m+n+m-1$ can be achieved.

According to an aspect of the present invention, there is provided an image processing method realized by using an input device for inputting an image, a signal processing unit for effecting signal processing on the image, a parameter deriving unit for deriving distortion correction data, a lattice dividing unit for dividing a picture with lattices, a parameter compressing unit for compressing data necessary for calculation by using lattice positions determined by the lattice dividing unit, positions at which the lattices are crossing each other and data obtained from the parameter deriving unit, a parameter holding unit for holding the compressed necessary data, a parameter decoding unit for expanding compressed data at every division and using the expanded data to correct distortion, a control unit for controlling the signal processing and decoding operation and an output unit for outputting or saving an image.

According to other aspect of the present invention, there is provided an image processing apparatus which is comprised of an input device for inputting an image, a signal processing unit for effecting signal processing on the image, a parameter deriving unit for deriving distortion correction data, a lattice dividing unit for dividing a picture with lattices, a parameter compressing unit for compressing data necessary for calculation by using lattice positions determined by the lattice dividing unit, positions at which the lattices are crossing each other and data obtained from the parameter deriving unit, a parameter holding means for holding the compressed necessary data, a parameter decoding unit for expanding compressed data at every division and using the expanded data to correct distortion, a control unit for controlling the signal processing and decoding operation and an output unit for outputting or saving an image.

According to a further aspect of the present invention, there is provided an image pickup apparatus suitable for the application of an image processing method realized by using an input device for inputting an image, a signal processing unit for effecting signal processing on the image, a parameter deriving unit for deriving distortion correction data, a lattice dividing means for dividing a picture with lattices, a parameter compressing unit for compressing data necessary for calculation by using lattice positions determined by the lattice dividing unit, positions at which the lattices are crossing each other and data obtained from the parameter deriving unit, a parameter holding unit for holding the compressed necessary data, a parameter decoding unit for expanding compressed data at every division and using the expanded data to correct distortion, a control unit for controlling the signal processing and decoding operation and an output unit for outputting or saving an image.

In accordance with yet a further aspect of the present invention, there is provided a display apparatus suitable for the application of an image processing method realized by using an input device for inputting an image, a signal processing unit for effecting signal processing on the image, a parameter deriving unit for deriving distortion correction data, a lattice dividing unit for dividing a picture with lattices, a parameter compressing unit for compressing data necessary for calculation by using lattice positions determined by the lattice dividing unit, positions at which the lattices are crossing each other and data obtained from the parameter deriving unit, a parameter holding unit for holding the compressed necessary data, a parameter decoding unit for expanding compressed data at every division and using the expanded data to correct distortion, a control unit for controlling the signal processing and decoding operation and a display device for displaying an image.

BRIEF DESCRIPTION OF THE DRAWINGS

FIGS. 5A and 5B are diagrams useful for explaining an outline of operations of the lattice dividing unit shown in FIG. 4, respectively;

FIGS. 7A to 7D are diagrams useful for explaining an outline of operations of the lattice dividing unit shown in FIG. 4, respectively;

FIGS. 14A and 14B are diagrams to which reference will be made in explaining an outline of one-dimensional interpolation calculation executed by the signal processing unit shown in FIG. 13, respectively;

FIGS. 19A to 19I are diagrams showing an example in which a picture is converted at a magnification of ×1 by the horizontal one-dimensional interpolation, respectively;

FIGS. 20A to 20N are timing charts showing operation timings in which a picture is converted at a magnification of ×1 by the horizontal one-dimensional interpolation shown in FIGS. 19A to 19I, respectively;

FIGS. 21A to 21I are diagrams showing an example of horizontal enlargement conversion in the horizontal one-dimensional interpolation, respectively;

FIGS. 22A to 22M are timing charts showing operation timings of the horizontal enlargement conversion shown in FIGS. 21A to 21I, respectively;

FIGS. 25A, 25B and 25C are diagrams to which reference will be made in explaining operations shown in the flowcharts of FIGS. 23 and 24 more fully, respectively;

FIGS. 33A, 33B and 33C are diagrams used to explain the operations shown in FIGS. 30 and 31, respectively;

FIGS. 36A to 36D are timing charts showing timings of horizontal one-dimensional interpolation processing and vertical one-dimensional interpolation processing, respectively;

FIG. 37 is a diagram to which reference will be made in explaining a memory capacity necessary for executing the horizontal one-dimensional interpolation processing and the vertical one-dimensional interpolation processing;

DESCRIPTION OF THE PREFERRED EMBODIMENTS

Figure 1:
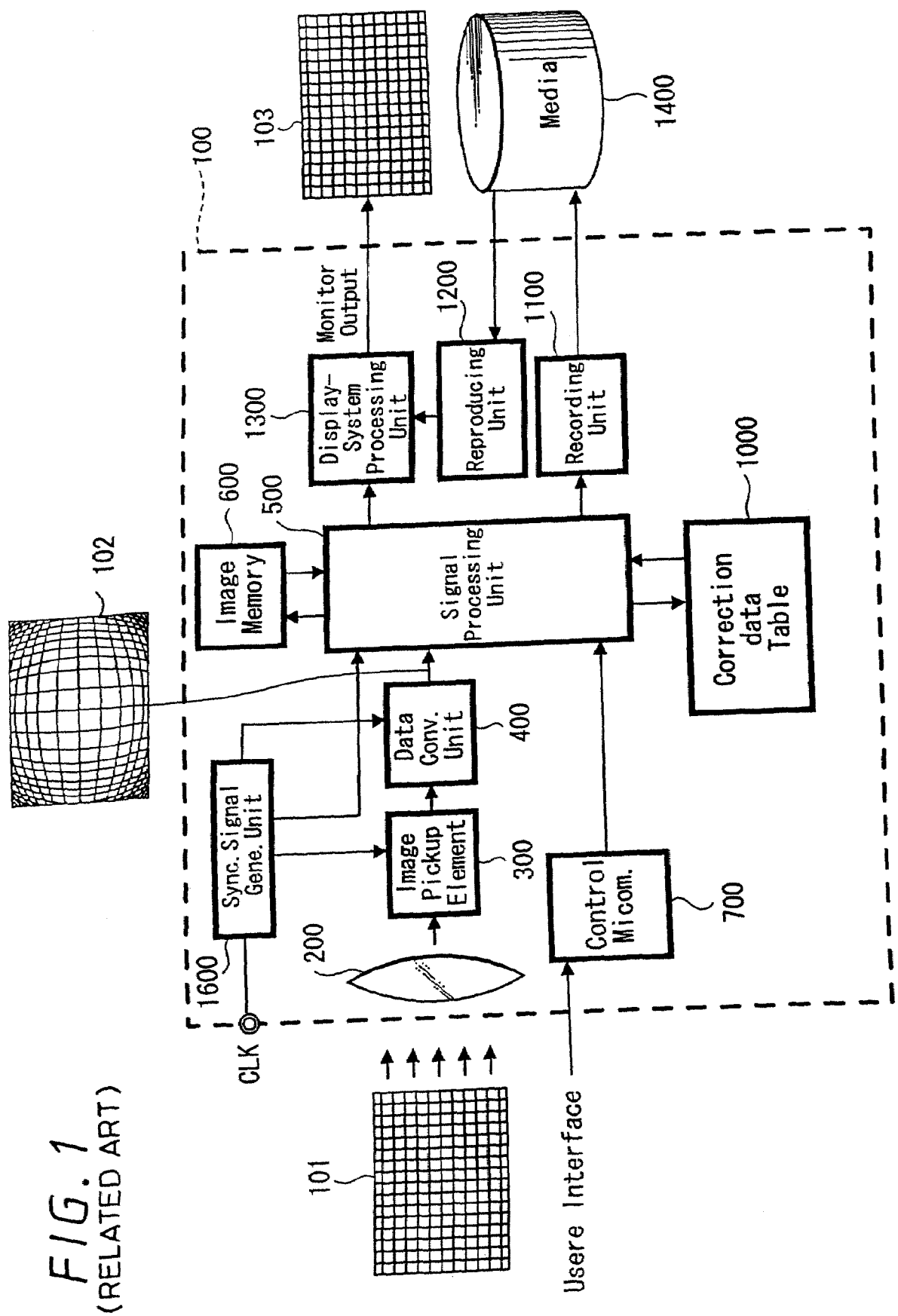
FIG. 1 is a block diagram showing an arrangement of an image processing apparatus according to the related art.
Figure 2:
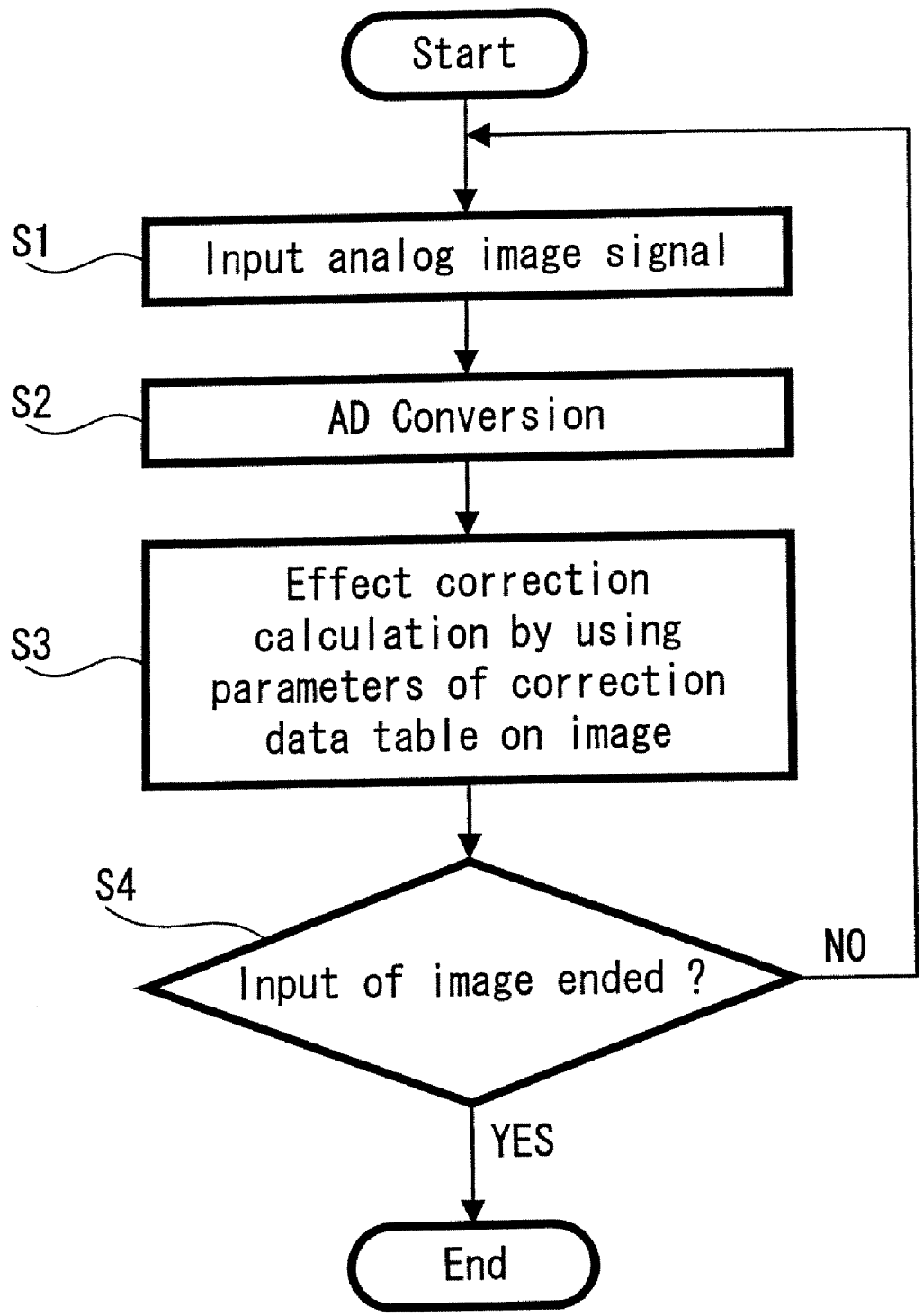
FIG. 2 is a flowchart to which reference will be made in explaining an outline of operations of the image processing apparatus shown in FIG. 1.

An embodiment of the present invention will be described below in detail with reference to the drawings. In the drawings, identical reference numerals denote identical elements and parts.

Figure 3:
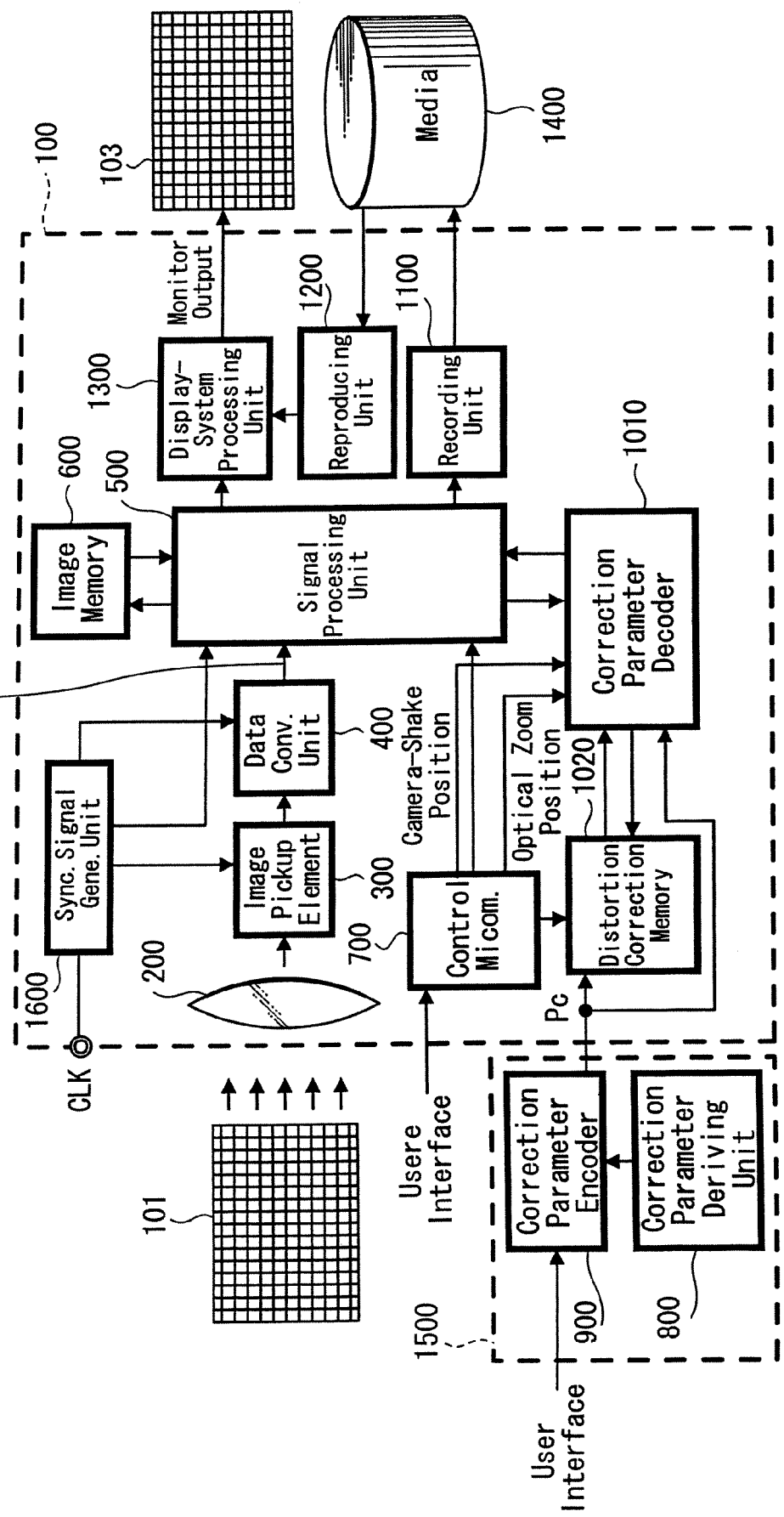
FIG. 3 is a block diagram showing an arrangement of an image processing system that has been proposed previously.
Figure 4:
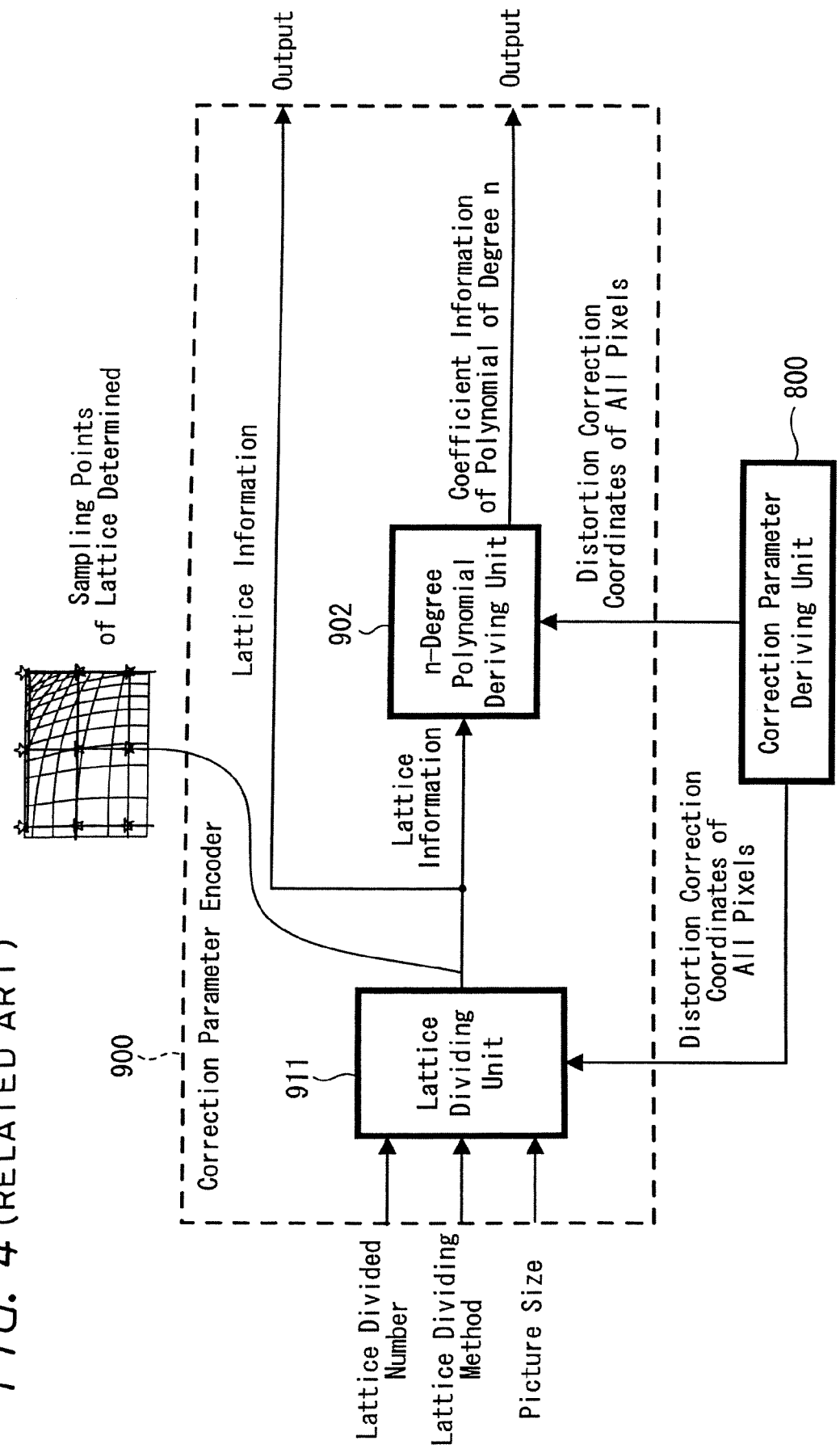
FIG. 4 is a block diagram showing an arrangement of a correction parameter encoder shown in FIG. 3.
Figure 6:
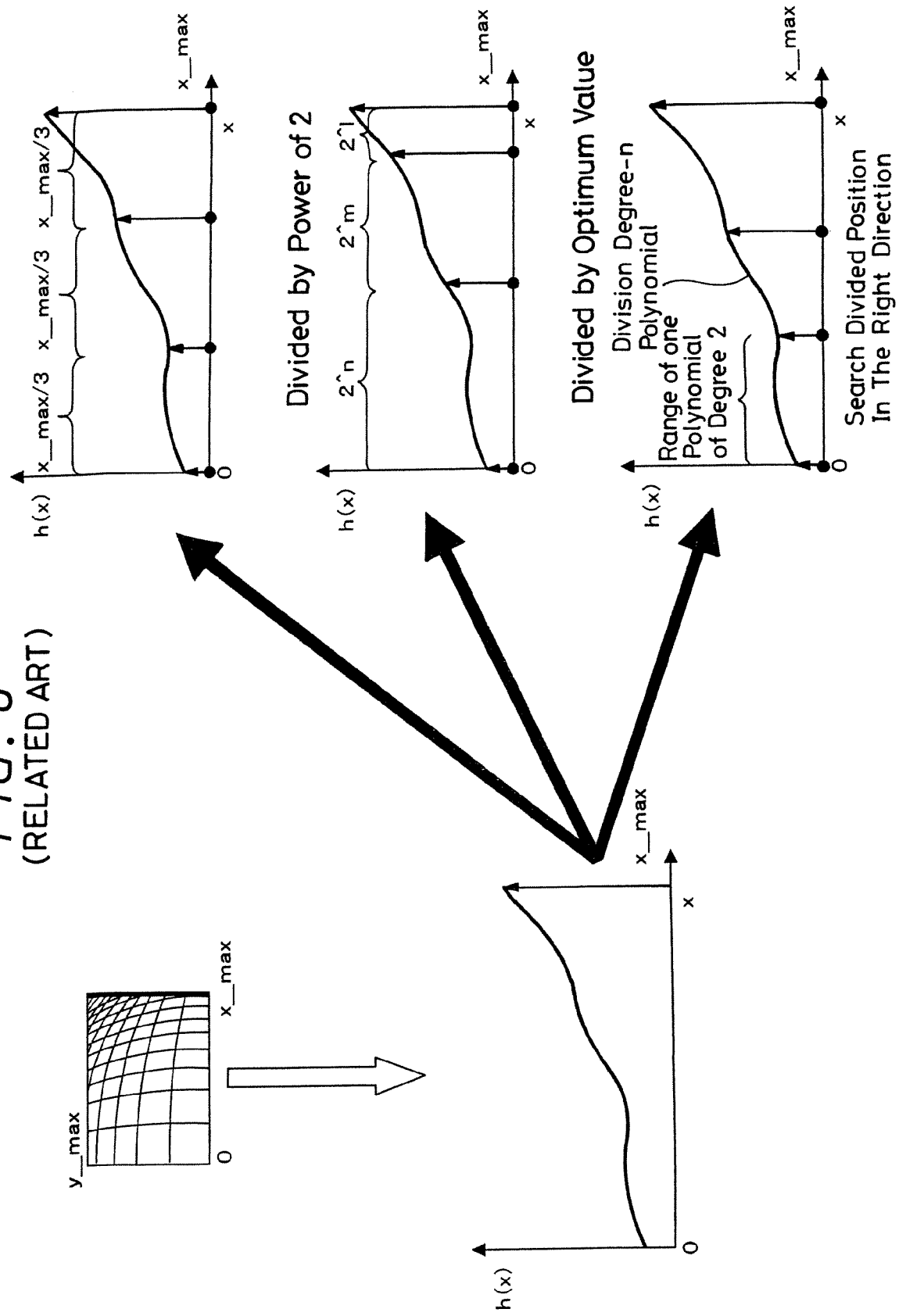
FIG. 6 is a diagram useful for explaining an outline of operations of the lattice dividing unit shown in FIG. 4.
Figure 12:
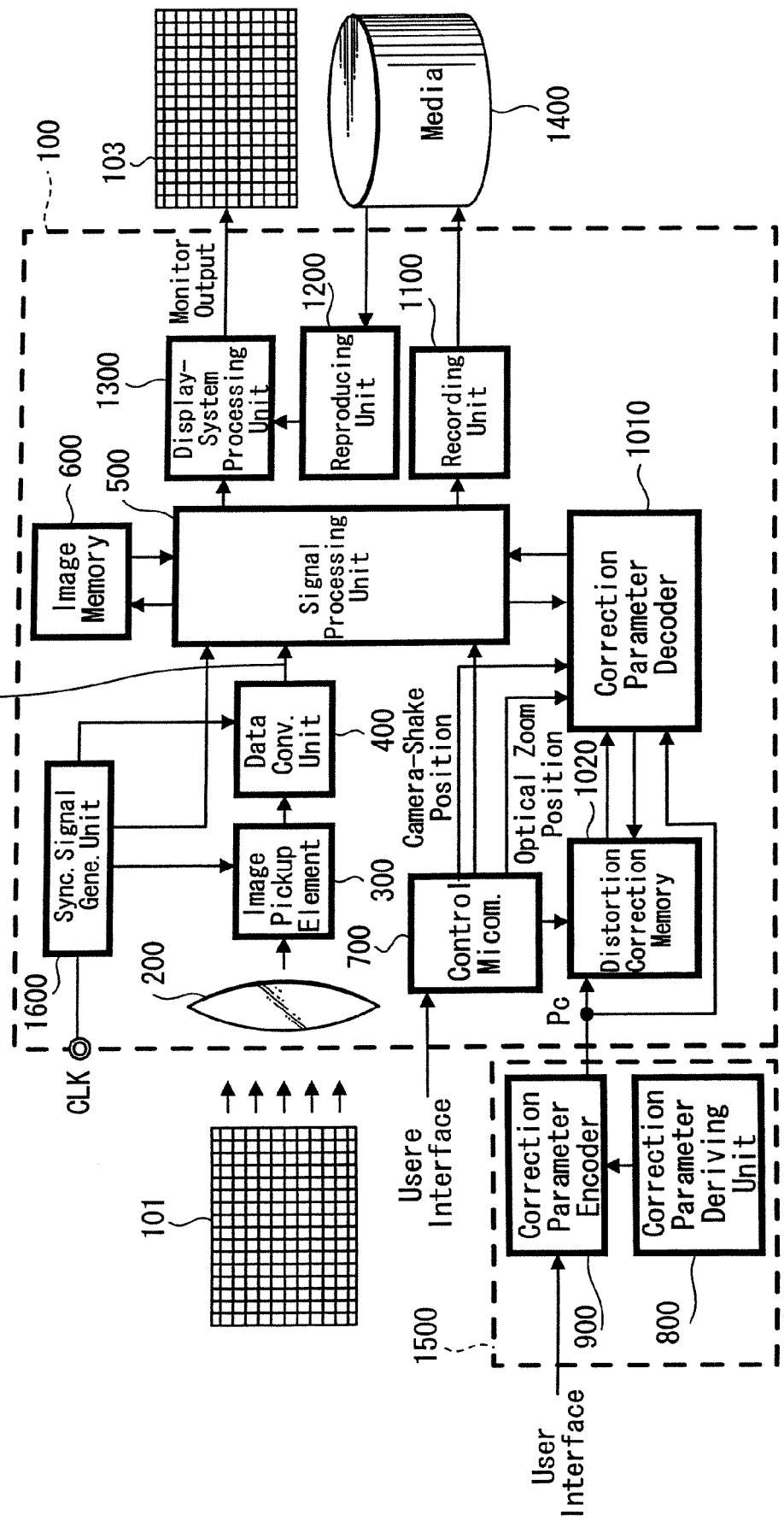
FIG. 12 is a block diagram showing an arrangement of an image processing system according to an embodiment of the present invention.

FIG. 12 is a block diagram showing an arrangement of an image processing system according to an embodiment of the present invention. The arrangement of the hardware shown in FIG. 12 is exactly the same as the arrangement of the image processing system that the assignee of the present invention has previously proposed (see FIG. 3). While the image processing apparatus according to the present invention is realized by mainly software, this software comprising the image processing apparatus of the present invention will be described below in the form of a functional block diagram for simplicity.

As shown in FIG. 12, the image processing system according to this embodiment comprises the image processing apparatus 100, the pre-processing apparatus 1500 and the media 1400. The image processing apparatus 100 includes the lens 200, the image pickup element 300, the data converting unit 400, the signal processing unit 500, the image memory 600, the control microcomputer 700, the correction parameter decoder 1010, the synchronizing signal generating unit 1600, the recording unit 1100, the reproducing unit 1200 and the display-system processing unit 1300. The pre-processing apparatus 1500 includes the correction parameter encoder 900 and the correction parameter deriving unit 800.

The lens 200 focuses reflected light from the object 101 and maps the focused reflected light on the image pickup element 300. The lens 200 is not limited to the single focal point lens but may be a lens with zoom function. The image pickup element 300 is comprised of a suitable means such as a CCD and a CMOS sensor, and captures a mapped image in response to the internal synchronizing signal supplied from the synchronizing signal generating unit 1600 to thereby generate an analog image signal.

The data converting unit 400 is connected to the image pickup element 300 and converts the analog image signal generated from the image pickup element 300 into the digital image signal to generate the image 102. The signal processing unit 500 is connected to the control microcomputer 700, the data converting unit 400, the image memory 600, the correction parameter decoder 1010 and the synchronizing signal generating unit 1600.

The signal processing unit 500 stores the digital image signal supplied from the data converting unit 400 in the image memory 600 in response to the command supplied from the control microcomputer 700. Simultaneously, the signal processing unit 500 effects correction processing on the stored image signal by correction amount parameters supplied from the correction parameter decoder 1010. Then, the signal processing unit 500 supplies the image signal, obtained by this correction, to the display-system processing unit 1300 and the recording unit 1100.

On the other hand, the correction parameter deriving unit 800 calculates in advance correction amount vectors corresponding to respective positions of all pixels from data and the like concerning the distortion of the lens 200. The correction parameter encoder 900 is connected to the correction parameter deriving unit 800 and the user interface, and compresses (encodes) the correction amount vectors supplied from the correction parameter deriving unit 800 in response to the control signals Ln, Lw supplied thereto from the user interface, thereby supplying the compressed data Pc to the parameter decoder 1010.

Although calculation and encoding in the correction parameter deriving unit 800 become calculations with very large loads, such calculations may be separately made by a suitable means such as a personal computer and may not influence real time processing done by the image processing apparatus 100. Information such as the compressed data Pc supplied from the correction parameter encoder 900 is stored in the distortion correction memory 1020. Information stored in the distortion correction memory 1020 is used in actual processing at the correction parameter decoder 1010.

Further, the control microcomputer 700 outputs the command and the like for instructing predetermined operations to the signal processing unit 500 in response to the control signal from the user interface, and supplies position information of the lens 200 and the like to the correction parameter decoder 1010.

The correction parameter decoder 1010 is connected to the correction parameter encoder 900, the distortion correction memory 1020, the control microcomputer 700 and the signal processing unit 500. In response to the information supplied from the control microcomputer 700 and the like, the correction parameter decoder 1010 expands (decodes) the encoded compressed data Pc supplied from the correction parameter encoder 900 or the distortion correction memory 1020 to provide correction amount parameters and supplies the correction amount parameter to the signal processing unit 500.

The recording unit 1100 is connected to the signal processing unit 500 and records the image signal generated from the signal processing unit 500 on the media (recording medium) 1400 such as the magnetic tape, the flexible disc, the DVD (digital versatile disc), the hard disk and the memory. Alternatively, the image signal generated from the signal processing unit 500 may be recorded on the media 1400 by a suitable means such as the Internet and wireless communication.

The reproducing unit 1200 is connected to the media 1400 and reproduces the image signal from the media 1400 and supplies the reproduced image signal to the display-system processing unit 1300. The display-system processing unit 1300 is connected to the signal processing unit 500 and the reproducing unit 1200 and displays the image signal supplied from the signal processing unit 500 or the reproducing unit 1200 on the monitor (not shown).

The synchronizing signal generating unit 800 generates the internal synchronizing signal in response to the clock signal CLK supplied thereto from the outside, and supplies the thus generated internal synchronizing signal to the image pickup element 300, the data converting unit 400 and the signal processing unit 500.

Figure 13:
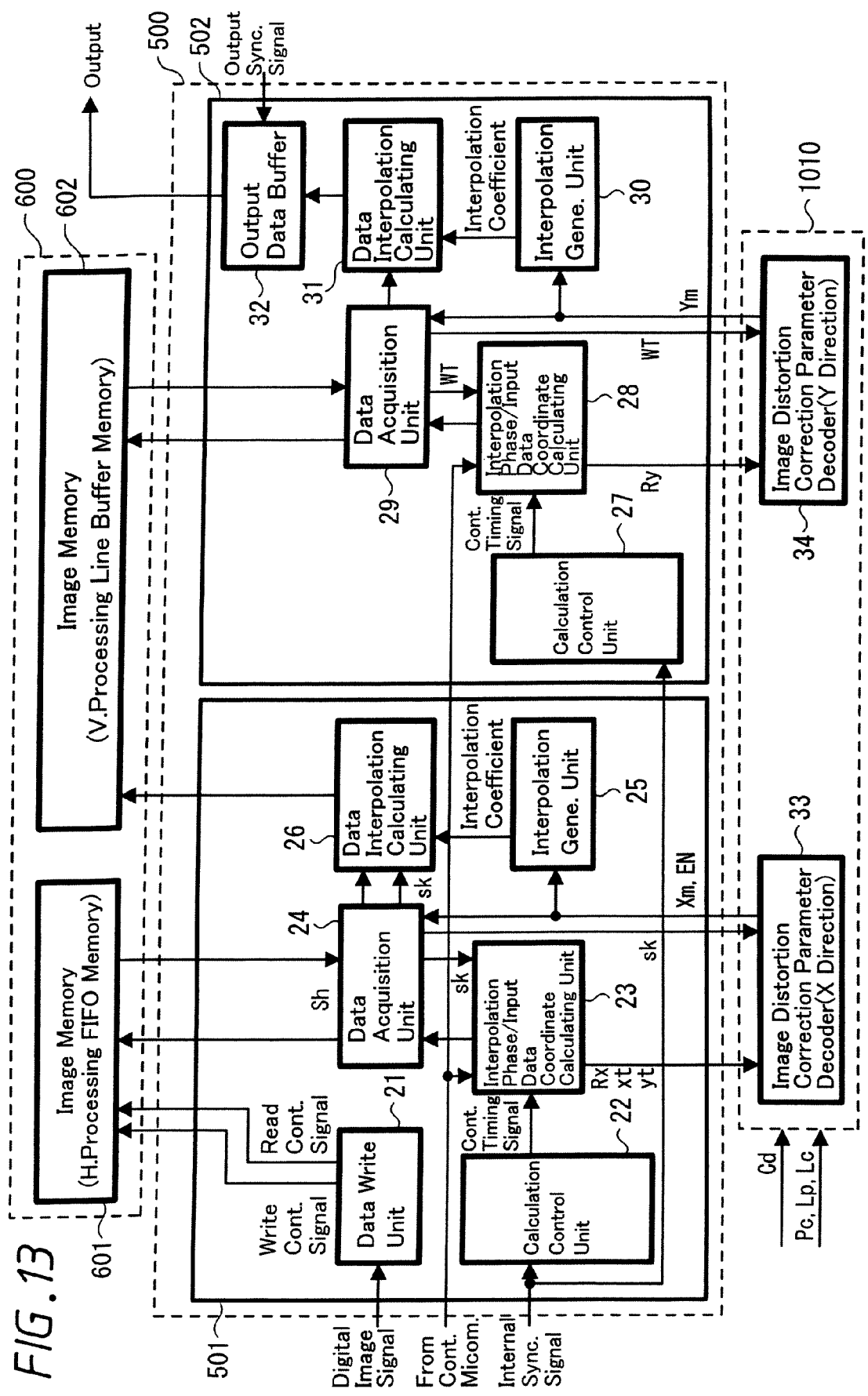
FIG. 13 is a block diagram showing an arrangement of a signal processing unit shown in FIG. 12.

Further, FIG. 13 is a block diagram showing the arrangement of the signal processing unit 500 shown in FIG. 12. As shown in FIG. 13, the signal processing unit 500 includes a horizontal one-dimensional interpolating unit 501 and a vertical one-dimensional interpolating unit 502. The image memory 600 includes an image memory 601 composed of a horizontal processing FIFO (fast-in fast-out) memory and an image memory 602 composed of a vertical processing line buffer. The correction parameter decoder 1010 includes an x-direction image distortion correction parameter decoder 33 and a y-direction image distortion correction parameter decoder 34.

The image memory 602 may have a capacity large enough to store data of data amount corresponding to minimum lines necessary for realizing the vertical direction distortion correction, which will be described later on. It is customary that the above-described memory capacity is determined in response to a frequency of an output synchronizing signal supplied to the output data buffer 32.

Then, the horizontal one-dimensional interpolating unit 501 includes a data writing unit 21, a calculation control unit 22, an interpolation phase/input data coordinate calculating unit 23, a data acquisition unit 24, an interpolation coefficient generating unit 25 and a data interpolation calculating unit 26. The vertical one-dimensional interpolating unit 502 includes a calculation control unit 27, an interpolation phase/input data coordinate calculating unit 28, a data acquisition unit 29, an interpolation coefficient generating unit 30, a data interpolation calculating unit 31 and an output data buffer 32.

The data writing unit 21 is connected to the data converting unit 400, and the calculation control unit 22 is connected to the synchronizing signal generating unit 800. The interpolation phase/input data coordinate calculating unit 23 is connected to the calculation control unit 22 and the control microcomputer 700. The data acquisition unit 24 is connected to the interpolation phase/input data coordinate calculating unit 23, the image memory 601 and the image distortion correction parameter decoder 33. The data interpolation calculating unit 26 is connected to the data acquisition unit 24 and the interpolation coefficient generating unit 25.

The image memory 601 is connected to the data writing unit 21 and the data acquisition unit 24, and the image memory 602 is connected to the data interpolation calculating unit 26 and the data acquisition unit 29. The image distortion correction parameter decoder 33 is connected to the interpolation phase/input data coordinate calculating unit 23 and the data acquisition unit 24.

On the other hand, the calculation control unit 27 is connected to the synchronizing signal generating unit 1600, and the interpolation phase/input data coordinate calculating unit 28 is connected to the calculation control unit 27 and the control microcomputer 700. The data acquisition unit 29 is connected to the interpolation phase/input data coordinate calculating unit 28, the image memory 602 and the image distortion correction parameter decoder 34, and the interpolation coefficient generating unit 30 is connected to the image distortion correction parameter decoder 34. The data interpolation calculating unit 31 is connected to the data acquisition unit 29 and the interpolation coefficient generating unit 30, and the output data buffer 32 is connected to the data interpolation calculating unit 31 and the synchronizing signal generating unit 1600.

The output node of the output data buffer 32 is connected to the display-system processing unit 1300 and the recording unit 1100. The image distortion correction parameter decoder 34 is connected to the interpolation phase/input data coordinate calculating unit 28.

In the signal processing unit 500 having the above-described arrangement, first, the horizontal one-dimensional interpolating unit 501 executes one-dimensional interpolation calculation of the horizontal direction (x direction), and the vertical one-dimensional interpolating unit 502 execute one-dimensional interpolation calculation of the vertical direction (y direction). An outline of the calculation done by the signal processing unit 500 will be described with reference to FIGS. 14A and 14B. FIGS. 14A and 14B illustrate the case in which image data of respective points of the output image are determined by using totally 16 image data of (4×4) image data composed of four image data arrayed in the x direction and y direction.

FIG. 14A shows the case in which image data of respective points B10 to B40 are calculated in response to points B1 to B4 comprising an original image with distortion by the x-direction correction. FIG. 14B shows the case in which image data of points b1 to b4 are further calculated in response to the points B10 to B40 by the y-direction correction.

To be more concrete, the image data of the point B10 is calculated by effecting the predetermined interpolation calculation on the image data of four lattice points across the point B1 continuing in the horizontal direction, for example. Similarly, the image data of the respective points B20 to B40 are calculated in response to the points B2 to B4, respectively.

Next, as shown in FIG. 14B, with respect to the point B30, for example, the image data of the point b3 is calculated by effecting predetermined interpolation calculations on image data in four lattice points (points K20 to K23) within a dashed-line across the point B30 continuing in the vertical direction. Similarly, the image data of the respective points b1, b2, b4 are calculated in response to the points B10, B20, B40.

Figure 15:
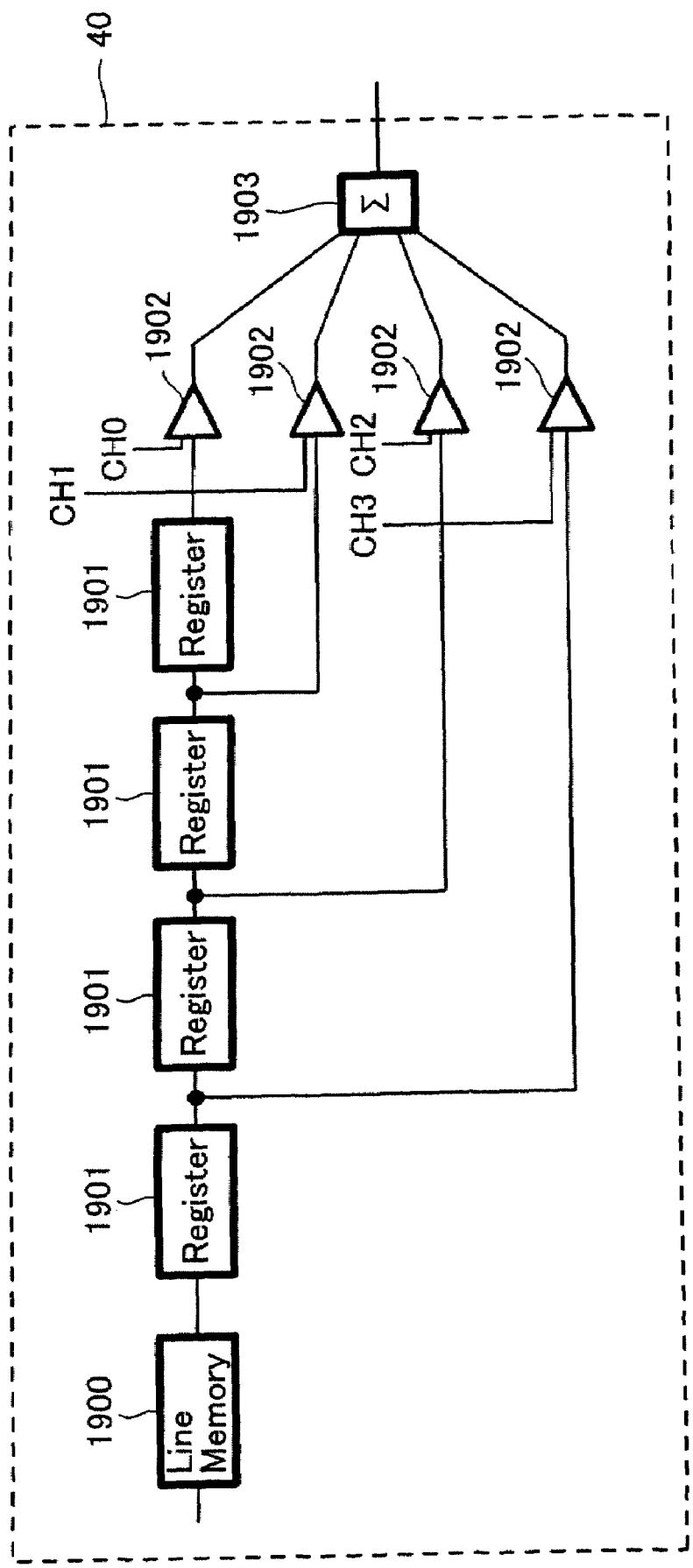
FIG. 15 is a diagram showing an arrangement of a horizontal processing circuit contained in the data interpolation calculating unit shown in FIG. 13.

The above-described one-dimensional interpolation calculation in the horizontal direction is realized by a horizontal processing circuit 40, shown in FIG. 15, included in the data interpolation calculating unit 26. As shown in FIG. 15, the horizontal processing circuit 40 includes four registers 1901 connected in series to an output node of a line memory 1900, four multiplying circuits 1902 for multiplying data outputted from the respective registers 1901 with corresponding interpolation coefficients CHk (k=0 to 3) and an adding circuit 1903 for adding data obtained from the four multiplying circuits 1902.

The above-described one-dimensional interpolation calculation in the vertical direction is realized by a circuit shown in FIG. 35 which will be described later on, and this circuit will be described in detail later on.

Next, an outline of operations of the signal processing unit 500 shown in FIG. 13 will be described. Referring back to FIG. 13, first, image data inputted to the horizontal one-dimensional interpolating unit 501 from the data converting unit 400 is supplied to the image memory 601 together with the write control signal by the data writing unit 21 and thereby written in the image memory 601 in response to the write control signal.

At that time, by supplying the read control signal to the horizontal processing image memory 601, the data acquisition unit 24 acquires image data arrayed in the horizontal direction from the image memory 601 in response to the x-direction correction amount parameter Xm supplied from the image distortion correction parameter decoder 33 as interpolation data.

Then, the data interpolation calculating unit 26 executes the one-dimensional interpolation calculation of the horizontal direction by using the interpolation coefficient supplied from the interpolation coefficient generating unit 25, and the vertical processing image memory 602 stores therein the calculated results.

Next, in the vertical one-dimensional interpolating unit 502, the data acquisition unit 29 acquires image data arrayed in the vertical direction from the vertical processing image memory 602 in response to the y-direction correction amount parameter Ym supplied from the image distortion parameter decoder 34 as interpolation data. Then, the data interpolation calculating unit 31 executes the one-dimensional interpolation calculation of the vertical direction by using the interpolation coefficient supplied from the interpolation coefficient generating unit 30, and the output data buffer 32 outputs the calculated result in response to the output synchronizing signal.

Since the interpolation calculation executed by the horizontal one-dimensional interpolating unit 501 and the vertical one-dimensional interpolating unit 502 is the one-dimensional interpolation calculation as described above, a filter with four taps or a filter with taps of high-order number can be used like cubic interpolation.

Specifically, since the one-dimensional interpolation calculation can be realized by the simple circuit as described above, calculation which is difficult to be made by a filter with taps of high-order number in the two-dimensional interpolation calculation can be realized easily, thereby making it possible to obtain an image of higher quality. A general pixel number converting circuit is a circuit that may execute one-dimensional interpolation, and hence the existing circuit may be shared in the above-described calculation.

While the one-dimensional interpolation calculation of the vertical direction is executed after the one-dimensional interpolation calculation of the horizontal direction has been carried out as set forth above, the present invention is not limited thereto, and conversely, the one-dimensional interpolation calculation of the horizontal direction may be executed after the one-dimensional interpolation calculation of the vertical direction has been executed. In this case, the image data outputted from the data converting unit 400 is inputted to the vertical direction one-dimensional interpolating unit 502, wherein it is processed by the vertical direction one-dimensional interpolation calculation and temporarily stored in the horizontal processing image memory 601. Then, the image data stored in the image memory 601 is further supplied to the horizontal direction one-dimensional interpolating unit 501, in which it is processed by the horizontal one-dimensional interpolation calculation and distortion can be completely corrected, thereby being outputted to the outside of the signal processing unit 500.

The above-described calculation processing is applied not only to data of one system but also to data of every system of color signals (RGB, YUV). Further, when the interpolation calculation is effected on a real moving image, the above-described calculation may be executed on image data in synchronism with the vertical synchronizing signal.

Most of image pickup apparatus such as a video camera and a digital still camera has so-called optical zoom function and camera-shake correcting function. When optical zoom is made by the above-described optical zoom function, the distortion characteristic of the lens fluctuates in response to the lens position at which the lens is set to the telephoto (zoom-up) side or the wide angle (zoom-down) side. Specifically, in general, when the lens 200 is moved to the wide angle side, barrel-like distortion occurs in the picture. When the lens 200 is moved to the telephoto side, bobbin-like distortion occurs in the picture.

At that time, unless the picture is not corrected by proper correction vectors corresponding to the optical zoom, then the picture quality is deteriorated. Thus, the correction parameter decoder 1010 is adapted to select optimum correction amount parameters corresponding to the position of the lens.

Specifically, the correction parameter decoder 1010 receives information indicative of the position of the lens 200 from the control microcomputer 700 and selectively decodes the compressed data Pc supplied from the correction parameter encoder 900 in response to the position information.

As described above, according to the image processing apparatus 100 shown in FIG. 12, even when the characteristic of the lens 200 is fluctuated, since only the correction amount parameter decoded in response to the characteristic is used in interpolation calculation, a data amount for use in calculation can be suppressed to the minimum. As a result, it is possible to decrease a manufacturing cost.

Next, the above-described camera-shake correcting function will be described. In general, as a method of correcting an image with distortion caused by camera-shake, there are known a method of optically correcting the image by controlling the position of the lens and the like as in active prism system or active lens system and a method of electrically correcting the image by effecting predetermined processing on a resultant image signal as in active image area system.

Since the lens characteristic fluctuates in response to the position of the lens 200 according to the optical correcting method, it is difficult to realize this optical correcting method by the image processing apparatus 100 according to the embodiment of the present invention.

On the other hand, the above-described electrical correcting method is realized by signal processing in which a part (effective area) of an image is obtained from the whole of the image. At that time, since the image processing target changes in response to the position of the effective area and the like, the correction vectors for use in executing interpolation calculation should be changed in response to the image processing target.

Accordingly, the correction parameter decoder 1010 further receives information indicative of camera-shake position from the control microcomputer 700 and selectively decodes the compressed data Pc supplied from the correction parameter encoder 900 in response to the position information to thereby realize the camera-shake correction.

In the image processing apparatus 100 according to this embodiment, when the lens 200 is exchanged, if the correction parameter decoder 1010 selectively decodes the compressed data Pc in response to the new lens 200 or the like, then an image of high quality can easily be obtained after the lens assembly has been exchanged.

Next, with reference to FIG. 26 and a flowchart of FIG. 27, operations of the horizontal one-dimensional interpolating unit 501 shown in FIG. 13 will be described in detail. First, the calculation control unit 22 generates a control timing signal in response to the internal synchronizing signal supplied from the synchronizing generating unit 800. Then, the interpolation phase/input data coordinate calculating unit 23 operates in response to the control timing signal supplied from the calculation control unit 22 to calculate coordinates of the interpolated point on the coordinate system with decimal point when an image inputted into the signal processing unit 500 has no distortion.

Figure 16:
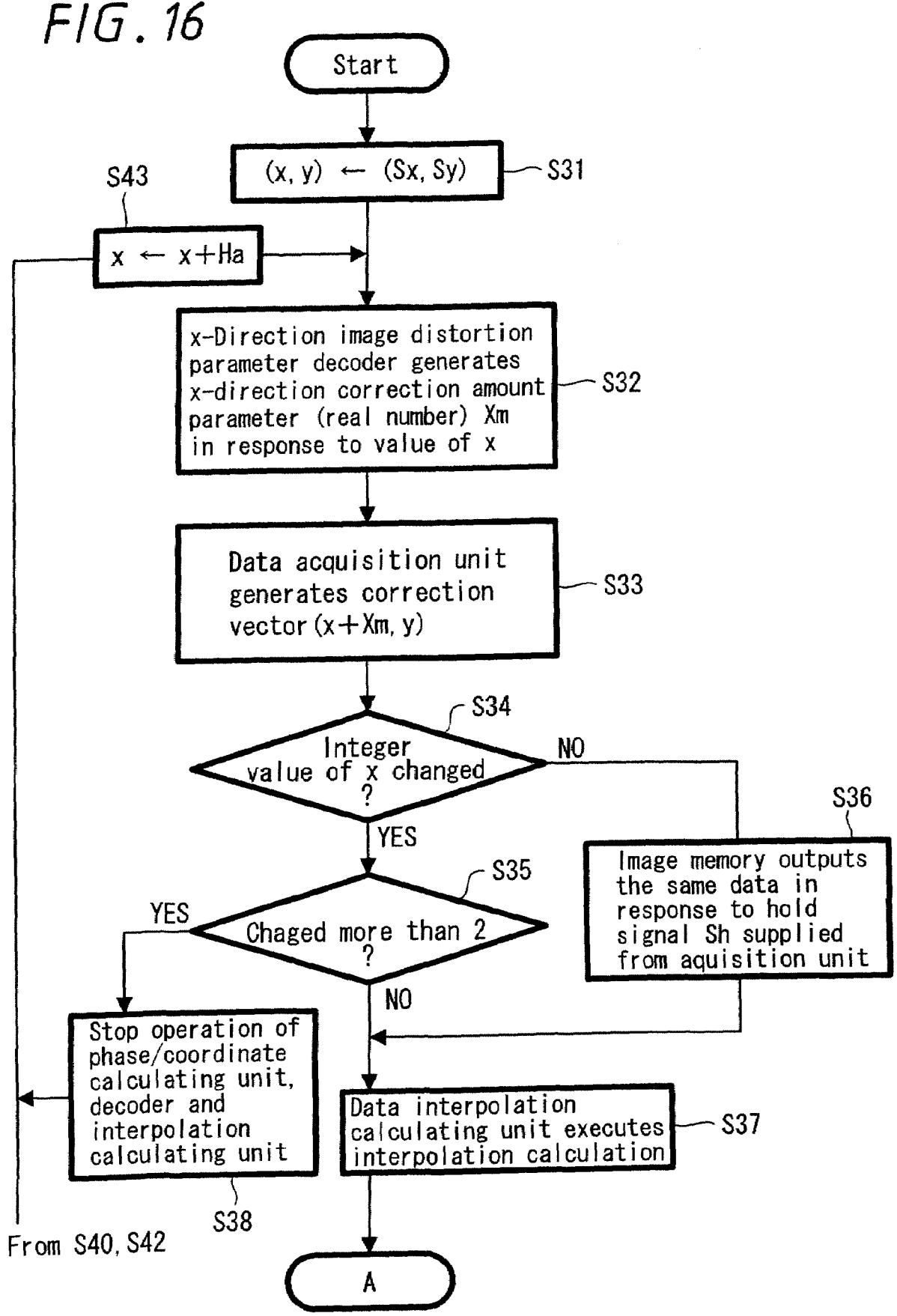
FIG. 16 is a first flowchart showing operations of the horizontal one-dimensional interpolating unit shown in FIG. 13.
Figure 17:
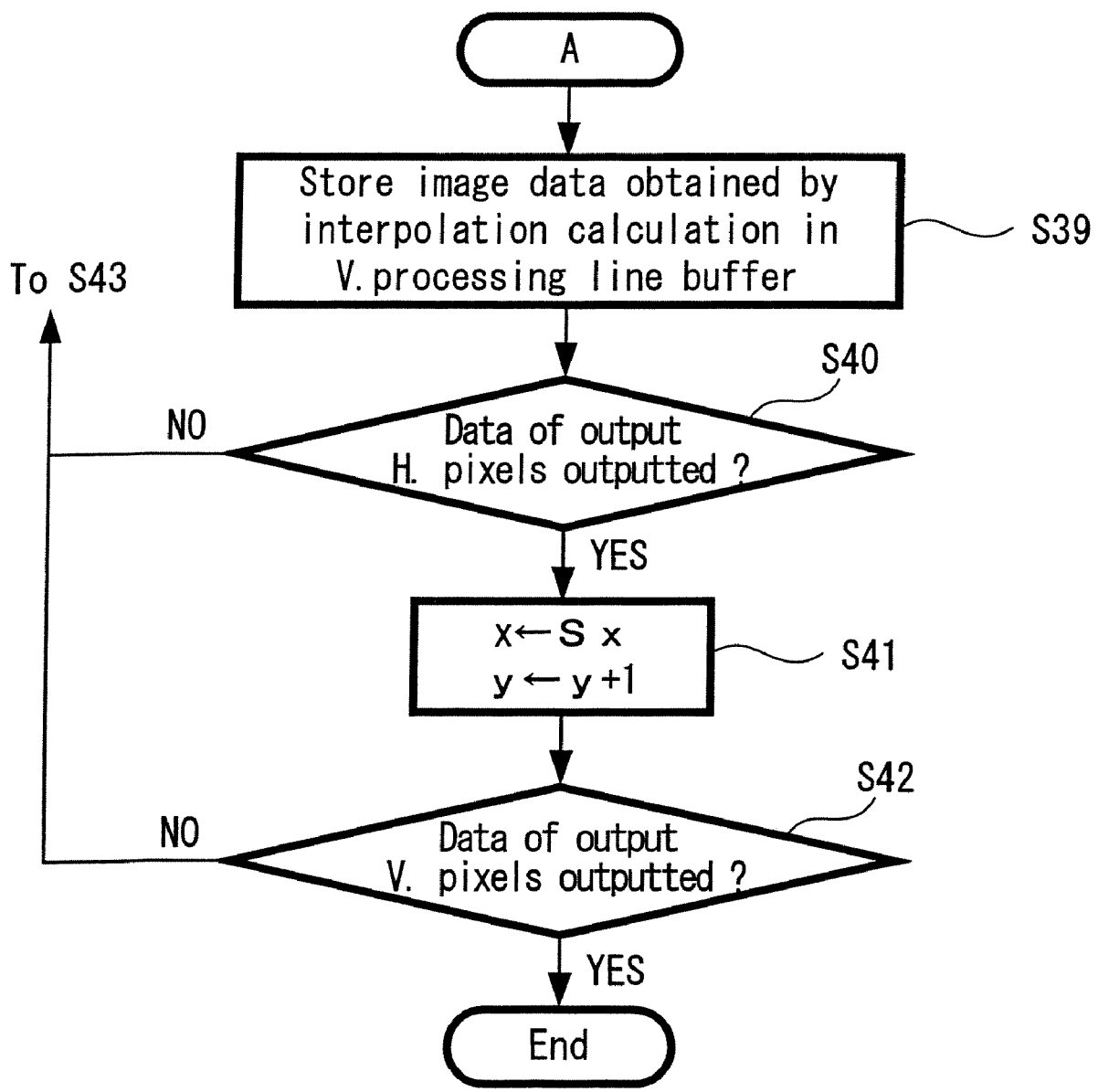
FIG. 17 is a second flowchart showing operations of the horizontal one-dimensional interpolating unit shown in FIG. 13.
Figure 18A:
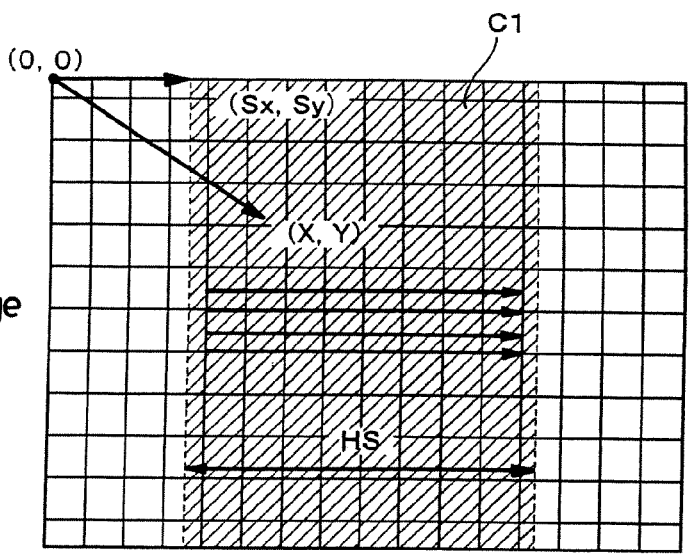
FIGS. 18A, 18B and 18C are diagrams to which reference will be made in explaining operations shown in the first and second flowcharts more fully, respectively.

Specifically, referring to FIG. 16, and following the start of operation, at a step S31, the interpolation phase/input data coordinate calculating unit 23 initializes coordinates (Sx, Sy) on the upper left of an image CI extracted as coordinates (x, y) on an image whose distortion was corrected and which was converted as shown in FIG. 18A and supplies a correction parameter request signal Rx to the image distortion correction parameter decoder 33. On the other hand, at a step S32, the image distortion correction parameter decoder 33 calculates a correction amount parameter Xm corresponding to the correction parameter request signal Rx and the coordinates (Sx, Sy) and supplies the calculated correction amount parameter to the data acquisition unit 24 and the interpolation coefficient generating unit 25.

The image distortion correction parameter decoder 33 may incorporate therein a ROM (read-only memory), for example, and may store in advance a contrast table between x coordinate and the correction amount parameter Xm in the ROM. Alternatively, the image distortion correction parameter decoder 33 may approximate the correction amount parameter Xm as a certain function of coordinates and may obtain the correction amount parameter Xm by using this function, which will be described in detail later on.

Figure 18B:
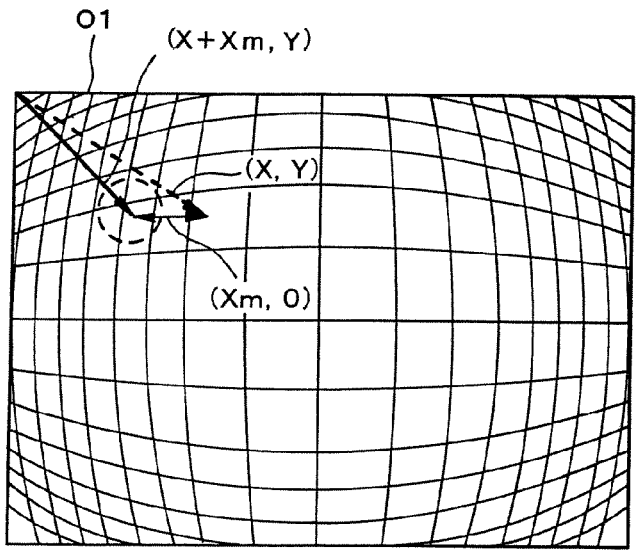

In the next step S33, the data acquisition unit 24 adds correction amount vectors (Xm, O) corresponding to the correction amount parameter Xm supplied thereto from the image distortion parameter decoder 33 to the coordinates (X, Y) supplied from the interpolation phase/input data coordinate calculating unit 23. Thus, as shown in FIG. 18B, there were obtained coordinates (X+Xm, Y) of a point corresponding to the above-described coordinates (X, Y) on the original image OI that is provided before being corrected, i.e., correction vectors.

Instead of the data acquisition unit 24, the image distortion correction parameter decoder 33 may calculate the above-described correction vectors in response to x coordinate supplied from the interpolation phase/input data coordinate calculating unit 23 and may supply the correction vectors to the data acquisition unit 24.

At that time, it is determined by the data acquisition unit 24 at the decision step S34 whether or not the integer value of the x coordinate is changed by addition of the correction amount parameter Xm. If the integer value of the x coordinate is changed as represented by a YES at the decision step S34, then control goes to the next decision step S35. If the integer value of the x coordinate is not changed as represented by a NO at the decision step S34, then control goes to a step S36.

It is determined at the decision step S35 whether or not the integer value of the x coordinate is changed more than 2. If the integer value of the x coordinate is changed more than 2 as represented by a YES at the decision step S35, then control goes to a step S38. If the integer value of the x coordinate is changed by only 1 as represented by a NO at the decision step S35, then control goes to a step S37. On the other hand, at the step S36, the image memory 601 supplies the same interpolation data as that outputted in the preceding cycle to the data acquisition unit 24 again in response to a hold signal Sh supplied thereto from the data acquisition unit 24.

The data acquisition unit 24 generates an address of data that should be read out from the image memory 601 in response to the integer value of x component (X+Xm) of the generated correction vectors and acquires interpolation data corresponding to the address by supplying the read control signal to the image memory 601.

While incrementing address from the starting address one by one, the image memory 601 sequentially outputs interpolation data corresponding to the address and temporarily stops the above-described increment in response to the hold signal Sh from the data acquisition unit 24.

The image memory 601 may receive the read start address from the data acquisition unit 24 and may output successive data of a predetermined number in which the read start address is used as the above-described start address.

Herein, the above-described hold signal Sh and read start address are obtained from the integer component of the correction amount parameter Xm outputted from the image distortion correction parameter decoder 33.

On the other hand, the interpolation coefficient generating unit 25 treats a decimal point component of the correction amount parameter Xm supplied from the image distortion correction parameter decoder 33 as the phase of the horizontal interpolation filter and generates an interpolation coefficient in response to the decimal point component. Such operation can be applied to the apparatus when the image 102 inputted to the signal processing unit 10 is formed according to the RGB format. On the other hand, when the image 102 is formed according to the YUV format, the filter phase of the luminance signal Y can be treated similarly to the filter phase of the RGB format. Thus, the interpolation coefficient generating unit 25 can calculate a phase of a color difference signal Cb/Cr by using not only the decimal point component of the correction amount parameter Xm but also the integer component.

Then, at the step S37, the data interpolation calculating unit 26 executes one-dimensional interpolation calculation in response to interpolation data supplied from the data acquisition unit 24 and the above-described interpolation coefficient. Then, control goes to a step S39.

Figure 18C:
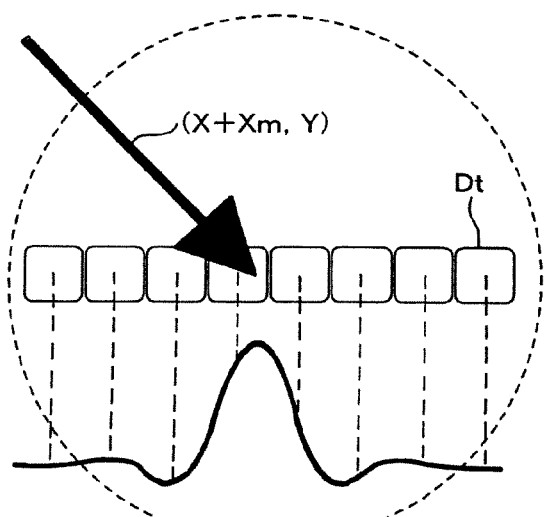

The above-described one-dimensional interpolation calculation uses luminance data Dt of 8 pixels near the correction vectors (X+Xm,Y) in the horizontal direction as interpolation data as shown in FIGS. 18C to execute 8-tap interpolation calculation that uses the above-described decimal point component as the phase. The result obtained by the interpolation calculation is used as luminance data of the output image, whereby distortion in the horizontal direction can be corrected.

On the other hand, at a step S38, the data acquisition unit 24 supplies a skip signal sk to the interpolation phase/input data calculating unit 24, the image distortion correction parameter decoder 33 and the data interpolation calculating unit 26 to stop operations of the interpolation phase/input data coordinate calculating unit 23, the image distortion correction parameter decoder 33 and the data interpolation calculating unit 26.

If the x coordinate is changed more than 2 as represented by a YES at the decision step S35, then this means that the center coordinate on which the interpolation calculation is effected in actual practice is moved more than two pixels, and hence the output of data to the image memory 602 from the data interpolation calculating unit 26 is interrupted. When the center coordinate on which the interpolation calculation is effected in actual practice is moved more than two pixels, since the decimal point component (interpolation phase) of the correction amount parameter Xm outputted from the image distortion correction parameter decoder 33 is held until the next cycle, operations of the image distortion correction parameter decoder 33 are stopped.

Then, at a step S43, the interpolation phase/input data coordinate calculating unit 23 adds a horizontal direction enlargement and reduction parameter Ha to the x coordinate, and control goes to the step 32. This enlargement and reduction parameter Ha is determined based upon a ratio between the length of the corrected image and the length of the original image with distortion in the horizontal direction. When the image is enlarged in the horizontal direction after it has been corrected, this enlargement and reduction parameter Ha is selected to be smaller than 1. Conversely, when the image is reduced after it has been corrected, this enlargement and reduction parameter Ha is selected to be larger than 1. When the image is produced at the magnification of ×1, this enlargement and reduction parameter Ha is selected to be 1.

In a step S39, the data interpolation calculating unit 26 stores the resultant image data in the image memory 602 composed of a vertical processing line buffer. Then, it is determined at the next decision step S40 whether or not the input data coordinate calculating unit 23 outputs image data of one line amount, i.e., output horizontal pixel number HS amount to the image memory 602 based upon the x coordinate of the present time point. If the data of one line amount is outputted as represented by a YES at the decision step S40, then control goes to a step S41. If on the other hand data of one line amount is not outputted as represented by a NO at the decision step S40, then control goes to the step S43.

At the step S41, the interpolation phase/input data coordinate calculating unit 23 sets the x coordinate to Sx and adds 1 to the y coordinate. At the next decision step S42, it is determined by the interpolation phase/input data coordinate calculating unit 23 based upon the y coordinate whether or not image data of one frame amount, i.e., image data of output vertical line amount is outputted to the image memory 602. If the image data of the output vertical line amount is outputted to the image memory 602 as represented by a YES at the decision step S42, then control is ended. If on the other hand the image data of one frame amount is not outputted to the image memory 602 as represented by a NO at the decision step 602, then control goes to the step S43.

As described above, the horizontal one-dimensional interpolating unit 501 realizes the horizontal image distortion correcting processing and the horizontal direction enlargement and reduction processing at the same time by effecting the one-dimensional interpolation processing of the horizontal direction on the original image with distortion and saves the resultant image in the vertical processing image memory 602.

FIGS. 19A to 19I show specific example in which the image is converted at the magnification of ×1 based upon the above-described horizontal one-dimensional interpolation. FIGS. 19A to 19I show conversions concerning the luminance signal. FIG. 19A show interpolation data D0 to D9 inputted to the signal processing unit 500, FIGS. 19B and 19F show correction amount parameter Xm and FIGS. 19C and 19D show sampling position and data number of data comprising an image obtained after correction.

FIGS. 19E shows x coordinate (xt) supplied from the interpolation phase/input data coordinate calculating unit 23 to the image distortion correction parameter decoder 33, FIG. 19G shows x coordinate (correction parameter) of correction vectors generated by the data acquisition unit 24, FIG. 19H shows address of interpolation data in the data that is obtained before correction, and FIG. 19I shows interpolation phase, respectively.

As shown in FIGS. 19A to 19I, for example, a correction amount parameter Xm of data in which x coordinate is located at a point of 2.0 in the corrected image is set to 1.25. As a result, the x coordinate of the point corresponding to the above point in the image that is obtained before correction is calculated as 3.25 by adding the correction amount parameter Xm to 2.0. At that time, the integer component (3) of the x coordinate (3.25) shows the address of the data in the image that is obtained before correction, and 0.25 shows the interpolation phase. Accordingly, the luminance signal at the point in which the x coordinate in the corrected image is 2.0 treats a plurality of consecutive data having three approximate x addresses in the image that is not yet corrected and can be obtained by one-dimensional interpolation calculation in which the phase of the horizontal interpolation filter is set to 0.25.

FIGS. 20A to 20N are, respectively, timing charts showing operation timings in which the image is converted at the magnification of x1 as shown in FIGS. 19A to 19I. FIG. 20A shows an internal synchronizing signal supplied to the calculation control unit 22, FIG. 20B shows a control timing signal generated from the calculation control unit 22, FIG. 20C shows a read control signal supplied from the data acquisition control unit 24 to the image memory 601, FIG. 20D shows interpolation data inputted from the image memory 601 to the data acquisition unit 24, and FIG. 20E shows x coordinate (xt) supplied from the interpolation phase/input data coordinate calculating unit 23 to the image distortion correction parameter decoder 33, respectively.

FIG. 20F shows a correction amount parameter xm outputted from the image distortion correcting parameter decoder 33, FIG. 20G shows a correction parameter generated from the data acquisition unit 24, FIG. 20H shows address of interpolation data in the image that is not yet corrected, FIG. 20I shows an interpolation phase, FIGS. 20J and 20K show a skip signal sk and a hold signal sh generated from the data acquisition unit 24, respectively, FIG. 20I shows 2-tap data read out from the image memory 601, FIGS. 20J and 20K show a skip signal sk and a hold signal sh generated from the data acquisition unit 24, respectively, FIG. 20L shows 2-tap data read out from the image memory 601, FIG. 20M shows data outputted from the data interpolation calculating unit 26 to the image memory 602, and FIG. 20N shows an output enable signal that is generated in the inside of the data interpolation calculating unit 26, respectively. For simplicity of explanation, it is assumed that the interpolation calculation for obtaining one data uses the 2-tap data shown in FIG. 20L.

As shown in FIG. 20B, when the control timing signal is activated to high level at a time T1 in response to the internal synchronizing signal, the interpolation phase/input data coordinate calculating unit 23 sequentially supplies the x coordinate (xt), which is incremented from 0.0 by 1.0 each, to the image distortion correction parameter decoder 33 as shown in FIG. 20E.

Thus, as shown in FIG. 20F, the image distortion parameter decoder 33 calculates the corresponding correction amount parameter Xm and then the data acquisition unit 24 calculates a correction parameter shown in FIG. 20G. As shown in FIG. 20H, the data acquisition unit 24 specifies the start address of the interpolation data in the image, which is not yet corrected, from the integer component of the correcting parameter to "0". Then, as shown in FIGS. 20C and 20D, the data acquisition unit 24 supplies the above-described specified address "0" to the image memory 601 together with the activated read control signal.

Thus, as shown in FIG. 20D, the image memory 601 sequentially outputs interpolation data to the data acquisition unit 24 from data D0 corresponding to the start address "0".

As shown in FIGS. 20G and 20J, if it is determined by the data acquisition unit 24 at a time T2 that the integer component of the correction parameter increases more than 2, then the data acquisition unit 24 generates the skip signal sk of high level (H) and supplies this skip signal Sk to the interpolation phase/input data coordinate calculating unit 23, the data interpolation calculating unit 26 and the image distortion correction parameter decoder 33. As a result, as shown in FIGS. 20E and 20G, generating operation of the correction parameter is stopped during one cycle from the time T3, and as shown in FIGS. 20M and 20N, the output enable signal is inactivated to low level and hence outputting of data from the data interpolation calculating unit 26 to the image memory 602 is stopped.

As shown in FIGS. 20G and 20K, it is determined by the data acquisition unit 24 at a time T4 that the integer component of the generated correction parameter (8.75) is identical to the integer component of the correction parameter (8.25) of one cycle before, and activates the hold signal Sh to high level at the time T4. Thus, as shown in FIG. 20L, at a time T5, the data acquisition unit 24 obtains the same 2-tap interpolation data D8, D9 of the preceding cycle from the image memory 601.

FIGS. 21A to 21I show specific examples in which an image is converted in enlargement by the horizontal one-dimensional interpolation similarly to FIGS. 19A to 19I. FIGS. 22A to 22M show operation timings by which an image is converted in enlargement similarly to FIGS. 20A to 20N. In this example of enlargement conversion, as shown in FIG. 21E, data of which the data numbers are ranging from 2 to approximately 6 are enlarged in the horizontal direction wherein the enlargement and reduction parameter Ha of the horizontal direction is set to 0.5. FIG. 21B shows the correction amount parameter Xm with respect to 10 data of which the data numbers are ranging from 0 to 9, and FIG. 21F shows a correction amount parameter Xm at the interpolation point by the enlargement, i.e., at 10 points in which x coordinate lies in a range of from 2.0 to 6.5 at an interval of 0.5.

In such enlargement conversion, as shown in FIG. 22G, since the integer components of the correction parameters are not changed at the times T2, T3, T5, T5, T6, the hold signal Sh is activated during one cycle at each time.

Figure 23:
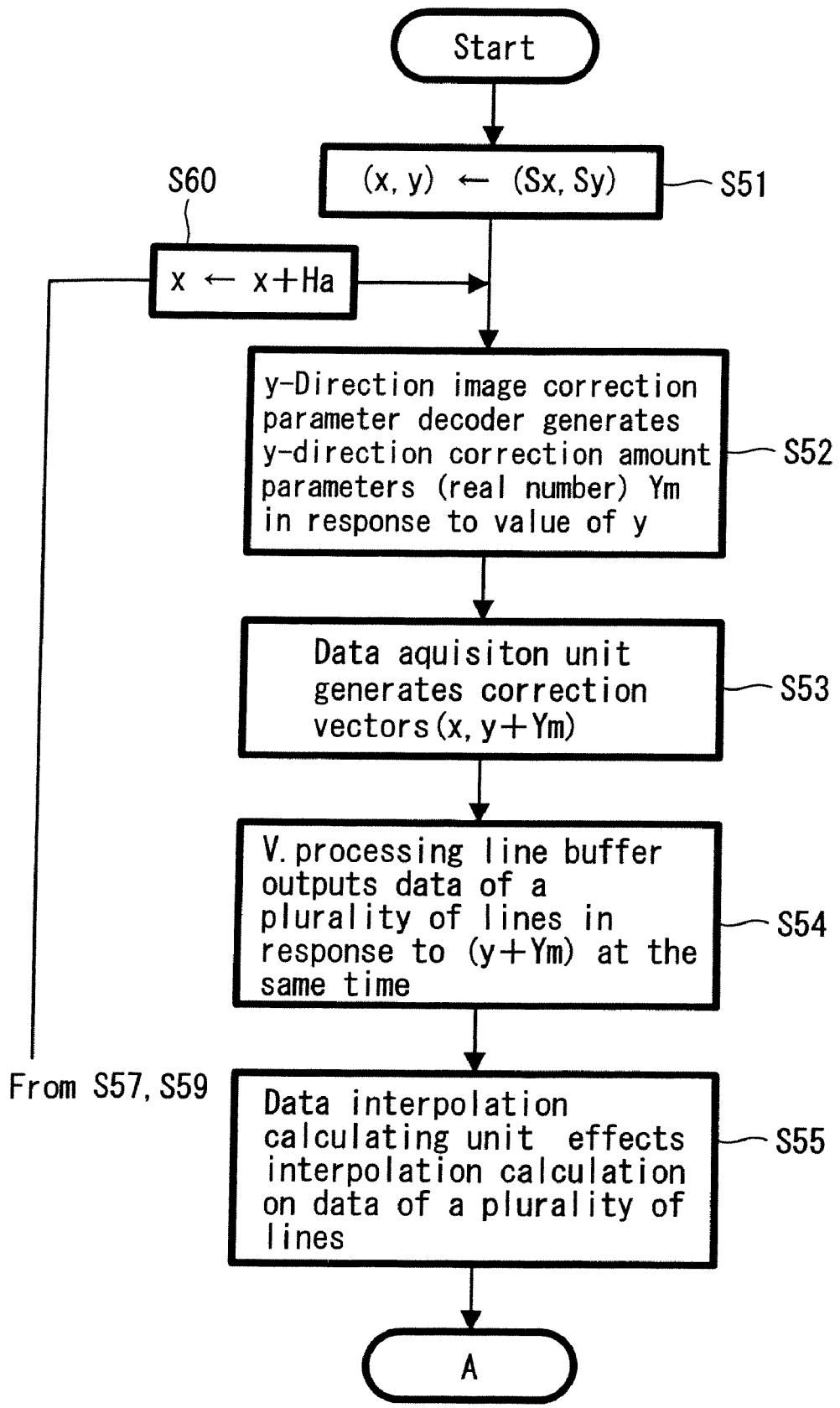
FIG. 23 is a first flowchart showing operations of the vertical one-dimensional interpolating unit shown in FIG. 13.
Figure 24:
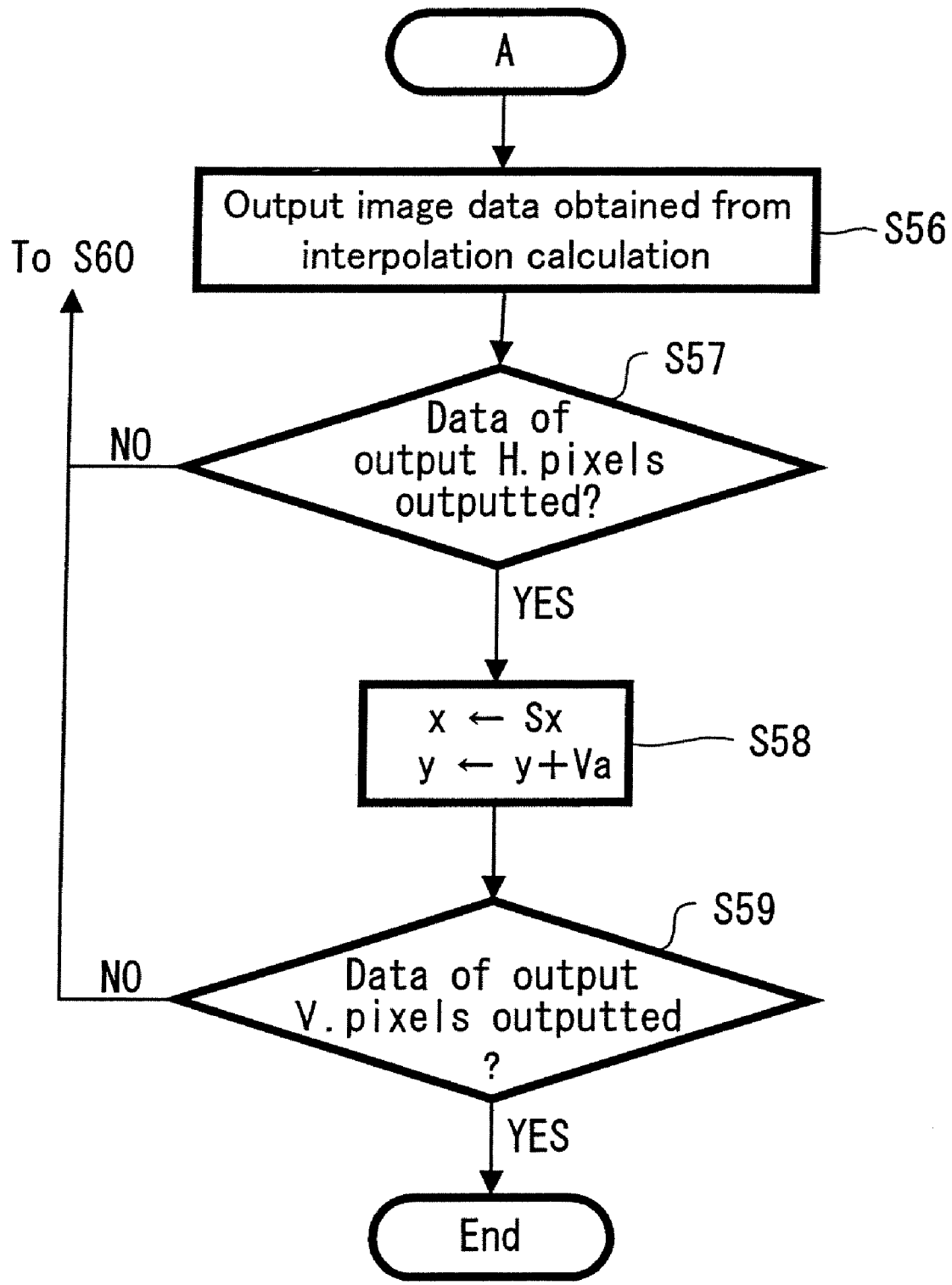
FIG. 24 is a second flowchart showing operations of the vertical one-dimensional interpolating unit shown in FIG. 13.

Operations of the vertical one-dimensional interpolating unit 502 shown in FIG. 13 will be described in detail with reference to flowcharts of FIGS. 23 and 24. First, the calculation control unit 27 generates a control timing signal in response to the internal synchronizing signal supplied from the synchronizing signal generating unit 1600. Then, the interpolation phase/input data coordinate calculating unit 28 operates in response to the control timing signal supplied from the calculation control unit 27 to calculate coordinates of an interpolation point in the coordinate system with decimal points when the picture inputted to the signal processing unit 500 has no distortion.

Specifically, at a step S51, the interpolation phase/input data coordinate calculating unit 29 initializes coordinates (Sx, Sy) on the upper left of an extracted image CI as coordinates (x, y on the image that has been corrected in distortion and converted at the magnification of x1 as shown in FIG. 25A and supplies the correction parameter request signal Ry to the image distortion correction parameter decoder 34. On the other hand, at a step S52, the image distortion correction parameter decoder 34 calculates the correction amount parameter Ym corresponding to the y coordinate in response to the correction parameter request signal Ry supplied thereto and supplies the calculated correction amount parameter Ym to the data acquisition unit 29 and the interpolation coefficient generating unit 30.

The image distortion correction parameter decoder 34 may incorporate therein a ROM (read-only memory) and may store in advance a contrast table between the y coordinate and the correction amount parameter ym in the ROM. Alternatively, the image distortion correction parameter decoder 34 may approximate the correction amount parameter Ym as a certain function of the y coordinate and calculate the correction amount parameter Ym by using the above-mentioned function, which will be described in detail later on.

In the next step S53, the data acquisition unit 29 may add the correction amount vectors (O, Ym) corresponding to the correction amount parameter Ym supplied from the image distortion correction parameter decoder 34 to the coordinates (X,Y) supplied from the interpolation phase/input data coordinate calculating unit 29. Thus, as shown in FIG. 25B, coordinates (X, Y+Ym) of a point corresponding to the above-described coordinates (X,Y) in the original image OI that is not yet corrected, i.e., correction vectors are calculated. At that time, the data acquisition unit 29 generates address of data that should be read out from the image memory 602 in response to the integer value of the y component (Y+Ym) of the thus generated correction vector and supplies the same to the image memory 602 together with the memory control signal.

Instead of the data acquisition unit 29, the image distortion correction parameter decoder 34 may calculate the above-described correction vector in response to the y coordinate supplied from the interpolation phase/input data coordinate calculating unit 28 and may supply the correction vector to the data acquisition unit 29 and the like.

At a step S54, the vertical processing image memory 602 may output a plurality of interpolation data arranged over a plurality of lines in the vertical direction in the coordinate X in response to the supplied address to the data acquisition unit 29 at the same time.

The image memory 602 may receive the start address that starts reading from the data acquisition unit 29 and may sequentially output interpolation data corresponding to the address by incrementing the address one by one. Alternatively, the image memory 602 may not increment the address but may output consecutive data of a predetermined number from the received start address. The start address is calculated from the integer component of the correction amount parameter Ym outputted from the image distortion correction parameter decoder 34.

On the other hand, the interpolation coefficient generating unit 30 treats the decimal component of the correction amount parameter Ym supplied from the image distortion correction parameter decoder 34 as the phase of the vertical interpolation filter to generate an interpolation coefficient in response to the decimal component.

Then, in a step S55, the data interpolation calculating unit 31 executes the one-dimensional interpolation calculation in response to the interpolation data and the interpolation coefficient supplied from the data acquisition unit 29. The above-described interpolation calculation may not limited to the application of the case where the image 102 inputted to the signal processing unit 500 has the RGB format. Specifically, when the image 102 has the YUV format, if data densities in the vertical direction of the luminance signal and the color difference signals are identical to each other, the filter phase of the luminance signal can be used as the filter phase of the color difference signal. When the above-described data densities are different from each other, the filter phase of the color difference signal can be calculated by using not only the decimal component of the correction amount parameter Ym but also the integer component.

According to the YUV format, as shown in FIG. 25C, luminance data Dt of 8 pixels, for example, in the vertical direction near the correction vector (X, Y+Ym) and the like are used as interpolation data and 8-tap interpolation calculation using the decimal component as the phase is executed. The results obtained by the interpolation calculation are used as the luminance data and the color difference data of the output image, thereby the distortion in the vertical direction being corrected.

In the next step S56, the output data buffer 32 outputs the image data obtained from the interpolation calculation. At the next decision step S57, it is determined by the interpolation phase/input data coordinate calculating unit 23 based upon the x coordinate of the present time whether or not image data of one line amount, i.e., image data of output horizontal pixel number HS amount is outputted. If the image data of one line amount is outputted as represented by a YES at the decision step S57, then control goes to a step S58. If on the other hand the image data of one line amount is not outputted as represented by a NO at the decision step S57, then control goes to a step S60.

At the step S58, the interpolation phase/input data coordinate calculating unit 28 sets the x coordinate to Sx and adds the enlargement and reduction parameter Va of the vertical direction to the y coordinate. On the other hand, at the step S60, the interpolation phase/input data coordinate calculating unit 28 adds the enlargement and reduction parameter Ha of the horizontal direction to the x coordinate, and control goes back to the step S52. The above-described enlargement and reduction parameter Va is determined by a ratio between lengths of the vertical direction of the original image with distortion relative to the image that has been corrected. When the corrected image is enlarged in the vertical direction after correction, the above-described enlargement and reduction parameter Va is selected to be a value smaller than 1. Conversely, when the corrected image is reduced after correction, the above enlargement and reduction parameter Va is selected to be a value larger than 1. When the corrected image is converted at the magnification of ×1, the above enlargement and reduction parameter Va is selected to be 1.

At the decision step S59, it is determined by the interpolation phase/input data coordinate calculating unit 28 based upon the y coordinate whether or not image data of one frame, i.e., image data of vertical line number (vertical pixel number) amount is outputted from the output data buffer 32. If the image data of one frame is outputted as represented by a YES at the decision step S59, then control is ended. If on the other hand the image data of one frame is not outputted as represented by a NO at the decision step S59, then control goes to the step S60.

Since the above-described one-dimensional interpolation in the vertical direction is not accompanied with the interpolation of data with respect to the horizontal direction and the enlargement/reduction of the image, in the scanning of the horizontal direction shown in FIG. 25A, similar operation is repeated at every cycle. However, when the correction amount parameter Ym is large, a time period necessary for reading interpolation data from each storage place of the image memory 602 increases unavoidably. In such case, the data acquisition unit 29 supplies an activated wait signal WT to the interpolation phase/input data coordinate calculating unit 28 and the image distortion parameter decoder 34 and interrupts operations of the interpolation phase/input data coordinate calculating unit 28 and the image distortion correction parameter decoder 34 during the activation period of the wait signal WT.

As described above, the vertical one-dimensional interpolating unit 502 can realize the vertical image distortion correction processing and the vertical direction enlargement/reduction processing at the same time by effecting the one-dimensional interpolation calculation of the vertical direction on the original image with the distortion and generates and outputs the image from which the distortion can be removed completely. FIG. 26 shows a specific example in which an image is converted at the magnification of ×1 by the above-described vertical one-dimensional interpolation. FIG. 26 is a graph showing the conversion concerning the luminance signal, wherein the horizontal axis represents the x coordinate and the vertical axis represents the corrected y coordinate (Y+Ym).

Figure 26:
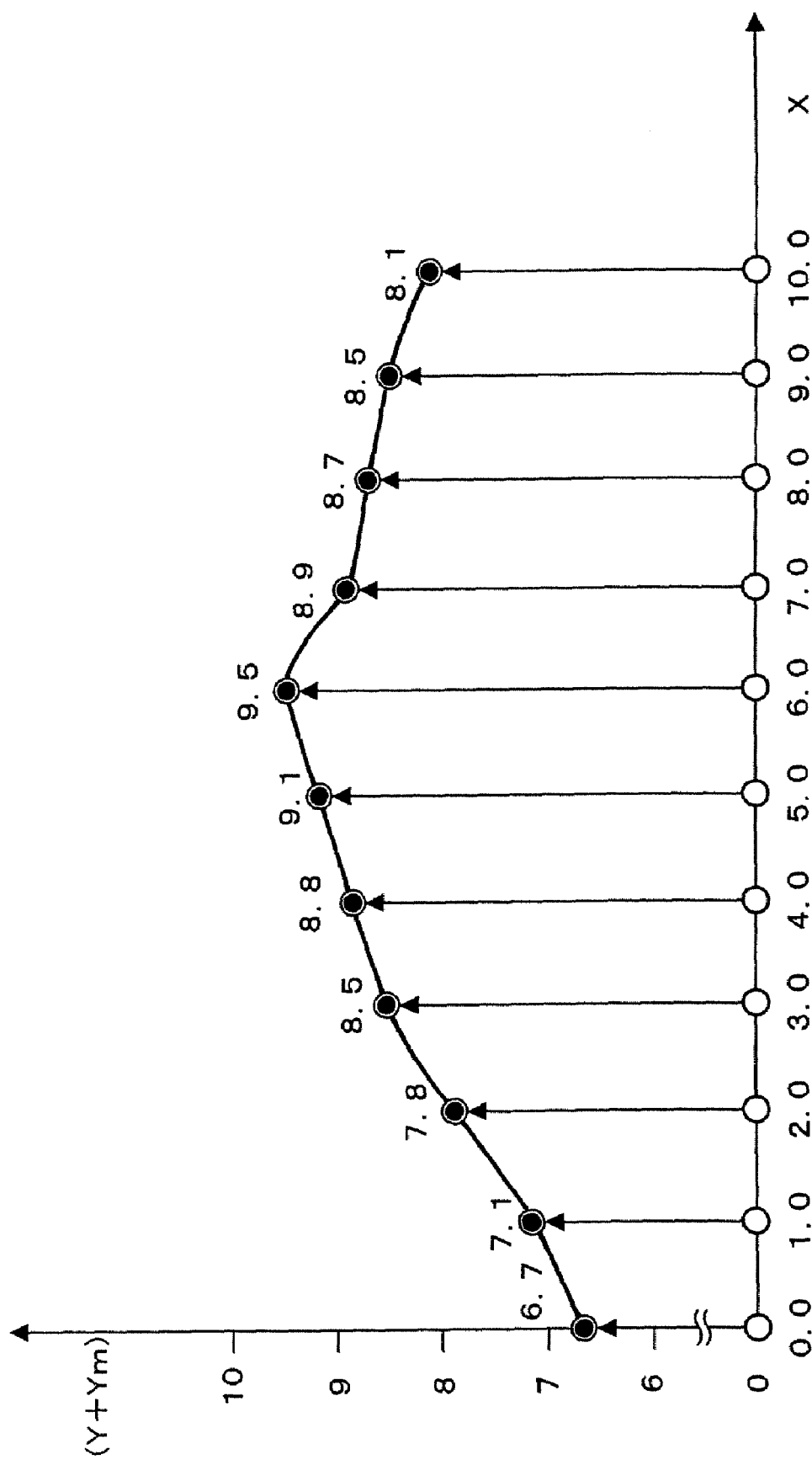
FIG. 26 is a diagram showing an example of vertical enlargement conversion in the vertical one-dimensional interpolation.

In FIG. 26, 10 points in which y coordinate is 0 and x coordinate falls within a range of from 0.0 to 10.0 represent points on the image obtained after correction, and arrows represent the correction amount parameters Ym up to the points on the original image corresponding to the respective points. Specifically, in the image obtained after correction, for example, the point of the coordinates (1.0, 0) corresponds to the point of coordinates (1.0, 7.1) in the original image obtained before correction. The correction amount parameter is 7.1, and the interpolation phase is its decimal component 0.1.

The pre-processing apparatus 1500 and the correction parameter decoder 1010 shown in FIG. 12 will be described below in detail. First, an outline of operations of the pre-processing apparatus 1500 and the correction parameter decoder 1010 will be described with reference to a flowchart of FIG. 27.

Figure 27:
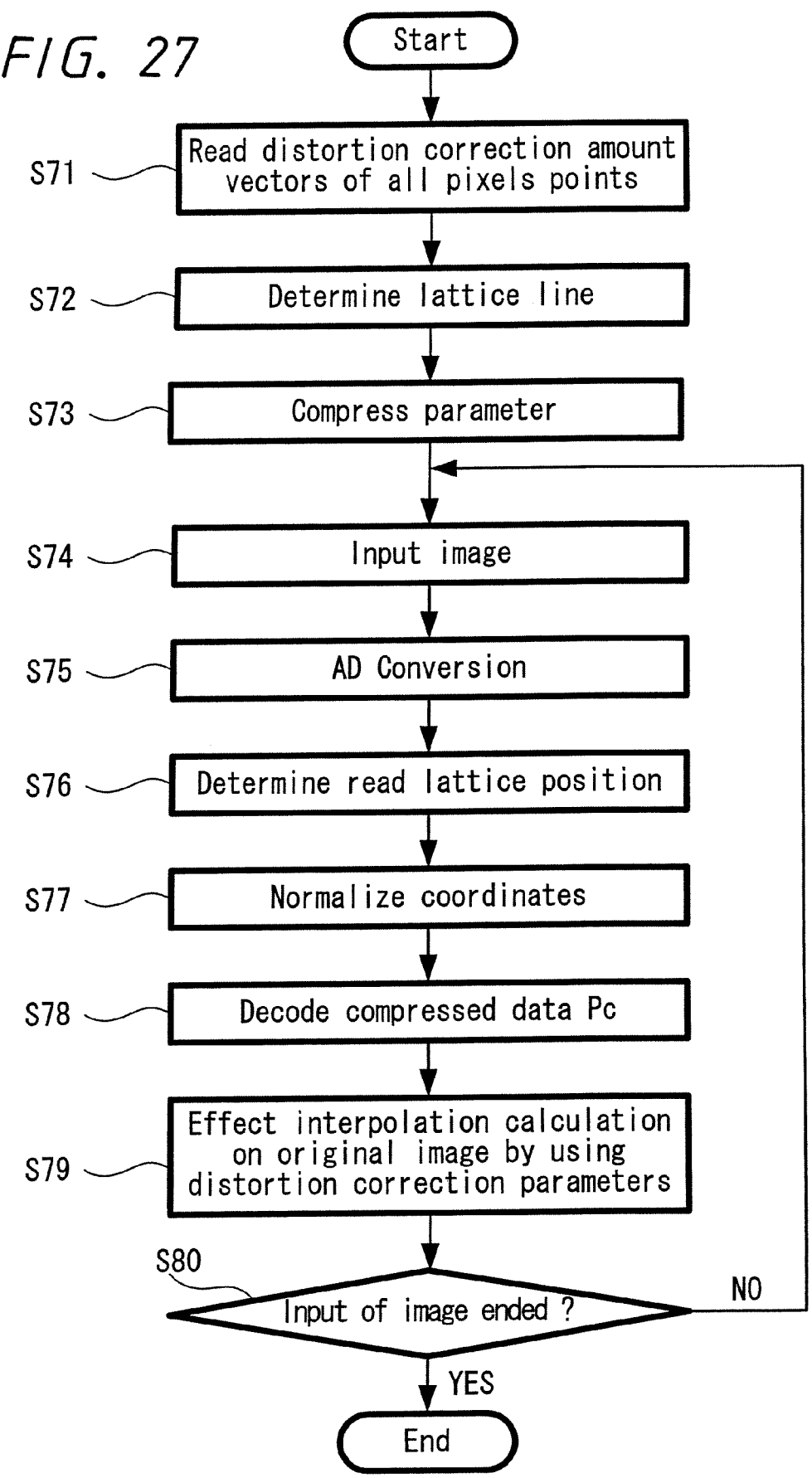
FIG. 27 is a flowchart showing outlines of operations of the pre-processing apparatus and the correction parameter decoder shown in FIG. 12.

Referring to FIG. 27, and following start of operation, at a step S71, the correction parameter encoder 900 reads correction amount vectors of all pixel points from the correction parameter deriving portion 800. In the next step S72, the correction parameter encoder 900 determines lattice lines which are used to divide the correction amount vectors of all pixel points at every division. A manner of determining the lattice lines will be described in detail later on.

At a step S73, the correction parameter encoder 900 compresses the correction amount vectors of the respective divisions divided by the lattice lines, and supplies the thus compressed correction amount vectors to the correction parameter decoder 1010 and the distortion correction memory 1020 as the compressed data Pc. At a step S74, the image pickup element 300 picks up an image. The compression of the correction amount vectors will be described in detail later on.

At a step S75, the data converting unit 400 converts an analog image signal, generated by the above shooting, into a digital image signal. At a step S76, the correction parameter decoder 1010 determines lattices necessary for reading correction amount parameters from the signal processing unit 500. At a step S77, the correction parameter decoder 1010 normalizes coordinates supplied from the signal processing unit 500 in response to the lattices.

In the next step S78, the correction parameter decoder 1010 decodes the compressed data Pc supplied from the correction parameter encoder 900 by using the above lattices, and supplies resultant correction parameters to the signal processing unit 500. At the next step S79, the signal processing unit 500 effects interpolation calculation on the original image by using the correction amount parameters. It is determined at the next decision step S80 by the control microcomputer 700 whether or not input of original image into the signal processing unit 500 should be ended. If input of the original image to the signal processing unit 500 is ended as represented by a YES at the decision step S80, then control of the image processing apparatus 100 is ended. If input of the original image to the signal processing unit 500 is not ended as represented by a NO at the decision step S80, then control goes back to the step S74.

Figure 28:
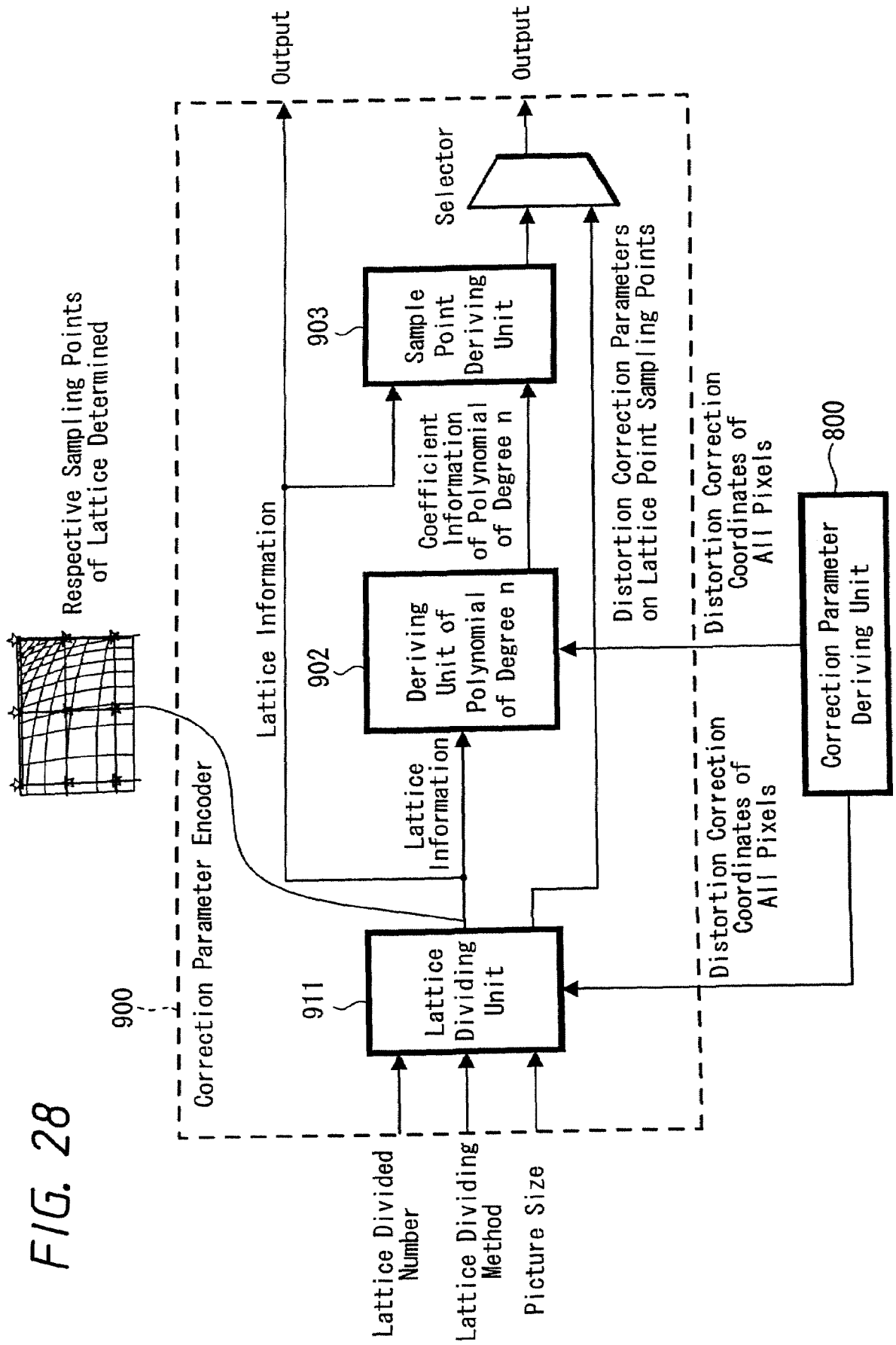
FIG. 28 is a block diagram showing an arrangement of the correction parameter encoder shown in FIG. 12.

FIG. 28 is a block diagram showing an arrangement of the correction parameter encoder 900 shown in FIG. 12. As shown in FIG. 28, the lattice dividing unit 911 determines lattice lines used to divide parameters of all points on the picture at every division and supplies distortion correction parameters (distortion correction coordinates) on the lattice points to the distortion correction memory 1020. The polynomial of degree n coefficient deriving unit 902 expresses all distortion correction coordinates of the respective lattice segments divided by the lattice dividing unit 911 in the form of a function with respect to the lattice segments and approximates the function by a calculated division polynomial of degree n.

Further, the sample point deriving unit 903 compresses distortion correction parameters from the division polynomial of degree n obtained from the polynomial of degree n coefficient deriving unit 902. In the thus derived division polynomial of degree n, internal points which result from dividing both ends of the division polynomial of degree n by n are set to new distortion correction parameters (approximated distortion correction parameters) and supplied to the distortion correction memory 1020.

Figure 29A:
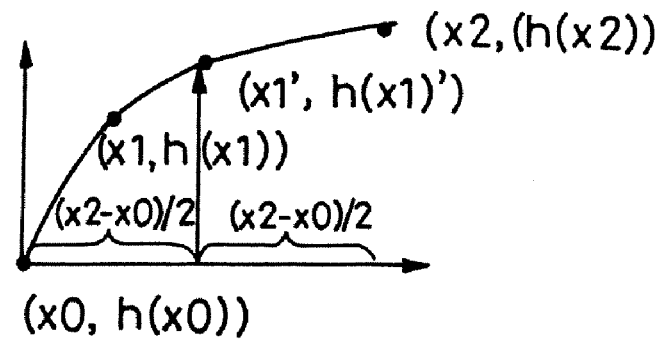
FIGS. 29A, 29B and 29C are diagrams to which reference will be made in explaining operations of the lattice dividing unit shown in FIG. 28, respectively.
Figure 29B:
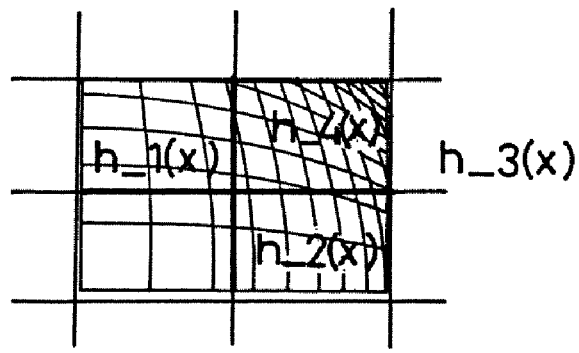
Figure 29C:
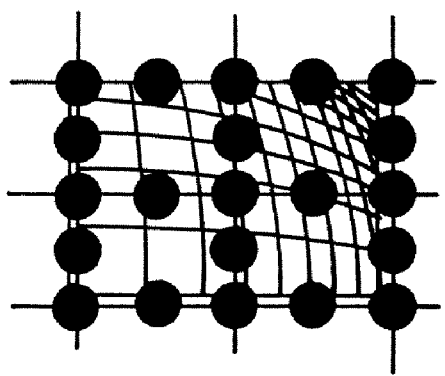

Accordingly, as shown in FIGS. 29A, 29B which show the division polynomial of degree 2 as the example, interdivision points of h1(x), h2(x), h3(x), h4(x) have the same correction coordinates and therefore can be shared, thereby making it possible to reduce the number of distortion correction parameters. Specifically, as shown in FIG. 29C, considering shared points, middle points between the interdivision points and the lattice segments become the distortion correction parameters.

Figure 8:
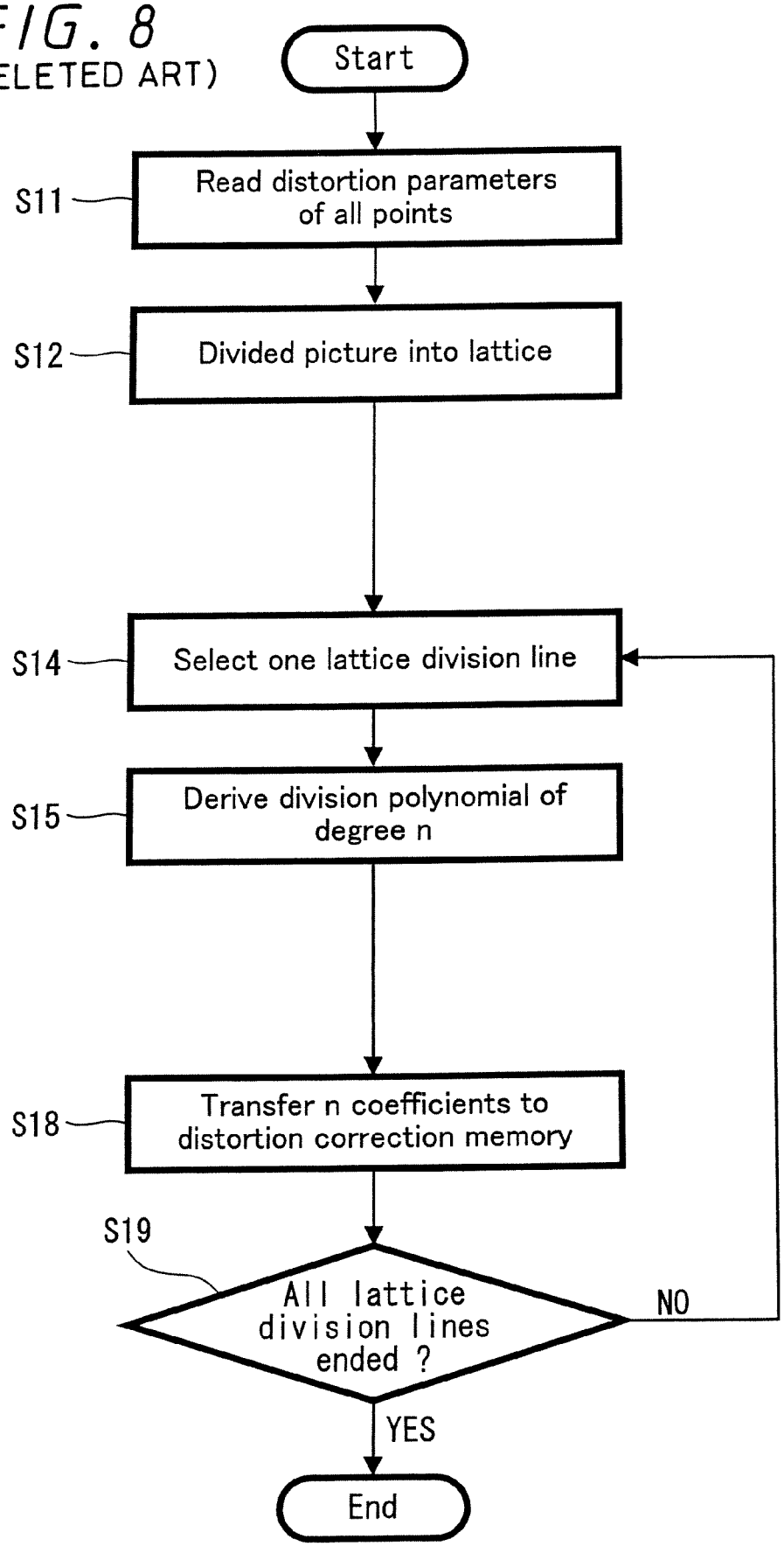
FIG. 8 is a flowchart showing an image distortion correcting method.
Figure 9:
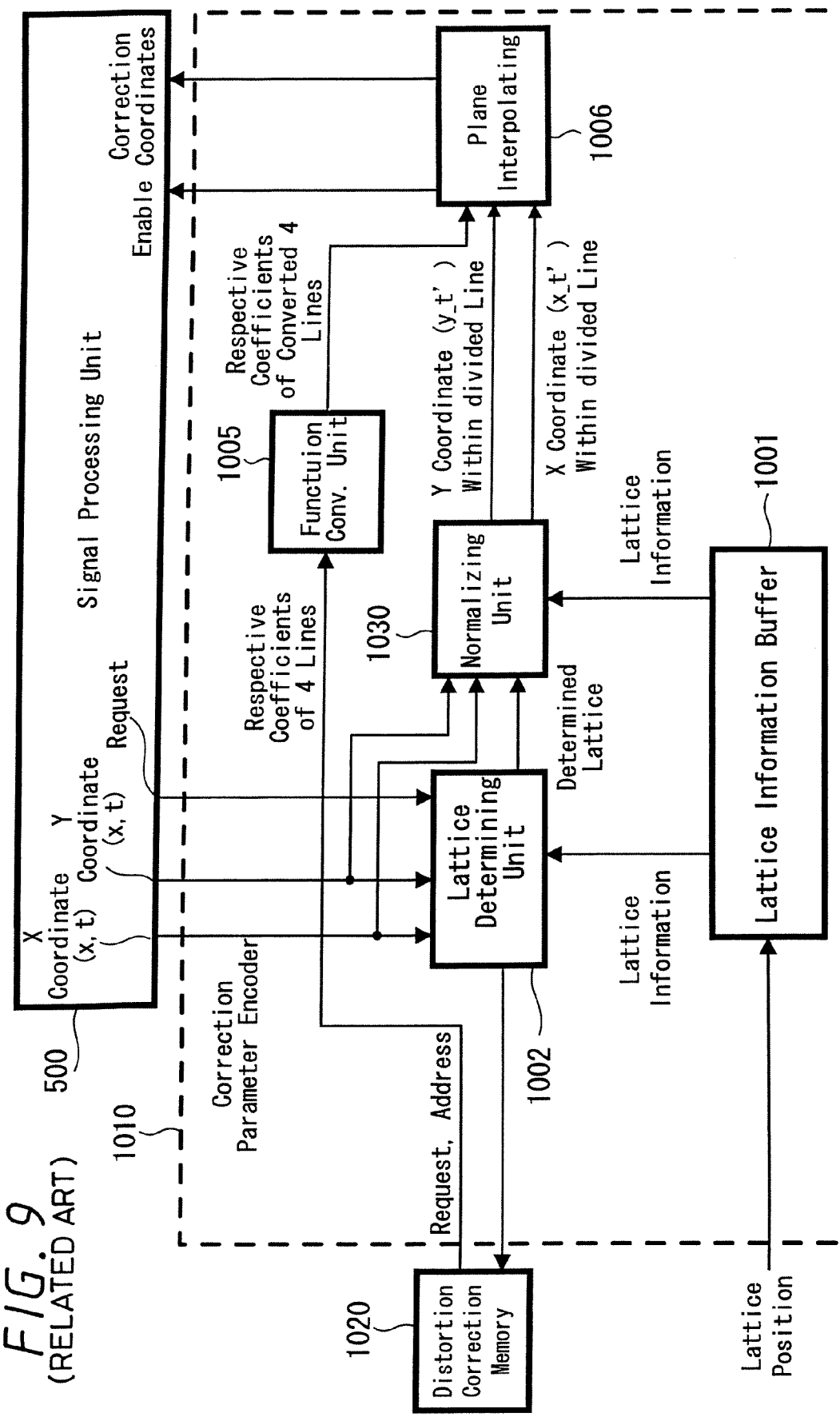
FIG. 9 is a block diagram showing an arrangement of an x-direction image distortion correction parameter decoder shown in FIG. 3.
Figure 30:
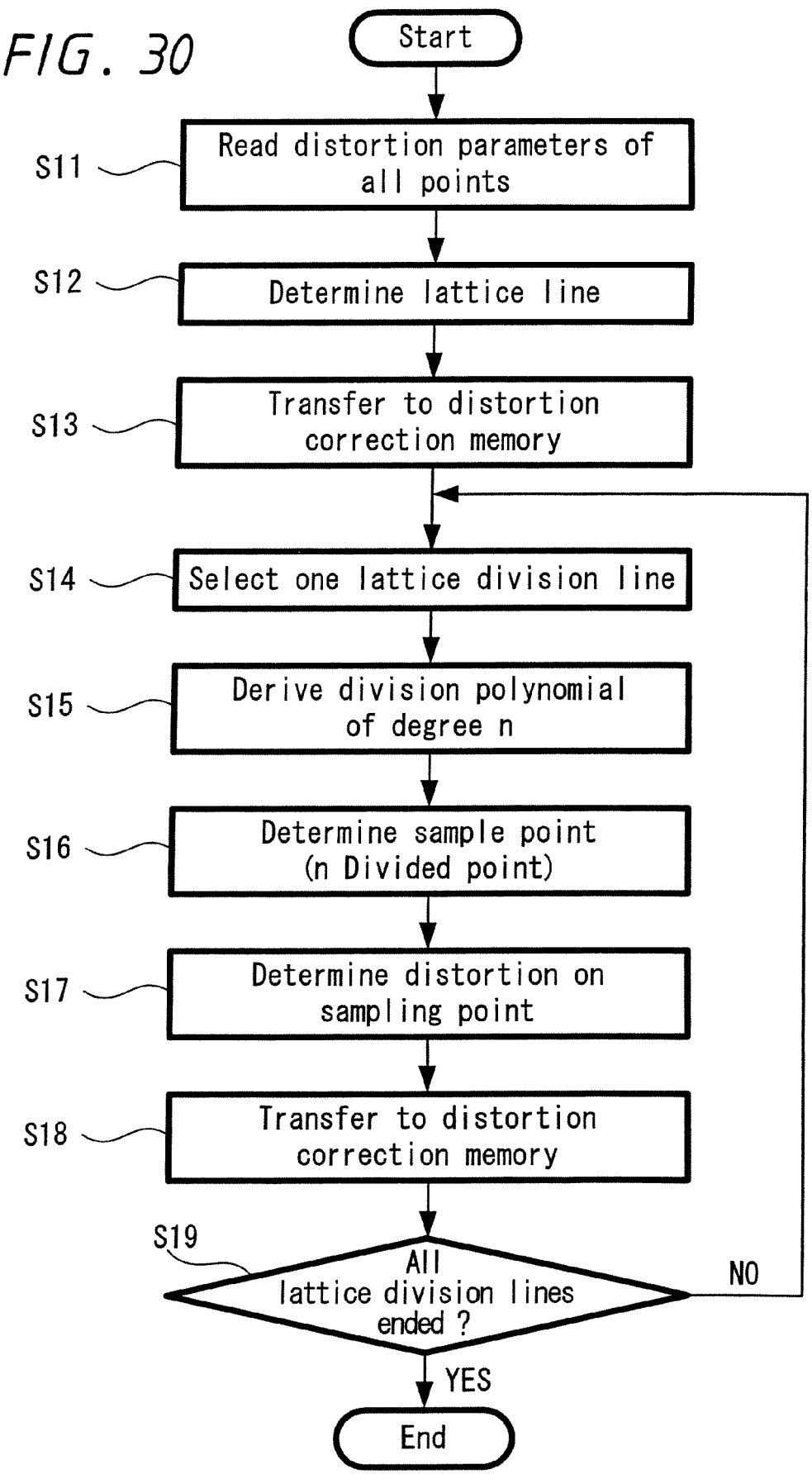
FIG. 30 is a first flowchart showing an optimum dividing method.

Further, FIG. 30 is a flowchart showing operations of the correction parameter encoder 900. This flowchart of FIG. 30 is a flowchart obtained by modifying the flowchart (FIG. 8) which shows the operations of the previously-proposed apparatus. In FIG. 30, elements and parts identical to those of FIG. 8 are denoted by identical reference numerals.

Referring to FIG. 30, and following the start of operation, at the step S11, distortion correction coordinates corresponding to all pictures on the target image are read out. In the next step S12, a picture is divided into lattices in accordance with the lattice dividing method. At the step S13, correction data for decoding distortion correction coordinates in the points of lattice points which are interdivision points of lattice lines are transferred to the distortion correction memory 1020. Further, at the step S14, the lattice segment encircled by lattice points is selected.

Then, at the step S15, a discrete function is made by representing distortion correction coordinates of all points on the selected lattice segment with the y axis and by representing distances with x axis and the discrete function is approximated by the division polynomial of degree n. Further, at the step S16, the effective range of the approximated division polynomial of degree n is divided by n and respective x values are calculated. At the step S17, a value of y of the approximated division polynomial of degree n corresponding to the x coordinate calculated at the step S16 is calculated.

Further, at the step S18, a value of n−1 point except both ends of the effective range calculated at the step S17 is transferred to the distortion correction memory 1020 as distortion correction parameters for decoding distortion correction coordinates. If deriving of distortion correction parameters concerning all lattice segments is not ended as represented by a NO at the decision step S19, then control goes back to the step S14. If on the other hand deriving of distortion correction parameters concerning all lattice segments is ended as represented by a YES at the decision step S19, then control is ended. Encoding is executed by the above-mentioned method.

Operations of the correction parameter encoder 900 will be described below with reference to the case of the division polynomial of degree 2. Specifically, the polynomial of degree n deriving unit 902 receives necessary distortion correction coordinates from the correction parameter deriving unit 800 based upon information of lattice position obtained from the lattice dividing unit 911. In order to decode data by using the division polynomial of degree 2, the polynomial of degree n deriving unit 902 should select the optimum point in the division polynomial of degree 2.

A certain lattice segment is used as a target like the previously-proposed apparatus as shown in FIGS. 7A to 7D. In FIGS. 7A to 7D, positions of both ends and distortion correction coordinates are set to (x0, h(x0)), (x2, h(x2)). At that time, (x1, h(x1)) are set to all pixels in the lattice segment, and the coefficients of a, b, c are calculated from the following equations:

$$a*x0^2 b*x0+c=v0$$

$$a*x1^2 b*x1+c=v1$$

$$a*x2^2 b*x2+c=v2$$

Accordingly, errors of distortion correction coordinates at respective points are calculated by the target segment and the division polynomial of degree 2 that was obtained as described above. Here, a point (x1, h(x1)) having minimum error becomes a point that should be calculated. The division polynomial of degree 2 is created from a, b, c that are obtained from the three points. A point on the target y axis is a point 1 and a point that is to be calculated by bidivision is a point of (x2−x0)/2.

Specifically, calculating the distortion correction parameters of the above-described point by the approximate expression, we have:

$$h(x1')=a*[(x2-x(0)/2)]^2+b*[(x2-x0)/2]+c$$

The above-described processing is effected on all lattice segments. In this manner, the processing in the correction parameter encoder 900 shown in FIG. 28 is carried out.

Further, details of the correction parameter decoder 1010 will be described with reference to FIG. 31. Specifically, the correction parameter decoder 1010 is a block to decode distortion correction coordinates of respective points of picture from distortion correction parameters obtained from the correction parameter encoder 910 in accordance with the request from the signal processing unit 500.

Figure 31:
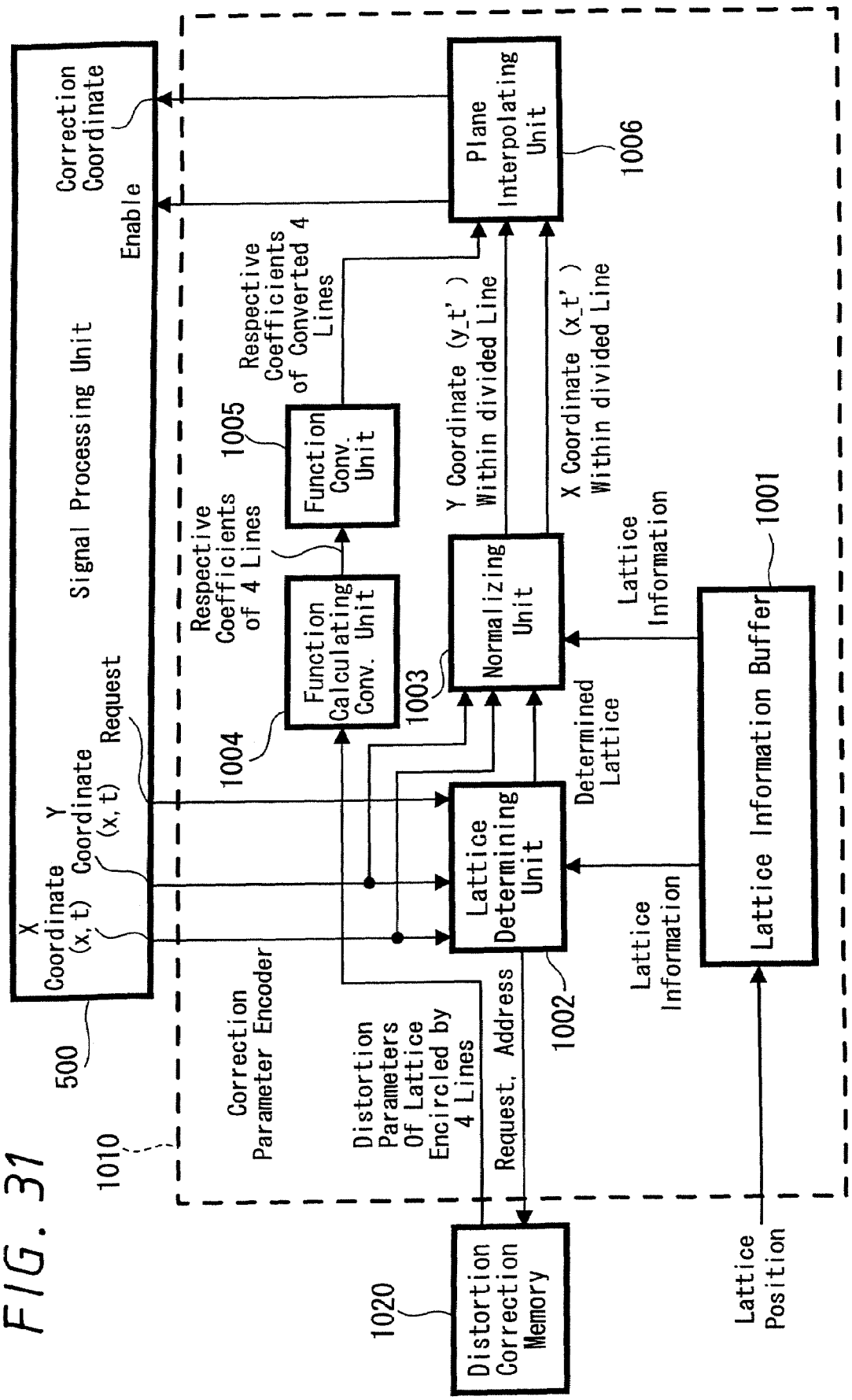
FIG. 31 is a block diagram showing an arrangement of the x-direction image distortion correction parameter decoder shown in FIG. 13.

As shown in FIG. 31, the correction parameter decoder 1010 is supplied with lattice information indicative of divided positions of respective x, y directions from the correction parameter encoder 910. The inputted lattice information is stored in the lattice information buffer 1001. Then, when the correction parameter decoder 1010 receives a request of coordinates (xt, yt) that should be corrected in distortion from the signal processing unit 500, the lattice determining unit 1002 compares a lattice containing target coordinates (xt, yt) with lattice position information of the lattice buffer 1001 and calculates the target lattice.

The correction parameter decoder 1010 generates address in which distortion correction parameters on the four lattice segments surrounding the calculated lattice are stored and supplies a read request signal to the distortion correction memory 1020. At the same time, the lattice determining unit 1002 supplies the thus determined lattice position to the normalizing unit 1003. The normalizing unit 1003 calculates relative coordinates (xt', yt') used by the four lines surrounding the lattice from the target coordinates (xt, yt), the lattice position and the lattice information.

Thus, the function calculating unit 1004 reconstructs the division polynomial of degree n based upon distortion information of resultant each n+1 point. A function converting unit 1005 converts coefficients of function received from the distortion correction memory 1020 into a function format that is used in plane interpolation. Further, a plane interpolating unit 1006 creates a plane function by using coefficients of a plane function obtained from the function converting unit 1005. The plane interpolating unit 1006 obtains respective coordinates from the normalizing unit 1003, calculates desired correction coordinates and supplies a calculated result to the signal processing unit 500.

Figure 10:
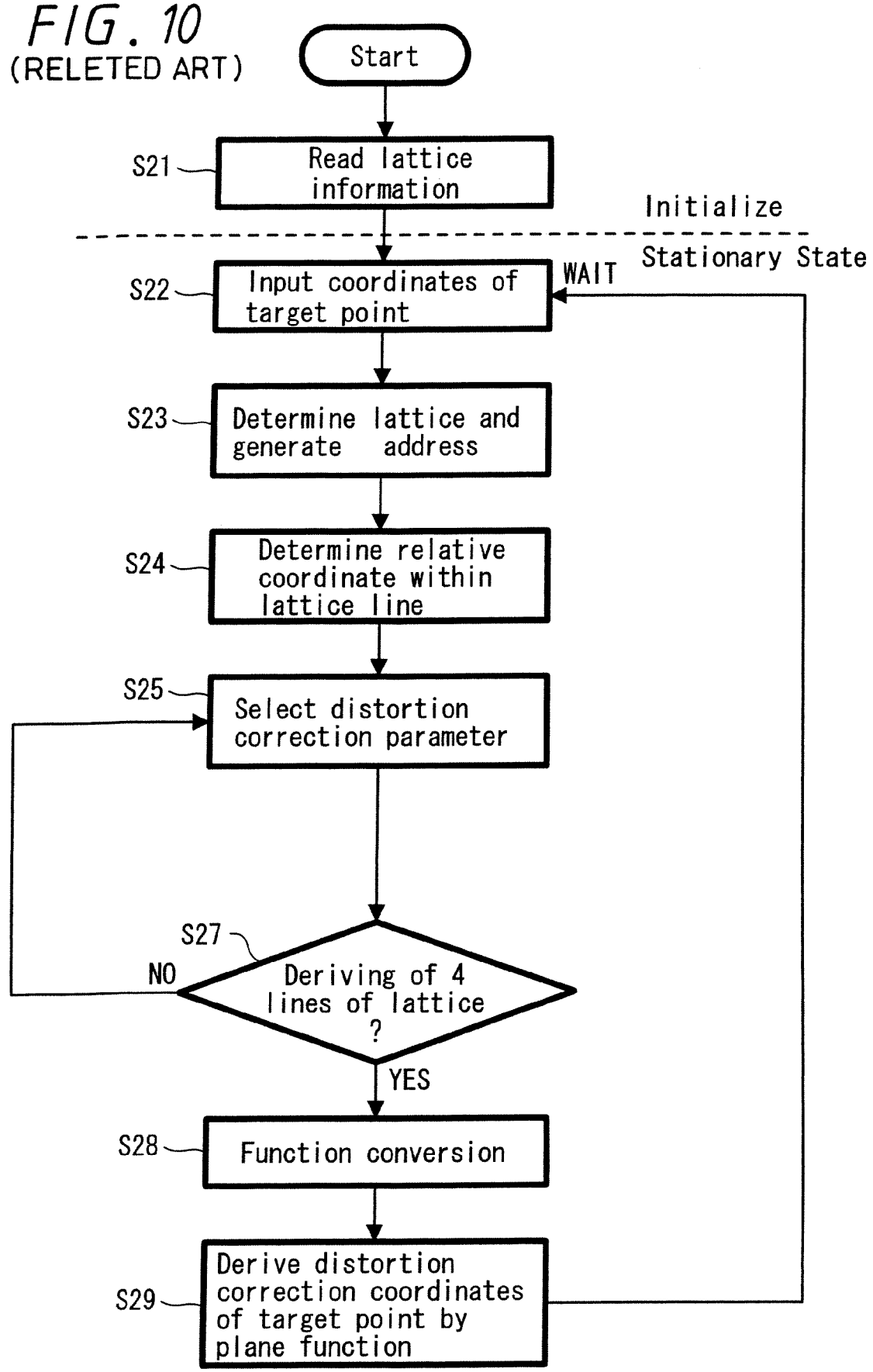
FIG. 10 is a flowchart to which reference will be made in explaining operations of the correction parameter decoder.
Figure 32:
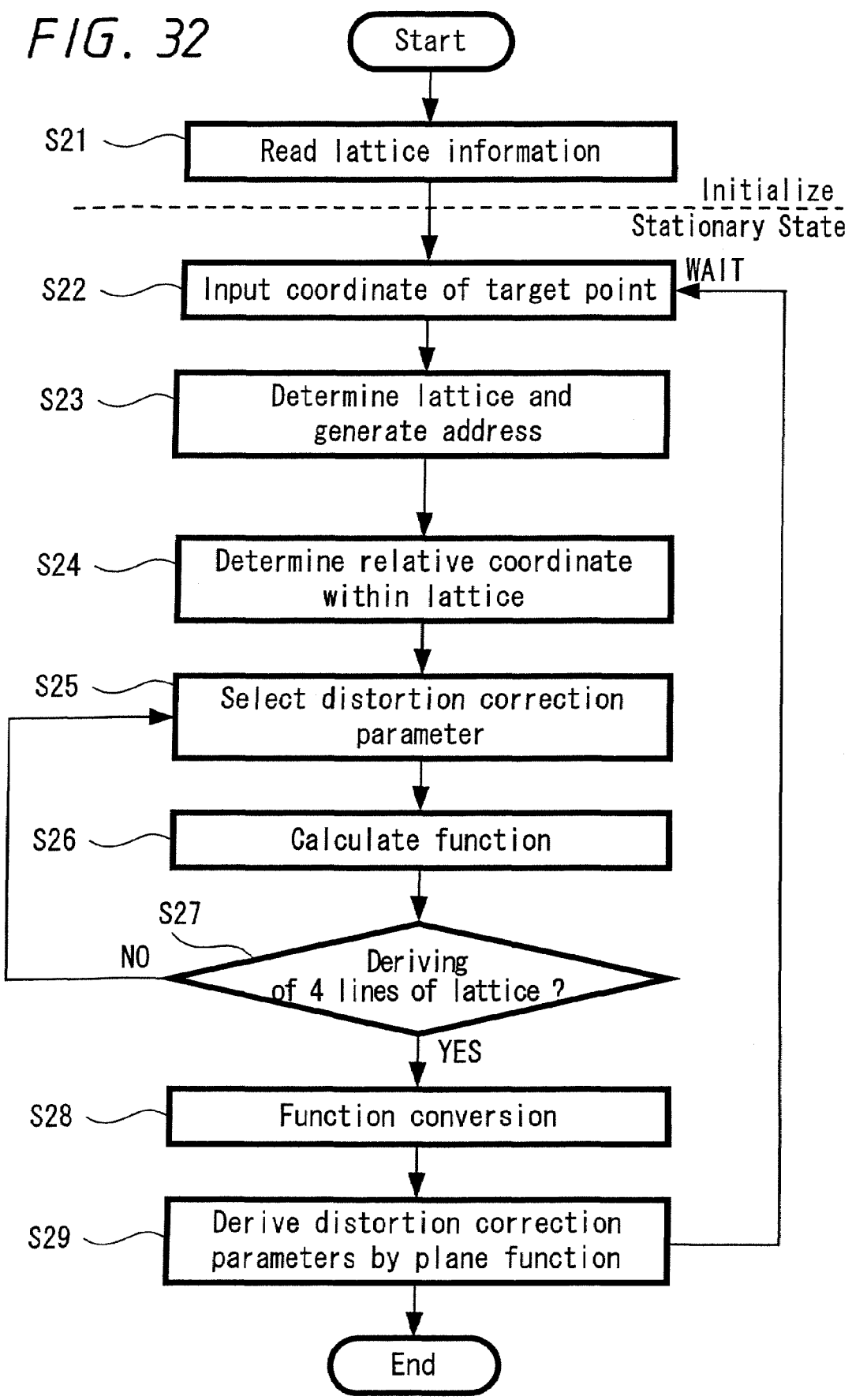
FIG. 32 is a second flowchart showing the optimum dividing method.
Figure 34:
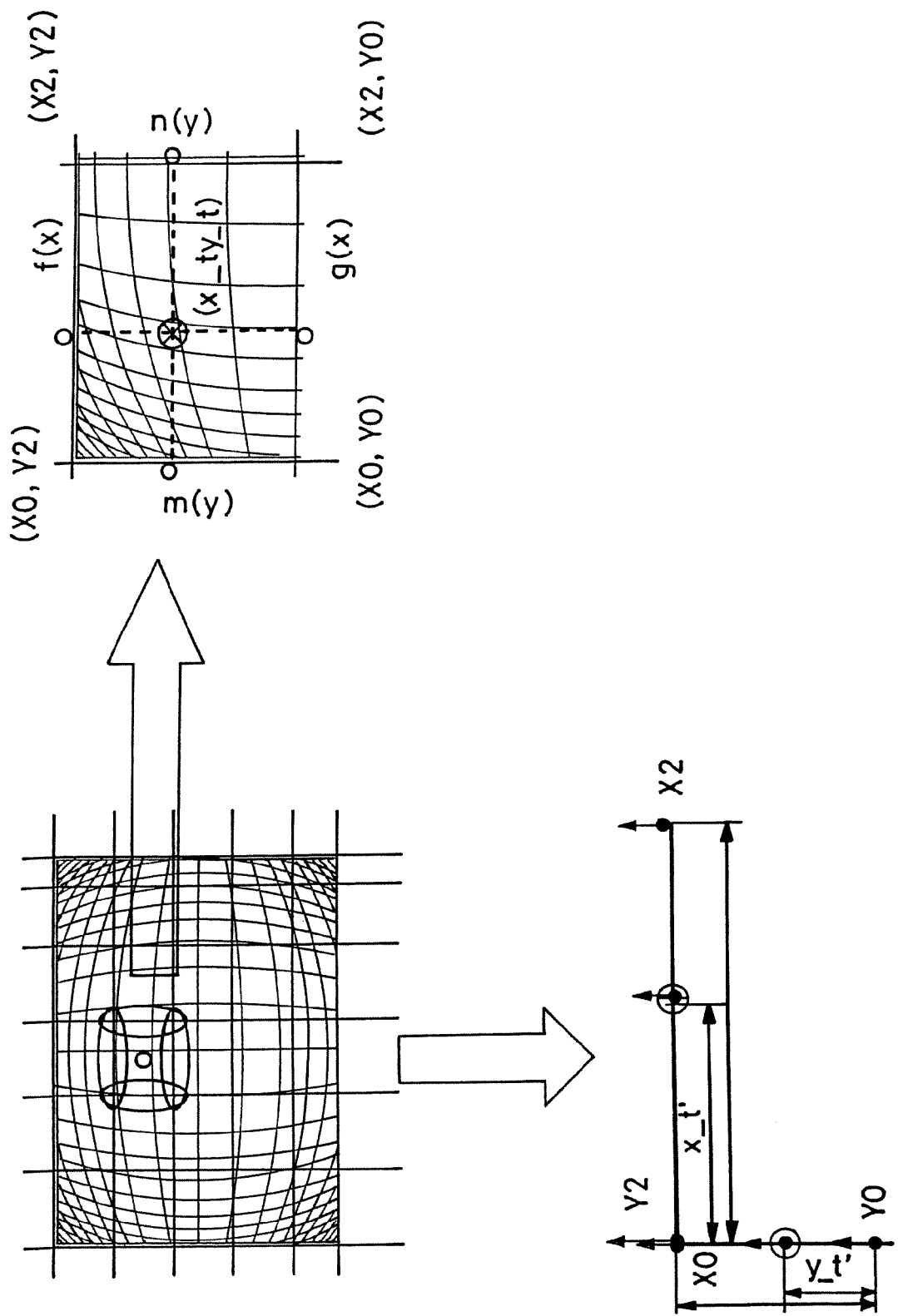
FIG. 34 is a diagram used to explain operations of the correction parameter decoder shown in FIG. 13.

In this manner, distortion correction coordinates of respective points of a picture are decoded by the distortion correction parameters. Further, FIG. 32 is a flowchart showing operations of the correction parameter decoder 1010. This flowchart shown in FIG. 32 is a modification of the flowchart (FIG. 10) which shows the operations of the previously-proposed apparatus. In FIG. 32, elements and parts identical to those of FIG. 10 are denoted by identical reference numerals.

Referring to FIG. 32, and following the start of operation, at the step S21, lattice information is read as the initialization. Then, the signal processing apparatus is placed in the standby state (WAIT) until a distortion correction request signal is issued at the step S22. When it is requested to decode the distortion correction parameters at the step S22, the distortion correction parameter decoder 1010 receives coordinates of a target point from the signal processing unit 500. Further, at the step S23, the distortion correction parameter decoder 1010 determines the lattice that contains the coordinates of the target point.

At the step S24, the distortion correction parameter decoder 1010 calculates relative coordinates in each lattice segment of the target point. At the step S25, the distortion correction parameter decoder 1010 selects one line from four lines surrounding a lattice as a lattice and reads distortion correction parameters of n+1 point. Further, at the step S26, the distortion correction parameter decoder 1010 generates the division polynomial of degree n from the thus read n+1 distortion correction parameters. Specifically, the distortion correction parameter decoder 1010 selects one line from four lattice lines encircled as the lattice and reads the distortion correction parameters (coefficients) of the division polynomial of degree n.

Further, if the processing concerning the four lattice segments is not finished as represented by a NO at the decision step S27, then control goes back to the step S25. If on the other hand the processing concerning the four lattice segments is finished as represented by a YES at the decision step S27, then control goes to a step S28, whereat a plane function made by the four division polynomials of degree n is derived. At the next step S29, the distortion correction coordinates of the target point are derived by using the plane function, and the correction parameter decoder 1010 is placed in the standby state (WAIT) until the next request signal is issued. The distortion correction parameters are decoded by the above-mentioned method.

An example of the case of the division polynomial of degree 2 will be described below with reference to FIGS. 33A to 33C and FIG. 34. As shown on the right-hand portion in FIG. 33A, the lattice position corresponding to address (xt, yt) obtained from the signal processing unit 500 is calculated. Specifically, with respect to the division polynomial of degree 2, distortion correction parameters of three points are read out from respective lattice lines. However, since the lattice points can be made common as described in the right-hand side notes of FIGS. 33B and 33C, in actual practice, parameters of 8 points [4+(n−1)*4:n=4] are read out.

Further, FIG. 33B shows relationships between positions of three points in each line of four lattice lines and distortion correction parameters. Since coordinate x1' becomes a bisected middle point, division polynomials of degree 2 and distortion correction parameters are expressed by the following equations:

$$a*x0^2+b*x0+c=h(x0)$$

$$a*x2^2+b*x2+c=h(x2)$$

$$a*[(x2-x0)/2]^2+b*[(x2-x0)/2]+c=h(x1)'$$

Accordingly, the division polynomial of degree 2 is reproduced by calculating the above-mentioned coefficients a, b, c.

Specifically, normalizing the above equations with reference to x0, the above-described equations are modified as:

$$x0=0$$

$$x2=\text{lattice width}$$

$$c=h(x0)$$

$$a*x2^2+b*x2+c=h(x2)$$

$$a*[x2/2]^2+b*[x2/2]+c=h(x1)'$$

Thus, as shown in FIG. 33C, we have the division polynomial of degree 2 expressed as:

$$a=[\{2*h(x2)-4*h(x1)'+2*h(x0)\}/x2^2]$$

$$b=[\{-h(x2)+4*h(x1)'-3*h(x0)\}/x2]$$

$$c=h(x0)$$

Since x2 represents the width of the lattice, reciprocal number and square of reciprocal number can be held as lattice information.

Further, the function converting block 1005 calculates functions of four lines f(x), g(x), m(y), n(y) of respective lattice lines of the calculated lattice. The coefficients a, b, c of four lines are obtained by the above-described calculations.

While distortion correction coordinates of the target point are calculated by using the four lines of the lattice, herein the coefficients of the respective functions are modified as:

f(x): afx, bfx, cfx g(x): agx, bgx, cgx m(y): amy, bmy, cmy n(y): any, bny, cny

That is, we have:

$$F(x)=f'(x)=2*afx*x^2+(bfx-afx)*x+cfx$$

$$G(x)=g'(x)=2*agx*x^2+(bgx-agx)*x+cgx$$

$$M(y)=m'(y)=2*amy*y^2+(bmy-amy)*y+cmy$$

$$N(y)=n'(y)=2*any*y^2+(bny-any)*y+cny$$

The normalizing block 1003 converts x_t, y_t as:

$$xt'=xt-x0$$

$$yt'=yt-y0$$

Then, the normalizing block 1003 substitutes the converted xt, yt into the above-described functions. Then, the plane interpolating block 1005 calculate the distortion correction coordinates of the target point based upon the newly-calculated four functions and xt', yt'.

Specifically, a distortion correction coordinate Vtarget of the target point is calculated by the following equation:

$$V\text{target}=(\tfrac{1}{2})*\{(1-yt')*F(xt')+yt'*G(xt')+(1-xt')*N(yt')+x\_t'*M(yt')\}$$

In this manner, the correction parameter decoder 1010 shown in FIG. 31 carries out the processing. This processing operation has been described so far with reference to FIG. 34.

Figure 35:
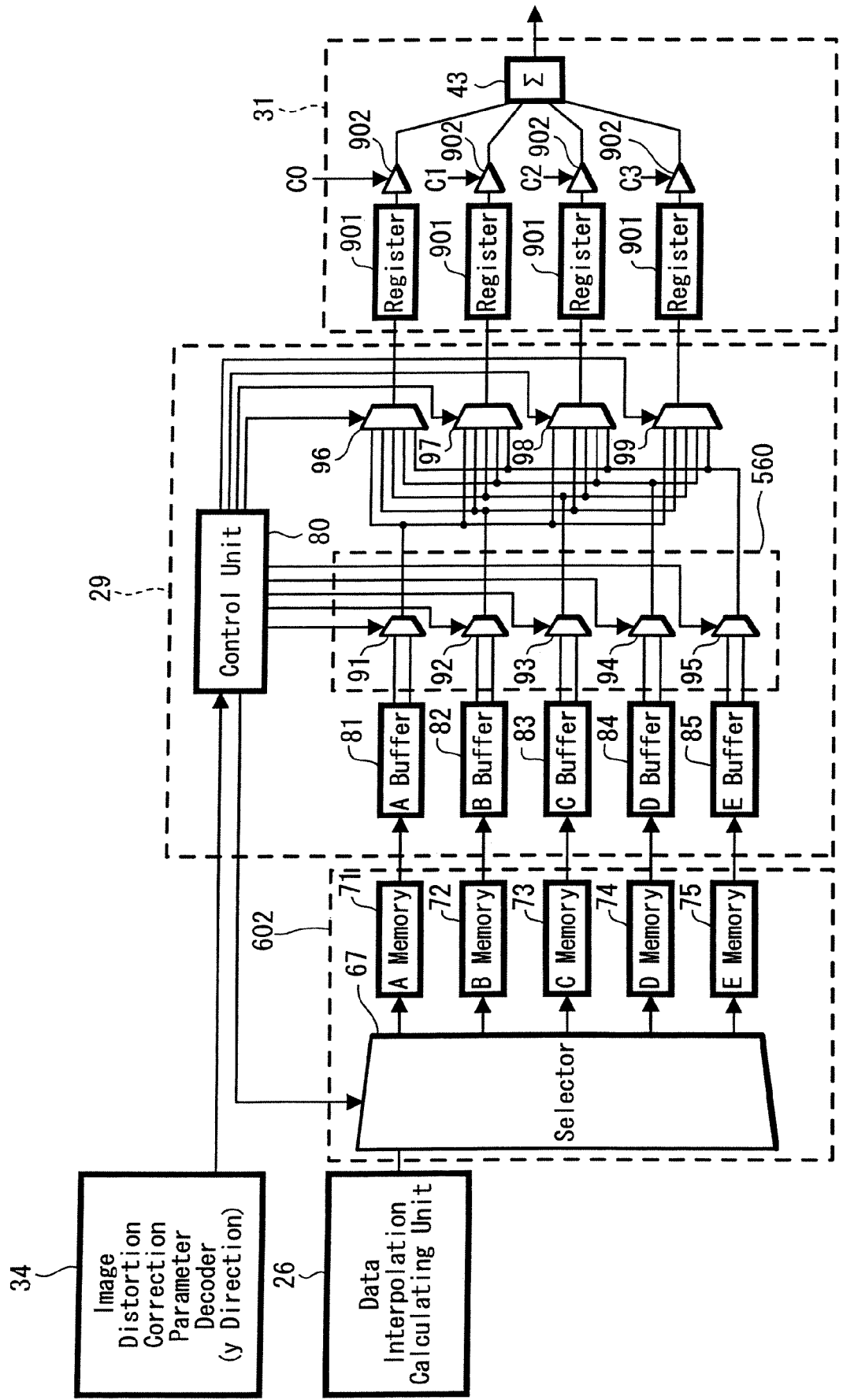
FIG. 35 is a block diagram showing arrangements of the image memory, the data acquisition unit and the data interpolation calculating unit shown in FIG. 13.

Further, FIG. 35 is a block diagram showing arrangements of the image memory 602, the data acquisition unit 29 and the data interpolation calculating unit 31 shown in FIG. 13. FIG. 35 shows the arrangement in which the image processing apparatus 100 generates image data of each pixel by interpolation calculation using image data of 16 pixels of (4×4) taps.

As shown in FIG. 35, the image memory 602 includes a selector 67 and five memories of the number larger than the number of vertical taps by one, i.e., an A memory 71, a B memory 72, a C memory 73, a D memory 74 and an E memory 75. The data acquisition unit 29 includes a control unit 80, an A buffer 81, a B buffer 82, a C buffer 83, a D buffer 84, an E buffer 85, a cycle dividing unit 560 and selectors 96 to 99. The cycle dividing unit 560 includes the selectors 91 to 95.

The data acquisition unit 29 includes the five buffers (A buffer 81 to E buffer 85) of the number larger than the number of the vertical taps by one, the five corresponding selectors 91 to 95 and the four selectors 96 to 99 of the number corresponding to the number of the vertical taps.

The data interpolation calculating unit 31 includes four registers 901, a multiplying circuit 902 and an adding circuit 43.

As shown in FIG. 35, the selector 67 is connected to the data interpolation calculating unit 26 and the control unit 80, and the A memory 71, the B memory 72, the C memory 73, the D memory 74 and the E memory 75 are connected to the selector 67.

The control unit 80 is connected to the image distortion correction parameter decoder 34, the A buffer 81 is connected to the A memory 71, and the B buffer 82 is connected to the B memory 72. Similarly, the C buffer 83 is connected to the C memory 73, the D buffer 84 is connected to the D memory 74 and the E buffer 85 is connected to the E memory 75.

The selector 91 is connected to the A buffer 81, the selector 92 is connected to the B buffer 82, and the selector 93 is connected to the C buffer 83. In a like manner, the selector 94 is connected to the D buffer 84, and the selector 95 is connected to the E buffer 85. The selectors 96 to 99 are connected to the five selectors 91 to 95, respectively. The selectors 91 to 99 are controlled by the control unit 80, respectively.

Registers 901 are respectively connected to the selectors 96 to 99, and multiplying circuits 902 are connected to the registers 901, respectively. Then, the four multiplying circuits 902 are connected to an adding circuit 43.

As described above, since the data interpolation calculating unit 26 writes data, which has been corrected in the horizontal direction, in the image memory 602 and at the same time, the data acquisition unit 29 effects the interpolation processing of the vertical direction on the data obtained from the image memory 602, image distortion can be corrected without causing delay of frame as a processing wait time.

Operations of the image memory 602, the data acquisition unit 29 and the data interpolation calculating unit 31 shown in FIG. 35 will be described below in detail. First, the data that has been interpolated in the horizontal direction is supplied from the data interpolation calculating unit 26 to the selector 67 sequentially, and this data is distributed and stored in the five memories of the A memory 71 to the E memory 75 by the selector 67 which is controlled by the control unit 80.

The data stored in the A memory 71 is supplied through the A buffer 81 to the selector 91, and the data stored in the B memory 72 is supplied through the B buffer 82 to the selector 92. Similarly, the data stored in the C memory 73 is supplied through the C buffer 83 to the selector 93, the data stored in the D memory 74 is supplied through the D buffer 84 to the selector 94, and the data stored in the E memory is supplied through the E buffer 85 to the selector 95.

The selectors 91 to 95 included in the cycle dividing unit 560 divide data read out from the A buffer 81 to the E buffer 85 at the unit of two pixels, for example, under control of the control unit 80 and supply data of one pixel to the selectors 96 to 99 at every cycle.

The selectors 96 to 99 selectively output data supplied from the selectors 91 to 95 to the registers 901 under control of the control unit 80. Thus, four data of the number corresponding to the number of taps necessary for the vertical direction interpolation processing are selectively supplied to the data interpolation calculating unit 31.

The respective multiplying circuits 902 calculate products of the data stored in the registers 901 and interpolation coefficients C0 to C3 and the four products are added by the adding circuit 43 and thereby the vertical direction interpolation calculation is carried out, the calculated result being supplied to the output data buffer 32.

Operations of the image processing apparatus 100 according to the embodiment of the present invention will be described with reference to FIGS. 36A to 36D. FIGS. 36A to 36D show image data of one frame amount.

As shown in FIG. 36A, when image data is inputted to the signal processing unit 500 at a time T1, the horizontal one-dimensional interpolating unit 501 effects the horizontal direction interpolation processing on the image data at a time T2 as shown in FIG. 36B. Then, as shown in FIG. 36C, the image that has been interpolated in the horizontal direction is sequentially written in the A memory 71 to the E memory 75 included in the image memory 602 at times following the time T2.

When vertical processing data is read out from the image memory 602 to the data acquisition unit 29 at an odd-number cycle, for example, and data that has been processed in the horizontal direction is written in the image memory 602 from the data interpolation calculating unit 26 at an even-number cycle, the distortion correction processing at the 2-cycle period can be executed.

At that time, as shown in FIG. 37, from a time T3 in which data Dmx of the number of lines corresponding to the vertical direction maximum distortion amount in a horizontal line maximum distortion curve 104 in the image 102 is stored in the image memory 602, the interpolation processing in the vertical direction of each line is executed sequentially. Accordingly, the delay time in the interpolation calculation is selected to be a duration ranging from the time T1 to the time T3 and the time in which the horizontal direction interpolation processing is effected on the data of one frame amount (frame delay) need not be used as a wait time, whereby image distortion can be corrected in a real-time fashion.

On the whole, the image memory 602 has a memory capacity large enough to store data of the number which results from adding the number of lines corresponding to the maximum distortion amount in the vertical direction and the number of vertical processing taps (e.g. four taps) and data of the number of pixels in the horizontal direction of the image inputted to the signal processing unit 500 in the horizontal direction. The five memories of the A memory 71 to the E memory 75 shown in FIG. 35 are the same in memory capacity, for example, and the port width of each memory is selected to be 32 bits, for example.

Figure 38:
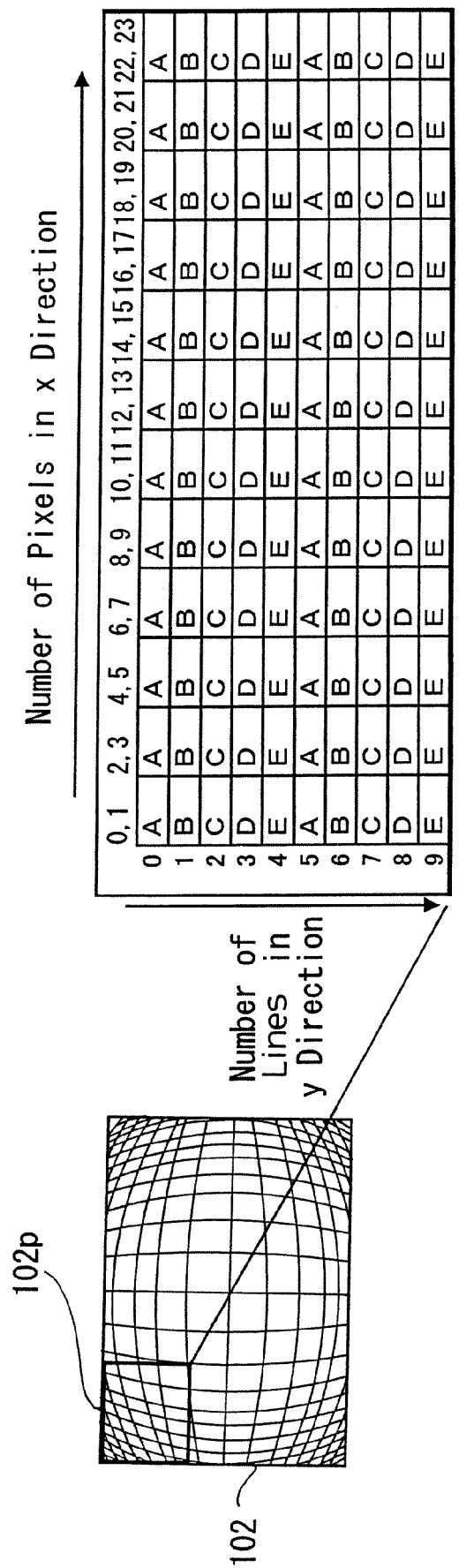
FIG. 38 is a diagram to which reference will be made in explaining the manner in which data are stored in the image memory shown in FIG. 35.

FIG. 38 shows a method for storing data at an area 102P of the image 102 in the image memory 602. Reference letters "A" to "E" in FIG. 38 represent the A memory 71 to the E memory 75 shown in FIG. 35. When the port width of each memory is 32 bits and data of one pixel amount is 16 bits containing a Y signal (luminance information) and a C signal (color difference signal) as described above, the selector 67 sequentially stores the data in the A memory 71 to the E memory 75 at the unit of data of 2 pixel amounts.

Specifically, as shown in FIG. 38, the selector 67 stores data of $0^{th}$ line 0 to $23^{rd}$ pixel in the A memory 71, and stores data of first line 0 to $23^{rd}$ pixel in the B memory 72. Similarly, the selector 67 stores data of second line 0 to $23^{rd}$ pixel in the C memory 73, stores data of third line 0 to $23^{rd}$ pixel in the D memory 74, and stores data of fourth line 0 to $23^{rd}$ pixel in the E memory 75. The selector 67 will sequentially store data of each line in the A memory 71 to the E memory 75 at every line in a similar manner.

The reason that the data acquisition unit 29 needs the buffers of the number larger than the number of the vertical taps will be described below. When the image 102 with distortion is examined locally, as shown by patterns 1 to 3 of FIGS. 39A to 39C, image data can be prevented from being moved in the vertical direction more than two pixels between two pixels adjacent in the horizontal direction.

Figure 39A:
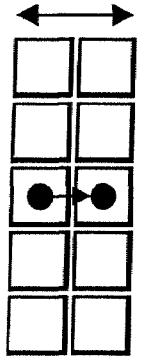
FIGS. 39A, 39B and 39C are diagrams showing patterns that the adjacent pixels can take in the vertical direction, respectively.
Figure 39B:
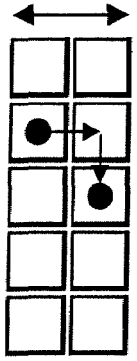
Figure 39C:
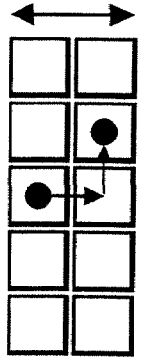
Figure 40A:
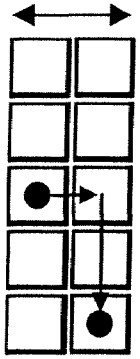
FIGS. 40A and 40B are diagrams showing patterns that the adjacent two pixels cannot take in the vertical direction, respectively.
Figure 40B:
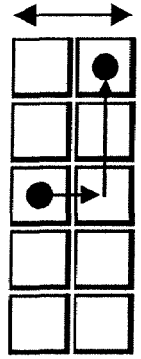

Specifically, the image data is not moved in the vertical direction at all between the pixels adjacent in the horizontal direction as shown by the pattern 1 in FIG. 39A, the image data is moved in the vertical direction by one pixel amount as shown by the patterns 2 and 3 in FIGS. 39B and 39C, but the image data can be prevented from being moved in the vertical direction more than two pixels between the pixels adjacent in the horizontal direction as shown in FIGS. 40A and 40B.

Figure 41:
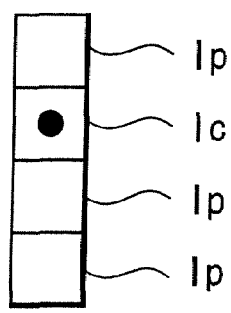
FIG. 41 is a diagram used to explain vertical 4-tap processing.

In the vertical 4-tap processing, as shown in FIG. 41, filtering processing is executed by using data of four pixels containing three marginal pixels Ip adjacent to the center pixel Ic in the vertical direction.

Figure 42:
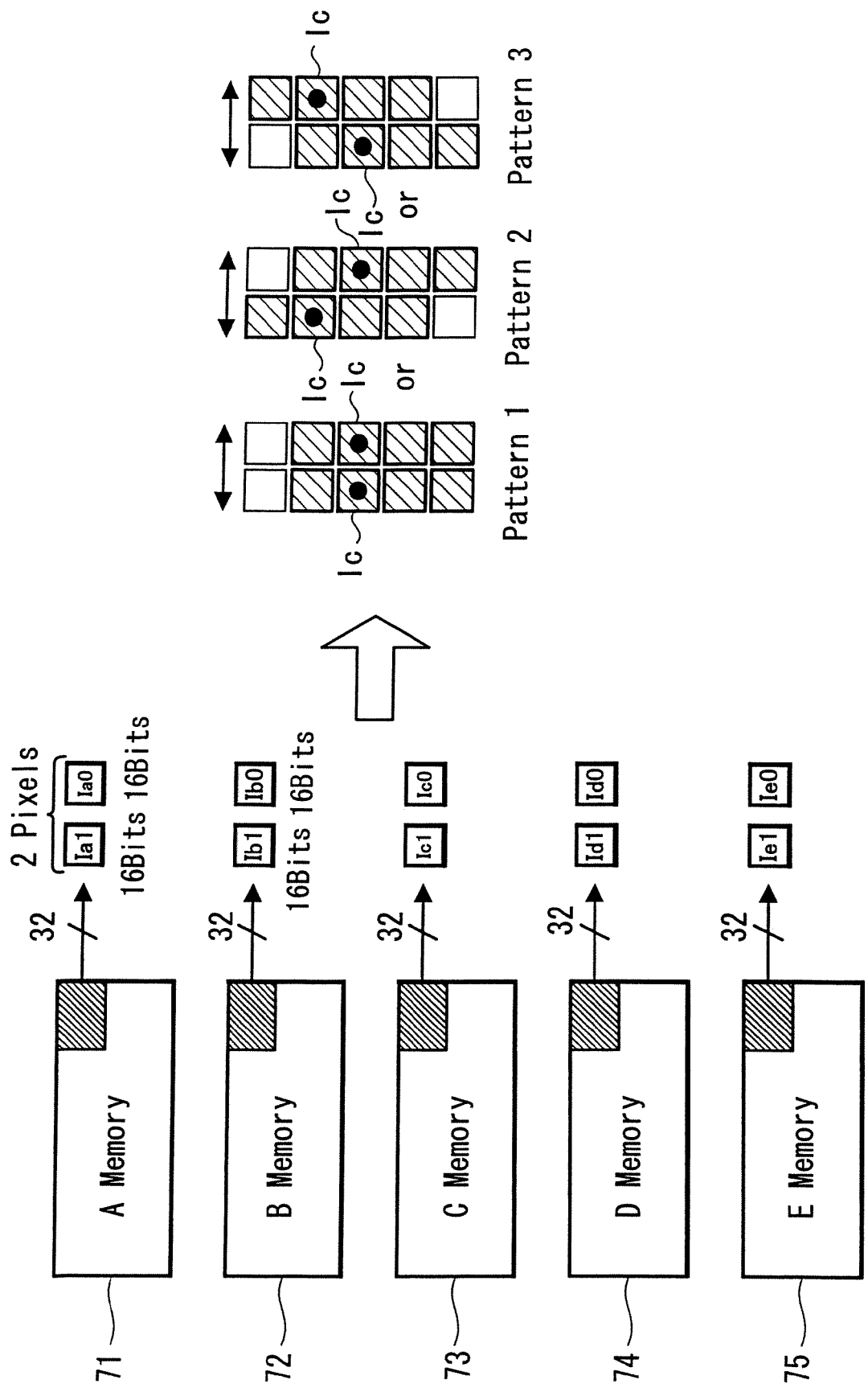
FIG. 42 is a diagram to which reference will be made in explaining the manner in which data is to be read out from the image memory shown in FIG. 35.

At that time, as shown in FIG. 42, each of the five memories of the A memory 71 to the E memory 75 contained in the image memory 602 has the 32-bit port, for example. In this case, 16-bit image data is outputted from each port by two pixel amounts in one access.

Specifically, as shown in FIG. 42, by one access, image data Ia0, Ia1, each formed of 16 bits, are read out from the A memory 71 at the unit of 2 pixels, image data Ib0, Ib1, each formed of 16 bits, are read out from the B memory 72 at the unit of 2 pixels, and Ic0, Ic1, each formed of 16 bits, are read out from the C memory 73 at the unit of 2 pixels. Similarly, image data Id0, Id1, each formed of 16 bits, are read out from the D memory 74 at the unit of 2 pixels and image data Ie0, Ie1, each formed of 16 bits, are read out from the E memory 75 at the unit of 2 pixels.

In this manner, if the image data of the adjacent two pixels are read out in the vertical direction by the data amount larger than the number of the taps, even when the change between the adjacent pixels is identical to any one of the patterns 1 to 3 shown in FIGS. 39A to 39C, the same processing is executed in the same column. Specifically, as shown hatched in FIG. 42, image data of the adjacent two pixels in the horizontal direction are respectively generated by executing filtering processing that intends to process image data in the four pixels arranged in the vertical direction from a pixel located above the center pixel Ic to the second pixel located below the center pixel Ic in each column, respectively.

Before the filtering processing, it is determined by the control unit 80 which of the patterns 1 to 3 is identical to the change between the adjacent pixels.

More specifically, the control unit 80 receives the y coordinates of the two center pixels Ic in the adjacent two columns in the horizontal direction from the image distortion parameter decoder 34 and controls the selectors 96 to 99 in response to a difference between the y coordinates, whereby image data shown hatched in FIG. 42 are selectively supplied to the data interpolation calculating unit 31 as the filtering processing targets.

While the 4-tap filtering processing has been described so far by way of example, the image processing method according to the embodiment of the present invention is not limited to the above 4-tap filtering processing, and it is needless to say that the image processing method according to the present invention can be applied to filtering processing with other taps than the 4 taps if the image memory 602, the data acquisition unit 29 and the data interpolation calculating unit 32 may have the arrangements corresponding to the number of taps and the cycle in which data is to be inputted to and outputted from the image memory 602 may be changed.

Further, the present invention can be applied to an image pickup apparatus and a display apparatus to which this image processing method has been applied. In the display apparatus, the present invention can be applied to mis-convergence correction and the like sufficiently.

As described above, according to the image processing method and the image processing apparatus of this embodiment and the image pickup apparatus and the display apparatus to which the image processing method according to this invention can be applied, since one-dimensional interpolation calculations of horizontal and vertical directions are effected on the picked-up image with the optical distortion and the correction vectors are used efficiently, not only still image but also moving image which needs real-time processing can be corrected in distortion by the simple arrangement, and an image of high quality without distortion can be obtained with ease.

According to the image processing method and the image processing apparatus of the embodiment of the present invention and the image pickup method and the display apparatus to which the image processing method according to the present invention can be applied, since distortion of the image can be corrected in a real-time fashion by the signal processing, freedom in designing lenses can increase, and miniaturization of a lens and reduction of a cost of a lens can be realized with ease.

Further, according to the image processing method and the image processing apparatus of the embodiment of the present invention and the image pickup apparatus and the display apparatus to which the image processing method according to the present invention can be applied, memory capacities of required memories can be reduced. According to the present invention, assuming that the picture is divided in the x direction by m and also divided in the y direction by n, then memory capacity reduction effect of $3n*m+n+m-1$ can be achieved.

Figure 11:
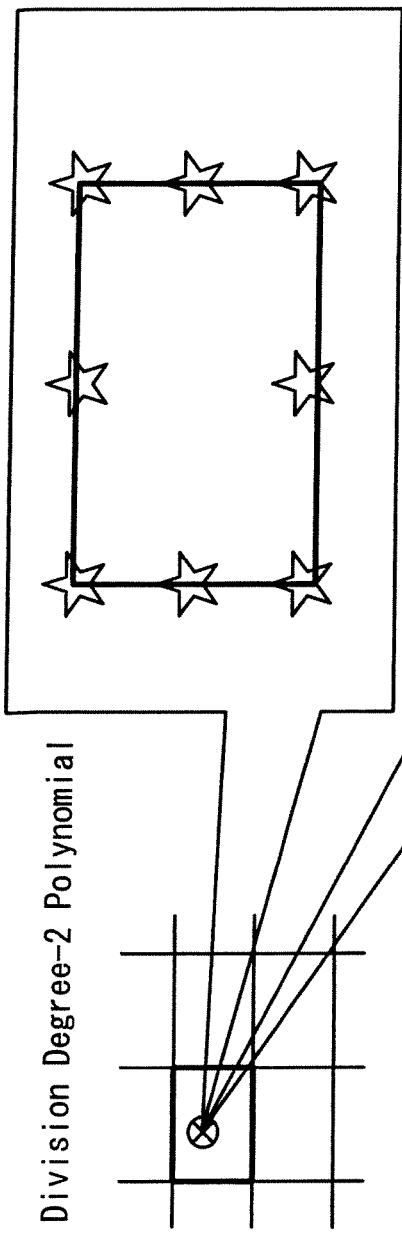
FIG. 11 is a diagram to which reference will be made in explaining the correction parameter decoder shown in FIG. 10.

Specifically, assuming that the picture is divided by polynomial of degree k, divided in the x direction by m and is also divided in the y direction by n, then as shown in FIG. 11, we can have the divided lattice line $n*(m+1)+m*(n+1)$. In this case, according to the present invention, the number of required distortion correction parameters can be reduced from the related-art $(k+1)\{n*(m+1)+m*(n+1)\}$ to the inventive $(n+1)*(m+1)+(k-1)\{n*(m+1)+m*(n+1)\}$, and hence memory capacity reduction effect of $3n*m+n+m-1$ can be achieved.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An image processing method comprising:
   an input step for inputting an image;
   a signal processing step for effecting signal processing on said image;
   a parameter deriving step for deriving distortion correction data;
   a lattice dividing step for dividing the image with lattices;
   a parameter compressing step for compressing data necessary for calculation by using lattice positions determined by said lattice dividing step, positions at which said lattices are crossing each other and data obtained from said parameter deriving step;
   a parameter holding step for holding said compressed necessary data;
   a parameter decoding step for expanding compressed data at every division and using said expanded data to correct distortion;
   a control step for controlling said signal processing and parameter decoding operation steps; and
   an output step for outputting or saving an image,
   wherein said lattice dividing step obtains an optimum point to minimize an error and the number of divided lattices by calculation in order to determine position at which data is compressed, said parameter compressing step holds an internally dividing point n−1, which results from dividing both ends of a lattice and its lattice segment by n by using the lattice position determined by said lattice dividing step, said lattice crossing position and data obtained from said parameter deriving step, as data necessary for calculation, and said parameter decoding step reproduces polynomial of degree n from a point n−1 between both ends of division at every division and expands said compressed data for use in correcting distortion.

* * * * *